United States Patent
Dixon et al.

(10) Patent No.: US 12,003,800 B2
(45) Date of Patent: *Jun. 4, 2024

(54) METHODS AND APPARATUS TO DETERMINE HEADPHONE ADJUSTMENT FOR PORTABLE PEOPLE METER LISTENING TO ENCODED AUDIO STREAMS

(71) Applicant: The Nielsen Company (US), LLC, New York, NY (US)

(72) Inventors: Kelly Dixon, Sykesville, MD (US); Francis C. Fasinski, Columbia, MD (US); Robin J. Gentry, Ellicott City, MD (US); Edward Murphy, North Stonington, CT (US); Jacob Martin, Baltimore, MD (US); Colin King, Silver Spring, MD (US); Emily Neuhoff, Baltimore, MD (US); Katherine T. Williams, Takoma Park, MD (US); Christopher Heider, Baltimore, MD (US); Rachel Szabo, Tampa, FL (US); Khaldoon Abu-Hakmeh, Redondo Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/179,323

(22) Filed: Mar. 6, 2023

(65) Prior Publication Data

US 2023/0209117 A1 Jun. 29, 2023

Related U.S. Application Data

(63) Continuation of application No. 17/347,518, filed on Jun. 14, 2021, now Pat. No. 11,601,701.
(Continued)

(51) Int. Cl.
*H04N 21/258* (2011.01)
*H04N 21/442* (2011.01)

(52) U.S. Cl.
CPC . *H04N 21/25883* (2013.01); *H04N 21/44204* (2013.01)

(58) Field of Classification Search
CPC ....... H04N 21/25883; H04N 21/44204; H04N 21/25891; H04N 21/44218;
(Continued)

(56) References Cited

U.S. PATENT DOCUMENTS

| | | | |
|---|---|---|---|
| 11,601,701 B2 | 3/2023 | Dixon et al. | |
| 2008/0263579 A1 | 10/2008 | Mears et al. | |

(Continued)

FOREIGN PATENT DOCUMENTS

JP          2018067834          4/2018

OTHER PUBLICATIONS

International Searching Authority, "International Search Report and Written Opinion," issued in connection with International Application No. PCT/US2021/037293, dated Oct. 1, 2021, 6 pages.
(Continued)

*Primary Examiner* — John W Miller
*Assistant Examiner* — Akshay Doshi

(57) ABSTRACT

Methods, apparatus, systems and articles of manufacture to determine headphone adjustment for portable people meter listening to encoded audio streams are disclosed. An example system disclosed herein includes meter data analyzer circuitry to determine an audience estimate for streaming media based on media data measured by a media meter, the media meter to measure the streaming media based on an identification of the streaming media in ambient audio collected by a microphone of the media meter, and data analyzer circuitry to calculate at least one headphone adjust-
(Continued)

ment factor based on a first determined proportion of an audience that listens to streaming media via headphones and a second determined proportion of the audience that listens to streaming media without headphones.

20 Claims, 28 Drawing Sheets

Related U.S. Application Data

(60) Provisional application No. 63/105,179, filed on Oct. 23, 2020, provisional application No. 63/039,410, filed on Jun. 15, 2020.

(58) Field of Classification Search
CPC ........... H04N 21/4852; H04N 21/6582; H04N 21/8106; H04H 60/64; H04H 60/31; G06Q 30/0201
See application file for complete search history.

(56) References Cited

U.S. PATENT DOCUMENTS

| | | |
|---|---|---|
| 2016/0379235 A1 | 12/2016 | Mendrisova et al. |
| 2019/0034962 A1 | 1/2019 | Toupet et al. |
| 2019/0259056 A1 | 8/2019 | Steuer et al. |
| 2019/0370860 A1 | 12/2019 | Morovati Lopez et al. |

OTHER PUBLICATIONS

United States Patent and Trademark Office, "Non-Final Office Action," mailed in connection with U.S. Appl. No. 17/347,518, dated Jul. 8, 2022, 9 pages.

United States Patent and Trademark Office, "Notice of Allowance," mailed in connection with U.S. Appl. No. 17/347,518, dated Nov. 16, 2022, 8 pages.

United States Patent and Trademark Office, "Notice of Allowance," issued in connection with U.S. Appl. No. 17/347,518, dated Feb. 7, 2023, 2 pages.

| MODE | NO | YES (COMBINED) | WERE HEADPHONES USED FOR RADIO LISTENING? YES, WIRED | YES, WIRELESS | TOTAL |
|---|---|---|---|---|---|
| OVER THE AIR (OTA) | 78.3% | 1.9% | 1.1% | 0.8% | 80.2% |
| INTERNET | 12.3% | 7.5% | 3.5% | 4.0% | 19.8% |
| TOTAL | 90.6% | 9.4% | 4.6% | 4.8% | 100% |

| | PPM | SURVEY | SURVEY DISTRIBUTION |
|---|---|---|---|
| TOTAL STREAMING | $T_{PPM}$ | $T_{survey}$ | 20% |
| WITHOUT HEADPHONES | $x_{PPM}$ | $x_{survey}$ | 12% |
| WIRED HEADPHONES | $y_{PPM}$ | $y_{survey}$ | 4% |
| WIRELESS HEADPHONES | --- | $z_{survey}$ | 4% |

PPM DISTRIBUTION: 6%, 6%, <1%, ---

FIG. 8B

| | UNIVERSE | PPM | SURVEY | ADJUSTED PPM |
|---|---|---|---|---|
| TOTAL STREAMING | T | $T_{PPM}$ | $T_{survey}$ | $T_{adjusted}$ |
| WITHOUT HEADPHONES | x | $x_{PPM}$ | $x_{survey}$ | NOT ADJUSTED |
| WIRED HEADPHONES | y | $y_{PPM}$ | $y_{survey}$ | $y_{adj} = x_{PPM} \cdot \left(1 + \dfrac{y_{survey}}{x_{survey}}\right)$ |
| WIRELESS HEADPHONES | z | --- | $z_{survey}$ | $z_{adj} = x_{PPM} \cdot \left(1 + \dfrac{z_{survey}}{x_{survey}}\right)$ |

FIG. 9

| | PPM | PPM DISTRIBUTION | SURVEY | SURVEY DISTRIBUTION | ADJUSTED PPM DISTRIBUTION |
|---|---|---|---|---|---|
| TOTAL STREAMING | $T_{PPM}$ | 7% | $T_{survey}$ | 19.8% | 11.0% |
| WITHOUT HEADPHONES | $x_{PPM}$ | 7% | $x_{survey}$ | 12.3% | 6.8% |
| WIRED HEADPHONES | $y_{PPM}$ | <1% | $y_{survey}$ | 3.5% | 2.0% |
| WIRELESS HEADPHONES | ---------- | | $z_{survey}$ | 4.0% | 2.2% |

| | PPM STREAMING PROPORTION OF TOTAL | LIFT APPLIED TO QH OF STREAMING LISTENING | ESTIMATED LIFT & IMPACT ON TOTAL |
|---|---|---|---|
| SCENARIO 1 | 4% | ~60% | ~2% |
| SCENARIO 2 | 5% | ~60% | ~3% |
| SCENARIO 3 | 6% | ~60% | ~4% |
| SCENARIO 4 | 7% | ~60% | ~4% |
| SCENARIO 5 | 8% | ~60% | ~5% |

FIG. 10

| START AGE | END AGE | OTHER | | DEMO GROUP 1 | | DEMO GROUP 2 | |
|---|---|---|---|---|---|---|---|
| | | MEN | WOMEN | MEN | WOMEN | MEN | WOMEN |
| 6 | 17 | ? | ? | ? | ? | ? | ? |
| 18 | 24 | ? | ? | ? | ? | ? | ? |
| 25 | 34 | ? | ? | ? | ? | ? | ? |
| 35 | 44 | ? | ? | ? | ? | ? | ? |
| 45 | 49 | ? | ? | ? | ? | ? | ? |
| 50 | 54 | ? | ? | ? | ? | ? | ? |
| 55 | + | ? | ? | ? | ? | ? | ? |

FIG. 12

| DEMOGRAPHIC | COMPARISON 1 | COMPARISON 2 | DIFFERENCE |
|---|---|---|---|
| GENDER | F | M | 0.11 |
| AGE_GROUP | 50-54 | 55+ | 0.19 |
| AGE_GROUP | 45-49 | 50-54 | 0.22 |
| RACE | H | O | 0.37 |
| AGE_GROUP | 18-24 | 25-34 | 0.44 |
| AGE_GROUP | 25-34 | 35-44 | 0.61 |
| RACE | B | H | 0.65 |
| AGE_GROUP | 12-17 | 18-24 | 0.66 |
| RACE | B | O | 0.88 |
| AGE_GROUP | 35-44 | 45-49 | 0.97 |

| | RACE | AGE | GENDER | COUNT | |
|---|---|---|---|---|---|
| | DEMO GROUP 1 | 6-17 | MALE | 4 | ← 1410 |

② 1415

| | RACE | AGE | GENDER | COUNT | |
|---|---|---|---|---|---|
| | DEMO GROUP 1 | 6-17 | MALE | 4 | ← 1410 |
| | DEMO GROUP 2 | 6-17 | MALE | 6 | ← 1420 |
| | TOTAL | | | 10 | ← 1425 |

③ 1430

| | RACE | AGE | GENDER | COUNT | |
|---|---|---|---|---|---|
| | DEMO GROUP 1 | 6-17 | MALE | 4 | ← 1410 |
| | DEMO GROUP 2 | 6-17 | MALE | 6 | ← 1420 |
| | DEMO GROUP 1 | 6-17 | FEMALE | 4 | ← 1435 |
| | DEMO GROUP 2 | 6-17 | FEMALE | 10 | ← 1440 |
| | TOTAL | | | 24 | ← 1445 |

④ 1450

| | RACE | AGE | GENDER | COUNT | |
|---|---|---|---|---|---|
| | DEMO GROUP 1 | 6-17 | MALE | 4 | ← 1410 |
| | DEMO GROUP 2 | 6-17 | MALE | 6 | ← 1420 |
| | DEMO GROUP 1 | 6-17 | FEMALE | 4 | ← 1435 |
| | DEMO GROUP 2 | 6-17 | FEMALE | 10 | ← 1440 |
| | OTHER | 6-17 | MALE | 24 | ← 1455 |
| | OTHER | 6-17 | FEMALE | 21 | ← 1460 |
| | TOTAL | | | 69 | ← 1465 |

| PROCESS | | | | | | |
|---|---|---|---|---|---|---|
| OM 6-17 | OF 6-17 | BM 6-17 | BF 6-17 | HM 6-17 | HF 6-17 |
| OM 18-24 | OF 18-24 | BM 18-24 | BF 18-24 | HM 18-24 | HF 18-24 |
| OM 25-34 | OF 25-34 | BM 25-34 | BF 25-34 | HM 25-34 | HF 25-34 |
| OM 35-44 | OF 35-44 | BM 35-44 | BF 35-44 | HM 35-44 | HF 35-44 |
| OM 45-49 | OF 45-49 | BM 45-49 | BF 45-49 | HM 45-49 | HF 45-49 |
| OM 50-54 | OF 50-54 | BM 50-54 | BF 50-54 | HM 50-54 | HF 50-54 |
| OM 55+ | OF 55+ | BM 55+ | BF 55+ | HM 55+ | HF 55+ |

| OUTPUT | | | | | | |
|---|---|---|---|---|---|---|
| BHO MF 6-24 | | | | | | |
| | OM 25-44 | OF 25-44 | | | BH MF 25-44 | |
| | O MF 45-54 | | | | BH MF 45-55+ | |
| | OM 55+ | OF 55+ | | | | |

1505, 1510, 1515, 1520, 1525, 1530, 1535, 1540

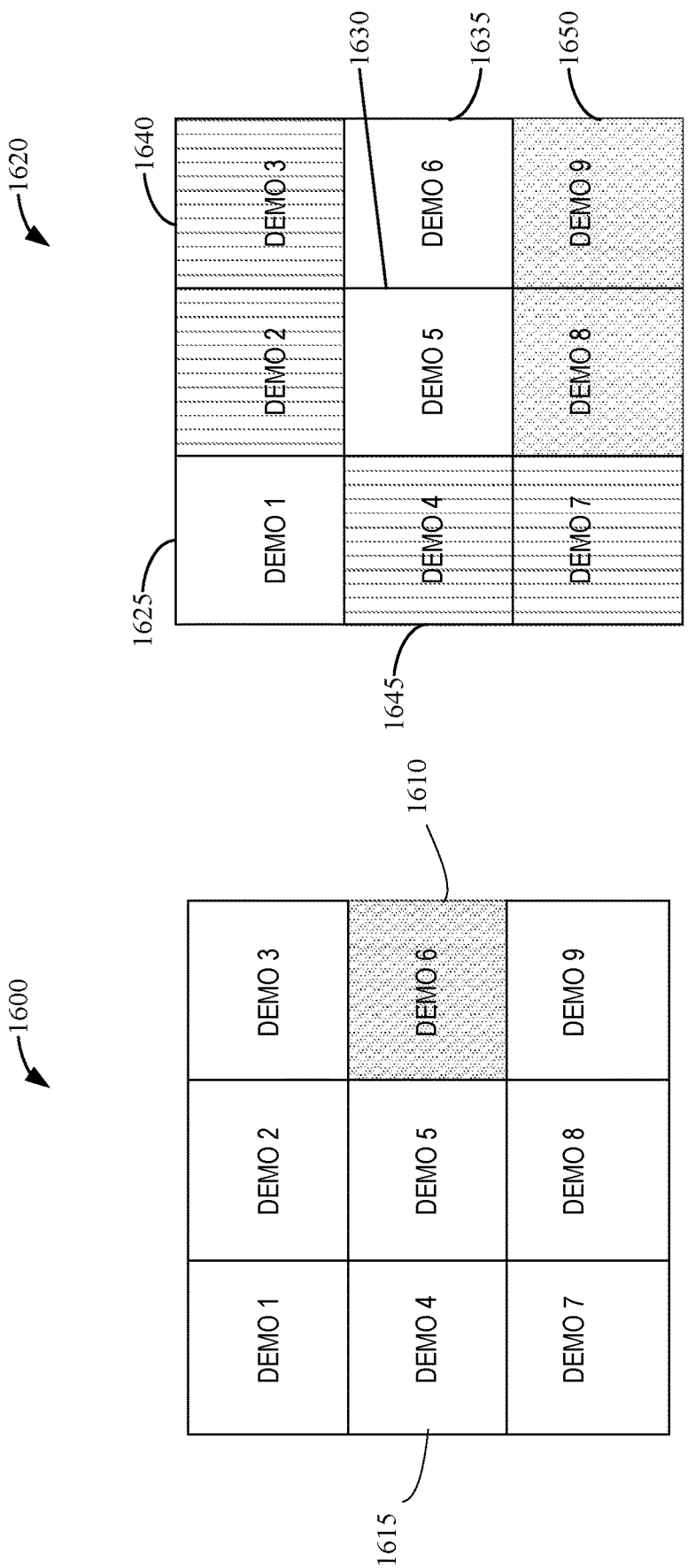

| PERSONS 12+ | | | | |
| --- | --- | --- | --- | --- |
| | | M-SU 6A-12M | | |
| | STATION | AVERAGE RATING | AVERAGE PERSONS | AVERAGE SHARE |
| 1 | WAAA-FM | 0.4 | 9,300 | 8.3 |
| 2t | WBBB-FM | 0.3 | 7,200 | 6.4 |
| 2t | WCCC-FM | 0.3 | 6,900 | 6.2 |
| 2t | WDDD-FM | 0.3 | 7,500 | 6.7 |
| 2t | WEEE-FM | 0.3 | 7,000 | 6.3 |
| 6t | WFFF-AM | 0.2 | 5,200 | 4.7 |
| 6t | WGGG-AM | 0.2 | 4,500 | 4.0 |
| 6t | WHHH-FM | 0.2 | 5,600 | 5.0 |
| 6t | WIII-FM | 0.2 | 5,300 | 4.7 |
| 10t | WJJJ-FM | 0.1 | 2,100 | 1.9 |
| 10t | WKKK-AM | 0.1 | 1,300 | 1.2 |
| 10t | WLLL-FM | 0.1 | 1,700 | 1.5 |
| 10t | WMMM-FM | 0.1 | 3,300 | 3.0 |
| 10t | WNNN-FM | 0.1 | 2,600 | 2.3 |
| 10t | WOOO-FM | 0.1 | 3,500 | 3.1 |
| 10t | WPPP-FM | 0.1 | 2,800 | 2.5 |
| 10t | WQQQ-FM | 0.1 | 2,500 | 2.2 |
| 18t | WRRR-FM STREAM | 0.0 | 700 | 0.6 |
| 18t | WSSS-AM | 0.0 | 100 | 0.1 |
| 18t | WTTT-FM HD2 | 0.0 | 600 | 0.5 |
| 18t | WUUU-FM HD3 | 0.0 | 300 | 0.3 |
| 18t | WVVV-FM HD2 | 0.0 | 0 | 0.0 |
| 18t | WWWW-FM HD3 | 0.0 | 0 | 0.0 |
| 18t | WXXX-FM HD2 | 0.0 | 0 | 0.0 |
| 18t | WYYY-FM HD3 | 0.0 | 0 | 0.0 |
| 18t | WZZZ-FM HD2 | 0.0 | 0 | 0.0 |
| | MARKET TOTAL | 4.7 | 111,800 | 100.0 |

FIG. 19

METHODS AND APPARATUS TO DETERMINE HEADPHONE ADJUSTMENT FOR PORTABLE PEOPLE METER LISTENING TO ENCODED AUDIO STREAMS

CROSS-REFERENCE TO RELATED APPLICATION(S)

This patent claims the benefit of U.S. Non-Provisional patent application Ser. No. 17/347,518, filed Jun. 14, 2021, which issued as U.S. Pat. No. 11,601,701, and which claims priority of U.S. Provisional Patent Application Ser. No. 63/039,410, filed on Jun. 15, 2020, and U.S. Provisional Patent Application Ser. No. 63/105,179, filed on Oct. 23, 2020. U.S. Non-Provisional patent application Ser. No. 17/347,518, U.S. Provisional Patent Application Ser. No. 63/039,410, and U.S. Provisional Patent Application Ser. No. 63/105,179 are hereby incorporated herein by reference in their entireties. Priority to U.S. Non-Provisional patent application Ser. No. 17/347,518, U.S. Provisional Patent Application Ser. No. 63/039,410, and U.S. Provisional Patent Application Ser. No. 63/105,179 is hereby claimed.

FIELD OF THE DISCLOSURE

This disclosure relates generally to audience measurement systems, and, more particularly, to methods and apparatus to determine headphone adjustment for portable people meter (PPM) listening to encoded audio streams.

BACKGROUND

Audience viewership data is collected and used by audience measurement entities (AMEs) to determine exposure statistics for different media. Some audience exposure data may be collected through device meters that detect media watermarks or media signatures associated with media presented via media presentation devices. Information from the device meters are processed by the AME to determine useful media exposure data and associated statistics.

BRIEF DESCRIPTION OF THE DRAWINGS

FIG. 6 is an example representation of headphone survey results collected by the headphone survey analyzer of FIG. 1 and/or FIG. 3.

FIG. 8A is an example representation of the streaming radio measurements recorded by a PPM and the streaming radio measurements determined by survey distributions from headphone survey results of FIGS. 7A and 7B.

FIG. 8B is an example algebraic representation of calculations for determining adjustments for the PPM data based on current PPM data and survey distribution data.

FIG. 9 is an example representation of resulting adjustments for PPM data.

FIG. 10 is an example representation of example scenarios of potential global lift factors.

FIG. 12 is an example representation of adjusting headphone demographic adjustment factors for respective demographic populations.

FIG. 13 is an example representation of an example mean difference table calculated by an example sample size determiner included in the example headphone survey adjuster of FIG. 1 and/or FIG. 4.

FIG. 14 is an example representation of the collapsing of the demographic groups by the example sample size determiner included in the example headphone survey adjuster of FIG. 1 and/or FIG. 4.

FIGS. 15A, 15B are example representations of example identified demographic groups output by the example sample size determiner included in the example headphone survey adjuster of FIG. 1 and/or FIG. 4.

FIGS. 16A, 16B are example representations of demographic group comparisons performed by the demographic group identifier included in the example headphone survey adjuster of FIG. 1 and/or FIG. 4.

FIG. 19 is an illustrative example of a result of the examples disclosed herein.

The figures are not to scale. In general, the same reference numbers will be used throughout the drawing(s) and accompanying written description to refer to the same or like parts.

Figure 1:
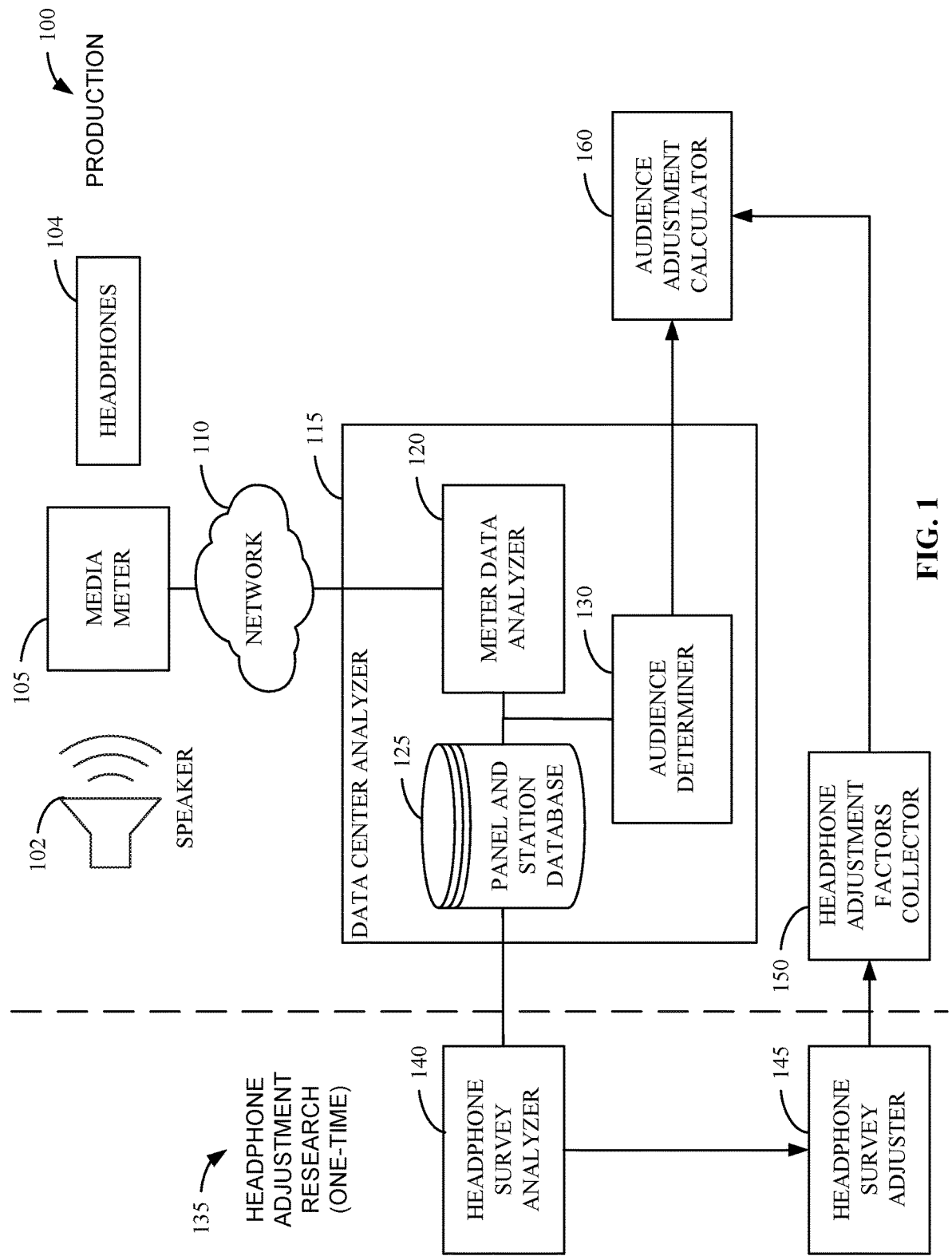
FIG. 1 is a block diagram of an example production environment and an example headphone adjustment research environment in which the teaching of this disclosure may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+1-1 second.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), tablet computers (e.g., an iPad®), digital media players (e.g., a Roku® media player, a Slingbox®, etc.), radios, etc.

Example methods, apparatus, and articles of manufacture disclosed herein collect media exposure data from various media devices. In some examples, media exposure data is aggregated to determine the media presented, determine audience ratings, determine streaming media from the Internet, and/or determine other types of media exposure information. In examples disclosed herein, media exposure data includes, but is not limited to, media identifying information (e.g., media-identifying metadata, codes, signatures, watermarks, and/or other information that may be used to identify presented media), and/or user-identifying information (e.g., demographic information, a user identifier, a panelist identifier, a username, etc.).

Example methods, apparatus, and articles of manufacture disclosed herein collect media exposure data from various media devices using a media meter. In examples disclosed herein, media exposure data is collected using a portable people meter (PPM). In some examples, the PPM is worn and/or carried by a user to passively capture encoded media continuously throughout the day. However, the PPM is only able to measure media that is listened to without the use of headphones. In some examples, the PPM is not able to collect encoded media that is consumed using a type of headphone. In some examples, the PPM media exposure data misses media exposure from headphone usage.

Example methods, apparatus, and articles of manufacture disclosed herein use a headphone survey to determine the missing media exposure from the PPM for headphone usage. In some examples, the headphone survey includes a manual diary for a user to report media by source, location, and headphone use. In such examples, the headphone survey includes self-reporting the previous day's listening data, which can be higher than the media exposure recorded by the PPM. In some examples, the user answers a series of questions about listening and headphone usage. However, the headphone survey only provides a small subset of media exposure information from a limited number of completed diaries. The headphone survey also allows a user to record any media exposure, which can include media that is not encoded for use in crediting media exposure.

Example methods, apparatus, and articles of manufacture disclosed herein use both the PPM system crediting and headphone survey results to determine missing media exposure from headphone usage. Example methods, apparatus, and articles of manufacture disclosed herein determine estimates for radio streaming (e.g., iHeart Radio, TuneIn Radio, etc.) that is listened to through the use of headphones.

In example methods, apparatus, and articles of manufacture disclosed herein, the headphone survey results are used to create a global lift factor that is applied to the encoded streaming station quarter-hour (QH) estimates from the PPM system. Examples disclosed herein eliminate the need for having metering devices (e.g., the PPM) coupled to the headphones during headphone listening. In some examples, the global lift factor is also differentiated for different demographic groups. For example, the headphone survey results may indicate that the age population from 18-34 use headphones the most when consuming streaming radio media. In some examples, the global lift factor is adjusted into headphone demographic adjustment factors to account for difference in headphone usage between different demographic groups. The example headphone demographic adjustment factors are developed to account for the headphone listening that the PPM does not capture. Example methods, apparatus, and articles of manufacture disclosed herein adjust the PPM audience estimates using the headphone demographic adjustment factors for each demographic group from the results of the headphone survey to correct ratings calculations for streaming radio media.

FIG. 1 is a block diagram of an example production environment 100 and an example headphone adjustment research environment 135 in which the teachings of this disclosure may be implemented. The example production environment 100 includes an example speaker 102, example headphones 104, an example media meter 105, an example network 110, an example data center analyzer 115, an example headphone adjustment factors collector 150, an example audience adjustment calculator 160. The example data center analyzer 115 includes an example meter data analyzer 120, an example panel and station database 125, and an example audience determiner 130. The example headphone adjustment research environment 135 includes an example headphone survey analyzer 140 and an example headphone survey adjuster 145.

In the illustrated example of FIG. 1, the example speaker 102 is an audio source for media presentation. In some examples, one or more individual people may be exposed to media (e.g., over the air (OTA) radio, streaming radio, etc.) on the example speaker 102. In some examples, the speaker 102 presents the media to the surrounding area of speaker 102. For example, if the example media meter 105 is in the surrounding area of the speaker 102, the speaker 102 presents the media to the media meter 105.

In the illustrated example of FIG. 1, the example headphones 104 is an audio source for media presentation. In some examples, the headphones 104 can be wired headphones (e.g., physically connected to a media device such as, a mobile device) and/or wireless headphones (e.g., not physically connected to the media device). In some examples, one or more individual people may be exposed to media (e.g., OTA radio, streaming radio, etc.) on the example headphones 104. In some examples, the headphones 104 present the media to the individual person wearing the headphones 104. For example, the headphones 104 may present the media to the individual wearing the headphones 104, but the headphone 104 will not present the media to the surrounding area (e.g., the media meter 105).

In the illustrated example of FIG. 1, the example media meter 105 collects media exposure data. In some examples, the media meter 105 is a portable people meter (PPM), a wearable media meter device, or any other type of media meter device to collect media exposure data. In such examples, the media meter 105 is carried by an individual person (a user). In some examples, the media meter 105 collects media exposure data in a surrounding area of the media meter 105. For example, if the example speaker 102 is in the surrounding area of the media meter 105, the media meter 105 collects the media exposure data from the media audio presented by the speaker 102. In some examples, the media meter 105 is unable to collect media exposure data from the example headphones 104 even when the headphones 104 are in the surrounding area of the media meter 105. In some examples, since the headphones 104 only present the media audio to an individual person (user) wearing the headphones 104, the headphones 104 do not present the media audio to the surrounding area (e.g., the media meter 105). In such examples, the media meter 105 is unable to collect any media exposure data from the headphones 104. In some examples, the media meter 105 includes a microphone to collect media exposure data from encoded audio streams (e.g., from the speaker 102). In some examples, broadcasting stations (e.g., for OTA radio, streaming radio, etc.) include encoded signatures and/or watermarks in the audio streams. In such examples, the example media meter 105 detects the encoded signatures and/or watermarks which are later used to determine media exposure (or at least part of the media exposure) for a user of the example media meter 105. However, other methods for the example media meter 105 to identify and collect media exposure data may additionally and/or alternatively be used. In some examples, the media meter 105 identifies media exposure for a user based on media audio presented in the surrounding area of the media meter 105 (e.g., from the speaker 102). In such examples, the media meter 105 does not identify media exposure for a user based on the media audio presented on the headphones 104.

In the illustrated example of FIG. 1, the example network 110 is a network used to transmit the media exposure data to the data center analyzer 115. In some examples, the network 110 can be the Internet or any other suitable external network. In other examples, any other type of networks (e.g., wireless, mobile cellular, etc.) which may be public or private, and any combination thereof may additionally and/or alternatively be used.

The example data center analyzer 115 is an execution environment used to implement the example meter data analyzer 120, the example panel and station database 125, and the example audience determiner 130. In some examples, the data center analyzer 115 is associated with a media monitoring entity. In some examples, the data center analyzer 115 can be implemented via a cloud service (e.g., AWS™, etc.). In this example, the data center analyzer 115 can further store and process listening reference data and meter media exposure data.

In the illustrated example of FIG. 1, the example meter data analyzer 120 processes the media exposure data collected by the example media meter 105. The example meter data analyzer 120 performs processing, cleaning, and editing on the media exposure data. For example, the meter data analyzer 120 can edit the media exposure data to remove any background audio that may have been collected by the media meter 105. In some examples, the meter data analyzer 120 compares the reference data (e.g., reference audio streams, reference audio signatures, reference audio watermarks, etc.) in the panel and station database 125 and the media exposure data (e.g., encoded audio streams, audio signatures, audio watermarks, etc.) from the media meter 105 to determine matches between the reference data and the media exposure data. For example, the meter data analyzer 120 can perform signature matching, watermark matching, etc. to identify matches between the reference data and media exposure data. In some examples, the meter data analyzer 120 provides the identified media from the media exposure data to the example audience determiner 130. An example implementation of the meter data analyzer 120 is described below in connection with FIG. 2.

In the illustrated example of FIG. 1, the example panel and station database 125 includes panelists' information and listening data created by or otherwise obtained by the example meter data analyzer 120 of FIG. 1. In some examples, the panel and station database 125 includes information about panelists associated with different PPM meters (e.g., the media meter 105 of FIG. 1). In some examples, the panelists' information includes geographic location and demographic information (e.g., age, race, gender, etc.). In some examples, the panel and station database 125 includes a history of listening data determined by the meter data analyzer 120. In some examples, the history of listening data is associated with panelists' information. For example, the listening data determined by the meter data analyzer 120 is associated with the information of the panelist associated with the media meter (e.g., media meter 105) that the listening data was obtained from.

In some examples, the panel and station database 125 includes reference audio streams, reference audio signatures, and/or reference audio watermarks to identify media from the encoded audio streams, audio signatures, audio watermarks, etc. analyzed and compared by the data center analyzer 115. In examples disclosed herein, the reference audio streams, reference audio signatures, and/or reference audio watermarks are generated in the same or similar manner as the encoded audio streams, audio signatures, audio watermarks such that the reference audio streams, reference audio signatures, and/or reference audio watermarks and the encoded audio streams, audio signatures, audio watermarks for the same audio would match. In some examples, reference audio streams, reference audio signatures, and/or reference audio watermarks stored in the panel and station database 125 are associated with a particular reference media, such as, but not limited to, a radio broadcast, a song, an advertisement, a radio station, etc. In some examples, the panel and station database 125 can include a library (e.g., database, table, etc.) of the reference audio streams, reference audio signatures, and/or reference audio watermarks. In some examples, the panel and station database 125 includes radio station identification information (e.g., station signature codes) that are included in the media of radio broadcasts.

In the illustrated example of FIG. 1, the example audience determiner 130 credits media exposure data and calculates audience estimates for exposure to media based on the media exposure data processed, cleaned, and edited by the example meter data analyzer 120. In some examples, the audience determiner 130 calculates audience estimates for exposure to streaming media using the PPM streaming radio media exposure data from the meter data analyzer 120. In some examples, the audience determiner 130 obtains information about the panelists (e.g., PPM panel data) such as, demographic information (e.g., age, race, gender, etc.), and listening data (associated with panelists' information). In some examples, the audience determiner 130 obtains reference data (e.g., reference audio streams, reference audio signatures, reference audio watermarks, etc.) associated with different audio media identified by the meter data analyzer 120 to use in crediting incoming media exposure data from the media meter 105 (e.g., encoded audio streams, audio signatures, audio watermarks, etc.). In some examples, audience determiner 130 obtains the PPM panel data from the example panel and station database 125.

In the illustrated example of FIG. 1, the example audience determiner 130 performs PPM service crediting of audience estimates based on the meter measurements from the meter data analyzer 120 and the PPM panel data from the panel and station database 125. In some examples, the audience determiner 130 receives the media exposure data (e.g., encoded audio streams, audio signatures, audio watermarks, etc.) of the meter measurements from the example meter data analyzer 120. In some examples, the audience determiner 130 performs PPM service crediting on the edited media exposure data. In some examples, the audience determiner 130 receives reference data (e.g., reference audio streams, reference audio signatures, reference audio watermarks, etc.) from the panel and station database 125. In some examples, the audience determiner 130 performs PPM service crediting on the media exposure data using the reference data from the panel and station database 125. In some examples, when the meter data analyzer 120 identifies a match between the reference data and the media exposure data and transmits the information to the audience determiner 130, the audience determiner 130 credits the media associated with the reference data (e.g., a radio broadcast, a radio stream, a song, a television episode, etc.).

In some examples, the audience determiner 130 performs PPM calculation of audience estimates for the media exposure data. After the meter data analyzer 120 processes, cleans, and edits media for the media exposure data, the audience determiner 130 generates audience estimate data based on the edited results. In some examples, the audience determiner 130 identifies the panelist information associated with the media meter 105 to include in the audience estimate data. In some examples, the audience determiner 130 credits the media by associating the media exposure data and the panelist information as audience listening data for the media. In some examples, the audience determiner 130 collects the listening data from the panel and station database 125 to determine the total audience listening data for a period of time for the media. In some examples, the audience determiner 130 estimates the audiences for different media (e.g., a radio broadcast, a radio stream, a song, a television episode, etc.) based on its crediting of the media exposure data collected by the media meter 105. In some examples, the audience estimates identify a count of listeners for the media (e.g., how many individuals were listening to a radio broadcast for a period of time) and associated panelist information (e.g., demographic information) for the audience. In some examples, the audience determiner 130 generates a report including data metrics of the streaming radio listeners.

The example headphone survey analyzer 140 conducts surveys on former PPM panelists to determine headphone usage during media exposure. In the illustrated example of FIG. 1, the headphone survey analyzer 140 obtains PPM panelists' data from the panel and station database 125. In some examples, the headphone survey analyzer 140 may obtain data from the panel and station database 125 periodically (e.g., once a month, once a year, etc.). In some examples, the headphone survey analyzer 140 identifies and analyzes the survey data. In some examples, the headphone survey analyzer 140 determines media exposure from headphones (similar to the example headphones 104) based on the survey data. The example headphone survey analyzer 140 performs headphone survey crediting on the survey data. An example implementation of the headphone survey analyzer 140 is described below in connection with FIG. 3.

In the illustrated example of FIG. 1, the headphone survey adjuster 145 determines the amount of global lift needed for the PPM panel crediting to account for headphone listening based on the headphone survey crediting results from the headphone survey analyzer 140. In some examples, the determined global lift does not account for different demographic populations. In the illustrated example, the example headphone survey adjuster 145 determines headphone demographic adjustment factors by demographic segments based on historical data pulled from the panel and station database 125 and the headphone survey results of the example headphone survey analyzer 140. The example headphone survey adjuster 145 determines the headphone demographic adjustment factors based on the global lift and based on the proportion of headphone usage for different demographic groups as determined by the survey results from the example headphone survey analyzer 140. In some examples, the headphone demographic adjustment factors are constrained by the global lift, where the headphone demographic adjustment factors equate to a distribution of the global lift. An example implementation of the headphone survey adjuster 145 is described below in connection with FIG. 4.

In the illustrated example of FIG. 1, the example headphone adjustment factors collector 150 collects the headphone demographic adjustment factors from the headphone survey adjuster 145. In some examples, the headphone adjustment factors collector 150 provides the headphone demographic adjustment factors to the example audience adjustment calculator 160. An example illustration of the headphone demographic adjustment factors obtained by the headphone adjustment factors collector 150 are illustrated in the example FIG. 18.

In the illustrated example of FIG. 1, example the audience adjustment calculator 160 applies the headphone demographic adjustment factors to existing PPM radio streams' estimates. In some examples, the audience adjustment calculator 160 collects the PPM streaming radio data from the example audience determiner 130 of FIG. 1 and identifies the listeners to the PPM audience estimates with demographic information matching any of the unique demographic adjustment groups identified by the headphone adjustment factors collector 150. In some examples, the audience adjustment calculator 160 applies the respective headphone demographic adjustment factors to PPM audience estimates aligned with demographic information matching the unique demographic adjustment groups.

In the illustrated example of FIG. 1, the example audience adjustment calculator 160 adjusts, or refines, audience estimates data based on the headphone demographic adjustment factors, as pulled from the headphone adjustment factors collector 150. In some examples, the audience adjustment calculator 160 identifies the panelist information associated with the audience estimates from the audience determiner 130 to use in adjusting the audience estimates. In some examples, the audience adjustment calculator 160 adjusts, or refines, the audiences for different media (e.g., a radio broadcast, a radio stream, a song, a television episode, etc.) based on the crediting of the media exposure data collected by the media meter 105. In some examples, the audience estimates identify a count of listeners for the media (e.g., how many individual were listening to a radio broadcast for a period of time) and associated panelist information (e.g., demographic information) for the audience. In some examples, the audience adjustment calculator 160 generates a report including the adjusted audience estimates of the streaming radio listeners. In some examples, the report may be presented to media providers (e.g., radio broadcasters) for crediting streaming radio with having been exposed to listener(s).

Figure 2:
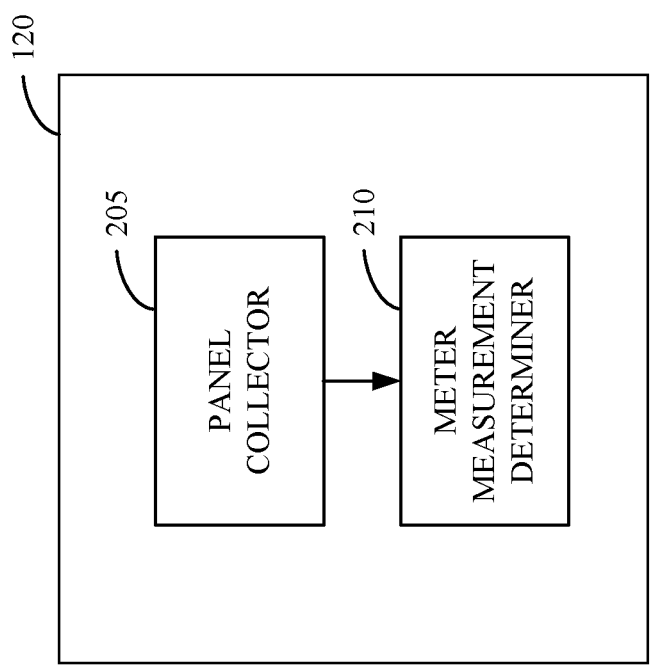
FIG. 2 is a block diagram of an example implementation of a meter data analyzer 120 included in the example production environment of FIG. 1.

FIG. 2 is a block diagram illustrating an example implementation of the example meter data analyzer 120 of FIG. 1. The example meter data analyzer 120 of FIG. 2 includes an example panel collector 205 and an example meter measurement determiner 210.

In the illustrated example of FIG. 2, the example panel collector 205 obtains portable people meter (PPM) data from the media meter 105. In some examples, the panel collector 205 obtains media exposure data, time data, and location data from the media meter 105. In some examples, the example panel collector 205 collects media exposure data from the media meter 105 such as, encoded audio streams, audio signatures, audio watermarks, etc. from audio data collected by the media meter 105. In some examples, the panel collector 205 collects time data from the media meter 105 (e.g., timestamps associated with the time at which the media meter 105 detected the media exposure data). In some examples, the panel collector 205 collects location data from the media meter 105 (e.g., the location at which the media meter 105 detected the media exposure data). The example panel collector 205 provides the media exposure data, the time data, and the location data from the media meter 105 to the example meter measurement determiner 210.

In the illustrated example of FIG. 2, the example meter measurement determiner 210 determines meter measurements from the audio data collected by the example media meter 105. In some examples, the example meter measurement determiner 210 receives media exposure data from the example panel collector 205 that includes the audio data collected by the example media meter 105. In some examples, the meter measurements determiner 210 parses the media exposure data to identify the encoded audio streams, audio signatures, audio watermarks, etc. In some examples, the media meter 105 collects audio data for a continuous amount of time. In such examples, the media meter 105 collects audio data that may not include media exposure data. In such examples, the audio data from the example panel collector 205 may include audio data not associated with media (e.g., background noise, conversation, etc.). In some examples, the meter measurement determiner 210 identifies the media exposure data associated with media to determine the meter measurements from the audio data collected by the media meter 105. In the illustrated example, the meter measurement determiner 210 provides the identified media exposure data to the audience determiner 130 of FIG. 1 for the audience determiner 130 to determine audience estimates from the meter measurements.

Figure 3:
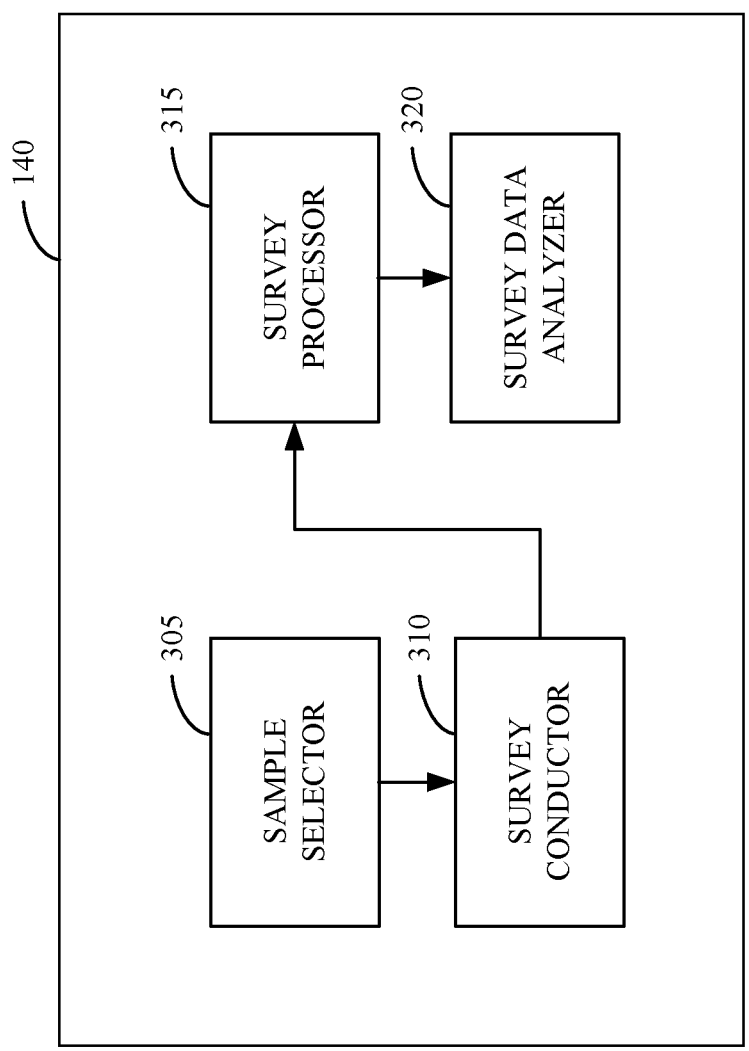
FIG. 3 is a block diagram of an example implementation of a headphone survey analyzer included in the example headphone adjustment research environment of FIG. 1.

FIG. 3 is a block diagram illustrating an example implementation of the example headphone survey analyzer 140 of FIG. 1. The example headphone survey analyzer of FIG. 3 includes an example sample selector 305, an example survey conductor 310, an example survey processor 315, and an example survey data analyzer 320.

In the illustrated example of FIG. 3, the example sample selector 305 identifies a sample of former PPM panelists. In some examples, the sample selector 305 collects information of former PPM panelists from the panel and station database 125 of FIG. 1. In examples disclose herein, former PPM panelists are identified as individuals (panelists) that previously agreed to wear the PPM (e.g., the media meter 105 of FIG. 1) to provide media exposure data to the example data center analyzer 115 of FIG. 1. The sample selector 305 identifies a sample of the former PPM panelists and provides the identified sample to the survey conductor 310.

In the illustrated example of FIG. 3, the example survey conductor 310 performs an online survey on the sample of former PPM panelists identified by the example sample selector 305. In some examples, the survey conductor 310 performs an online headphone survey to determine information regarding headphone use when listening to media. In some examples, the headphone survey is a series of questions about the types of audio that the former PPM panelists listen to and whether or not headphones are used when listening to the audio. In some examples, the headphone survey includes "close ended" and "open ended" questions. In some examples, the "close ended" questions may be behavioral questions about audio listening and headphone usage, and the "open ended" questions may be listening diary entries that former PPM panelists record based on the previous day's audio listening. In other examples, the "close ended" questions may be listening diary entries, and the "open ended" questions may be behavioral questions about audio listening and headphone usage. The headphone survey may include any combination of types of questions to determine information regarding headphone use when listening to media. In the illustrated example, the headphone survey is a recall from a previous day and not a passive electronic measurement like the PPM (e.g., the media meter 105 of FIG. 1). In some examples, the survey conductor 310 obtains the demographic information of the sample of former PPM panelists from the sample selector 305 obtained from the panel and station database 125 of FIG. 1 to associate the headphone survey results with demographic information.

In the illustrated example of FIG. 3, the example survey processor 315 performs data cleaning on the data of the survey from the example survey conductor 310. In some examples, the survey processor 315 performs data cleaning on the headphone survey data by removing any incomplete entries/answers from former PPM panelists. In some examples, the survey processor 315 performs data cleaning on the headphone survey data by identifying missing information in any entries from the former PPM panelists. For example, the survey processor 315 identifies any entries from the headphone survey data that are missing demographic information, and the survey processor 315 associates panel demographic information with the entries from the headphone survey data. In some examples, the survey processor 315 groups related answers from the sample of former PPM panelists. For example, the headphone survey includes the same questions for each of the former PPM panelists. The survey processor 315 organizes the data from the headphone survey and compiles the listening entries provided by the former PPM panelists. The example survey processor 315 performs crediting on the data of the survey from the example survey conductor 310 after data cleaning. In some examples, the survey processor 315 identifies media associated with the listening entries from the sample of former PPM panelists, and credits the media with quarter hour (QH) of listening to the media, audience estimates, etc. based on the headphone survey data.

In the illustrated example of FIG. 3, the example survey data analyzer 320 determines the proportions of radio listening with and without headphones from the survey data. In some examples, the survey data analyzer 320 identifies distributions in the headphone survey data relating to type of listening, headphone usage, etc. In some examples, the survey data analyzer 320 determines proportions of listening with and without headphones for different types of radio listening. In some examples, the survey data analyzer 320 determines these proportions with respect to the total radio listening data from the headphone survey data. In some examples, the survey data analyzer 320 includes at least one person (e.g., an analyst) determining the proportions of radio listening with and without headphones from the survey data. Examples of the survey data analyzer 320 determining listening data proportions from the headphone survey data are described in further detail below in connection with FIGS. 6 and 7A.

Figure 4:
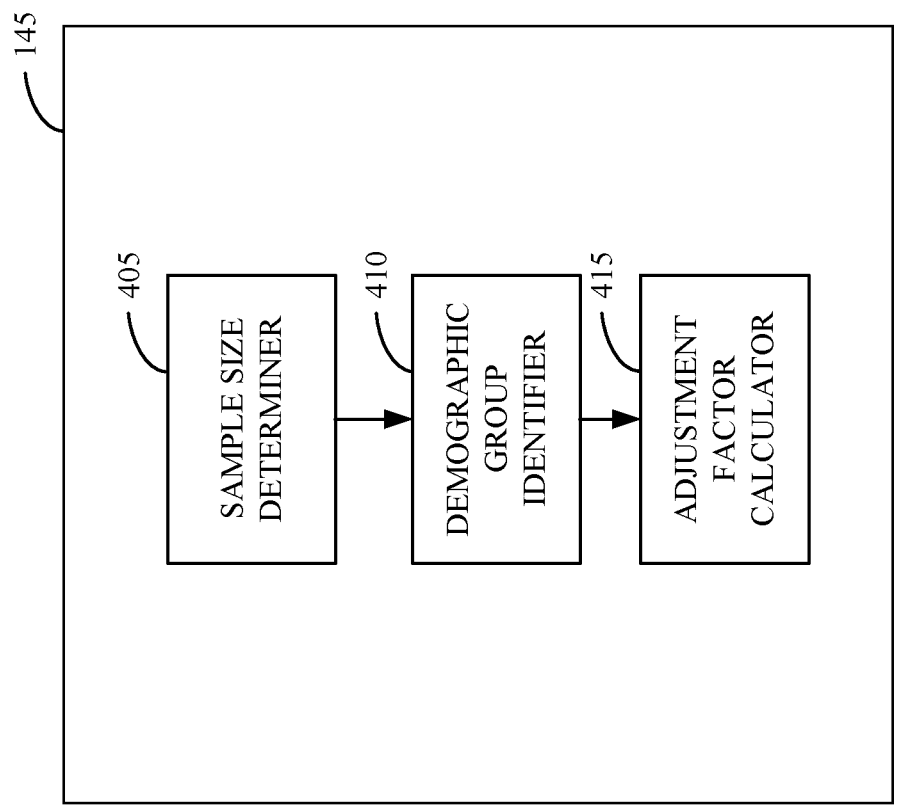
FIG. 4 is a block diagram of an example implementation of a headphone survey adjuster included in the example headphone adjustment research environment of FIG. 1.

FIG. 4 is a block diagram of an example implementation of the headphone survey adjuster 145 included in the example headphone adjustment research environment 135 of FIG. 1. The example headphone survey adjuster 145 of FIG. 4 includes an example sample size determiner 405, an example demographic group identifier 410, and an example adjustment factor calculator 415.

In the illustrated example of FIG. 4, the example sample size determiner 405 obtains the headphone survey data from the headphone survey analyzer 140 of FIG. 1. In some examples, the sample size determiner 405 identifies demographic groups from the demographic segments that meet a sample size threshold. For example, the sample size threshold can be 30 samples, 50 samples, etc. In some examples, the sample size determiner 405 selects each of the demographic segments and compares the sample size of the demographic segment to the sample size threshold. In some examples, if the sample size determiner 405 determines that the sample size of the demographic segment does not satisfy (e.g., does not meet or exceed) the sample size threshold, then the sample size determiner 405 collapses/combines the demographic segment with a neighboring demographic segment to create a demographic group. In examples disclosed herein, a neighboring demographic segment is a demographic segment that is similar in demographic information (e.g., at least one of age, gender, and race) but mutually exclusive from the demographic segment. In the illustrated example, the sample size determiner 405 calculates a mean difference table, which is ordered by ascending differences between potential demographic segments and their potential neighboring demographic segments, as described in further detail below in connection with FIG. 13. In the illustrated example, the potential demographic segments and their potential neighboring demographic segments can be referred to as comparison pairs.

The example sample size determiner 405 identifies the identity of the demographics of a given demographic segment (e.g., the age, gender, race, etc.). In some examples, the table of mean differences includes the identities of demographics. In the illustrated example, if the demographic row in the mean difference table that is associated with the identity of the given demographic segment is applicable, then the given demographic segment is collapsed and/or combined with a neighboring demographic segment based on the comparison pair (the given demographic segment and a neighboring demographic segment) with the least mean difference. In the illustrated example, if the demographic row in the mean difference table that is associated with the identity of the given demographic segment is not applicable, then the next demographic row in the mean difference table is checked for a different comparison pair with the least mean difference. In some examples, the sample size determiner 405 compares all of the demographic segments to the sample size threshold until all demographic groups have been evaluated. In examples disclosed herein, a demographic group includes demographic segment(s) that are related in demographic information (e.g., as least one of age, gender, and race) that has a sample size that satisfies the sample size threshold. In some examples, the demographic segments(s) included in the demographic group are subcategories of the demographic information included in the demographic group. For example, a demographic group including all samples in the same age range, a demographic segment included in the demographic group includes subcategory information (e.g., race, gender) in addition to the related age range. Examples of the sample size determiner 405 creating demographic groups is described in further detail below in connection with FIG. 14.

In the illustrated example of FIG. 4, the example demographic group identifier 410 identifies the demographic groups from the sample size determiner 405. In some examples, the demographic group identifier 410 receives the demographic groups from the sample size determiner 405 that consist of different demographic segments. In some examples, the demographic group identifier 410 combines the data of the demographic segments to create the data for the demographic group. In some examples, the demographic group identifier 410 associates the demographic group with identifiers that signify what demographic segments were combined to create the demographic group. Examples of the demographic group identifier 410 identifying the demographic groups is described in further detail below in connection with FIGS. 15A and 15B.

In the illustrated example of FIG. 4, the example demographic group identifier 410 identifies significantly different demographic groups among the groups output by the example sample size determiner 405. In some examples, the demographic group identifier 410 calculates statistical significance values for the demographic groups. For example, the demographic group identifier 410 calculates p values as the statistical significance values using t-tests, however, other statistical comparisons may alternatively be used. However, other values indicative of statistical significance can alternatively be used. In some examples, the statistical significance values are illustrative of differences in headphone usage behavior among different demographic groups. For example, the headphone usage information for a demographic group is compared to entire headphone usage information from all of the other demographic groups to determine the statistical significance value for the difference between the demographic group and all of the other demographic groups. In some examples, the demographic group identifier 410 determines if each of statistical significance values for the demographic groups (compared to all other demographic groups) satisfy a threshold for statistical difference. For example, the threshold for statistical difference can be a p value of 0.05, 0.1, etc. In some examples, if the demographic group identifier 410 determines the statistical significance value for a demographic group (compared to all other demographic groups) satisfies (e.g., is below) the threshold for statistical difference, the demographic group is identified as statistically different from all of the other demographic groups. In some examples, the demographic group identifier 410 identifies the demographic groups with statistical significance values (compared to all other demographic groups) that satisfy the threshold for statistical difference as unique demographic adjustment groups.

In some examples, the demographic group identifier 410 identifies any remaining demographic groups with statistical significance values (compared to all other demographic groups) that did not satisfy the threshold to determine if any of the remaining demographic groups are similar to each other. The demographic groups that did not satisfy the threshold are placed in a new list (e.g., a not-different-from-all-peers list). In some examples, the demographic group identifier 410 compares the demographic groups in the not-different-from-all-peers list to determine if demographic groups are similar to each other. In some examples, the demographic group identifier 410 calculates statistical significance values for each of the demographic groups in the not-different-from-all-peers list for each comparison to each of the other demographic groups in the not-different-from-all-peers list. For example, the demographic group identifier 410 calculates several statistical significance values for a first demographic group in the not-different-from-all-peers list, where each statistical significance value is based on the comparisons between the first demographic group to each of the other demographic groups in the not-different-from-all-peers list. In some examples, the demographic group identifier 410 calculates the statistical significance values for the two demographic groups being compared using the headphone usage data of the two individual demographic groups (instead of the headphone usage information from all of the other demographic groups as described above). In some examples, the statistical significance values are illustrative of differences in headphone usage behavior between the first demographic group and the second demographic group. In some examples, the demographic group identifier 410 determines if the statistical significance values for the demographic groups satisfy a threshold. For example, the threshold for statistical difference can be a p value of 0.5, 0.1, etc. In some examples, if the demographic group identifier 410 determines the statistical significance value comparing a demographic group and the other demographic groups in the not-different-from-all-peers list satisfies (e.g., meets and/or exceeds) the threshold, the demographic group is identified as statistically similar to the comparison demographic group(s). In some examples, the demographic group identifier 410 identifies the demographic groups with statistical significance values that satisfy the threshold as being included in the same unique demographic adjustment group. In some examples, the demographic group identifier 410 identifies the demographic groups with statistical significance values that do not satisfy the threshold as being separate unique demographic adjustment groups. Examples of the demographic group identifier 410 identifying significantly different demographic groups is described in further detail below in connection with FIGS. 16A, 16B, 17A, and 17B.

In the illustrated example of FIG. 4, the example adjustment factor calculator 415 calculates the adjustment factors and the amount of global lift needed based on the survey data and historical PPM data. In some examples, the adjustment factor calculator 415 examines the proportions of streaming radio listening from the headphone survey results. In some examples, the adjustment factor calculator 415 identifies a ratio estimation of the proportions of listening to streaming radio with headphones and listening to streaming radio without headphones from the headphone survey. In some examples, the resulting ratio from the ratio estimation is used by the adjustment factor calculator 415 to determine the overall global lift factor. In some examples, the global lift factor identifies a lift to be applied to the PPM data to account for streaming radio listening data that was not captured by the PPM (media meter 105 of FIG. 1) because of headphone usage. In some examples, the adjustment factor calculator 415 uses historical PPM data to fine-tune the amount of global lift needed. In the illustrated example, the adjustment factor calculator 415 obtains the proportion of historical streaming media usage for a given demographic group from the example panel and station database 125 of FIG. 1. Examples of the adjustment factor calculator 415 determining a global lift factor are described in further detail below in connection with FIGS. 7B, 8B, 9, and 10.

In the illustrated example of FIG. 4, the example adjustment factor calculator 415 calculates headphone demographic adjustment factors for the unique demographic adjustment groups identified by the demographic group identifier 410. In some examples, the adjustment factor calculator 415 uses the global lift factor, and the proportion of headphone usage for a given demographic group as measured in the survey to determine the headphone demographic adjustment factors. In the illustrated example, the adjustment factor calculator 415 obtains the proportion of headphone usage for a given demographic group from the example headphone survey analyzer 140 of FIG. 1. In some examples, the headphone demographic adjustment factors are constrained by the global lift factor. In some examples, the adjustment factor calculator 415 distributes the global lift factor into headphone demographic adjustment factors for each of the unique demographic adjustment groups identified as statistically different. Examples of the adjustment factor calculator 415 calculating the headphone demographic adjustment factors is described in further detail below in connection with FIG. 18.

Figure 5:
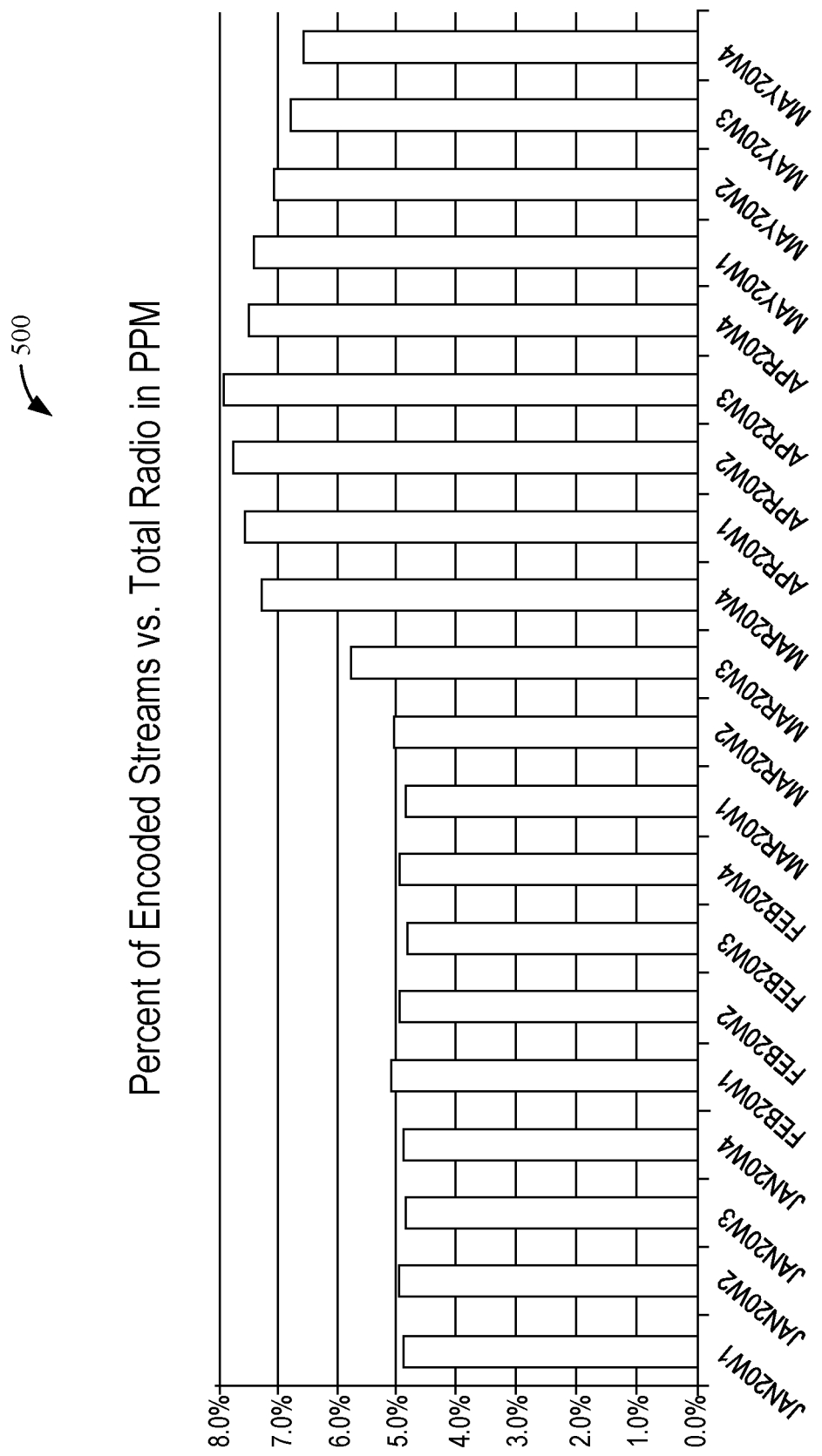
FIG. 5 is an example representation of percentages of streaming radio compared to the total radio data recorded by a portable people meter (PPM).

FIG. 5 is an example representation of percentages of streaming radio compared to the total radio data recorded by a PPM (e.g., the example media meter 105 of FIG. 1). The example Graph 500 represents example radio data measurements from the example media meter 105 of FIG. 1. The example Graph 500 represents example percentages of historical streaming radio media data collected by the example media meter 105 over a five-month time period. The example Graph 500 illustrates that streaming radio measurements collected by the example media meter 105 were, on average, during this time period, approximately 6% of the total radio data collected by the example media meter 105 during the example time period.

FIG. 6 is an example representation of the headphone survey results collected by the headphone survey analyzer 140 of FIG. 1 and/or FIG. 3. The example Table 600 includes survey results from the example survey conductor 310 included in the example headphone survey analyzer 140 of FIG. 3. The example Table 600 represents example percentages of survey respondents using headphones while listening to radio media. The example Table 600 is generated based on the responses recorded by the example survey conductor 310. In the illustrated example, Table 600 includes percentages of survey respondents using headphones for example over the air (OTA) radio 605 and example internet (streaming) radio 610. Table 600 includes example total radio 615, which is the combined measurements of the OTA radio 605 and the internet radio 610. The example Table 600 includes measurements of the survey respondent's answers of either "no" (headphones were not used for radio listening) or "yes" (headphones were used for radio listening) for the OTA radio 605 and the internet radio 610. Table 600 divides the "yes" response further to determine survey respondent's answers to whether wired headphones or wireless headphones were used for radio listening for the OTA radio 605 and the internet radio 610. In the example Table 600, the total radio 615 illustrates the combined results of the survey respondent's answers for the OTA radio 605 and the internet radio 610.

The survey results included in Table 600 were collected from former PPM panelists identified by the example sample selector 305 of FIG. 3. The example Table 1 below represents the example information collected by the example survey conductor 310 from the sample of former PPM panelists identified as potential survey respondents (e.g., survey invitees) by the example sample selector 305. The information included in the example Table 1 below is based on an example 6,000 panelists identified as actual survey respondents by the survey processor 315 that completed the survey conducted by the survey conductor 310.

TABLE 1

| Item | Count |
| --- | --- |
| Survey respondents | 5,406 |
| Respondents with any type of listening, radio measured and non-radio | 4,500 |
| Respondents with QH of listening to radio (measured) | 2,438 |
| Episodes listening to radio (measured) | 4,493 |
| QH of listening to radio (measured); (weighted value) | 42,867 |

In Table 1 above, the number of survey respondents is identified as 5,406, which illustrated that of the approximately 15,000 survey invitees, only 5,406 of those replied to the survey with sufficiently complete information to qualify as survey respondents. In Table 1 above, the number of survey respondents, of those 5,406 survey respondents identified, that have listening entries collected by the survey conductor 310 is identified as 4,500 respondents. Table 1 includes the number of respondents of the survey respondents, of those 4,500 with listening entries, that have quarter hour (QH) measurements of radio listening is identified as 2,438 respondents. Table 1 also identifies the number of radio listening entries collected by the survey conductor 310 as 4,493 listening episodes. The example Table 1 above further includes the measured QH of listening to radio for the 2,438 survey respondents, which is identified as 42,867 QH. However, the measured QH of listening to radio is the result of the example survey processor 315 applying weightings to the survey results collected by the survey conductor 310. In some examples, the survey conducted by the survey conductor 310 may oversample panelists identified in specific demographic groups that have high incidence of likely streaming radio and using headphones for listening (e.g., 18-34 year-olds). The survey results collected by the survey conductor 310 are weighted to represent the population in light of the oversampling. Table 2 below illustrates example weights that may be applied to the survey results.

TABLE 2

| Age Group | Balancing Factor (Weight) |
| --- | --- |
| 13-17 | 1.49 |
| 18-34 | 0.71 |
| 35-54 | 1.09 |
| 55+ | 1.21 |

In the illustrated example of FIG. 6, the survey results of Table 600 are based on the 2,438 survey respondents with radio listening, who reported 4,493 radio listening entries comprised of 42,867 weighted QH of listening to radio. The example Table 600 illustrates that out of the total radio listening, only 1.9% is OTA radio listening using headphones (1.1% using wired headphones and 0.8% using wireless headphones). Table 600 illustrates that out of the total radio listening, 7.5% is internet radio listening using headphones (3.5% using wired headphones and 4.0% using wireless headphones). Table 600 illustrates that of the total radio listening, regardless of whether radio listening was OTA or via Internet, only 9.4% is radio listening using headphones (4.6% using wired headphones and 4.8% using wireless headphones). The survey results illustrated in Table 600 from the example headphone survey analyzer 140 of FIG. 1 are used by the example headphone survey adjuster 145 to determine the global lift factor for the streaming station QH estimates.

Figure 7B:
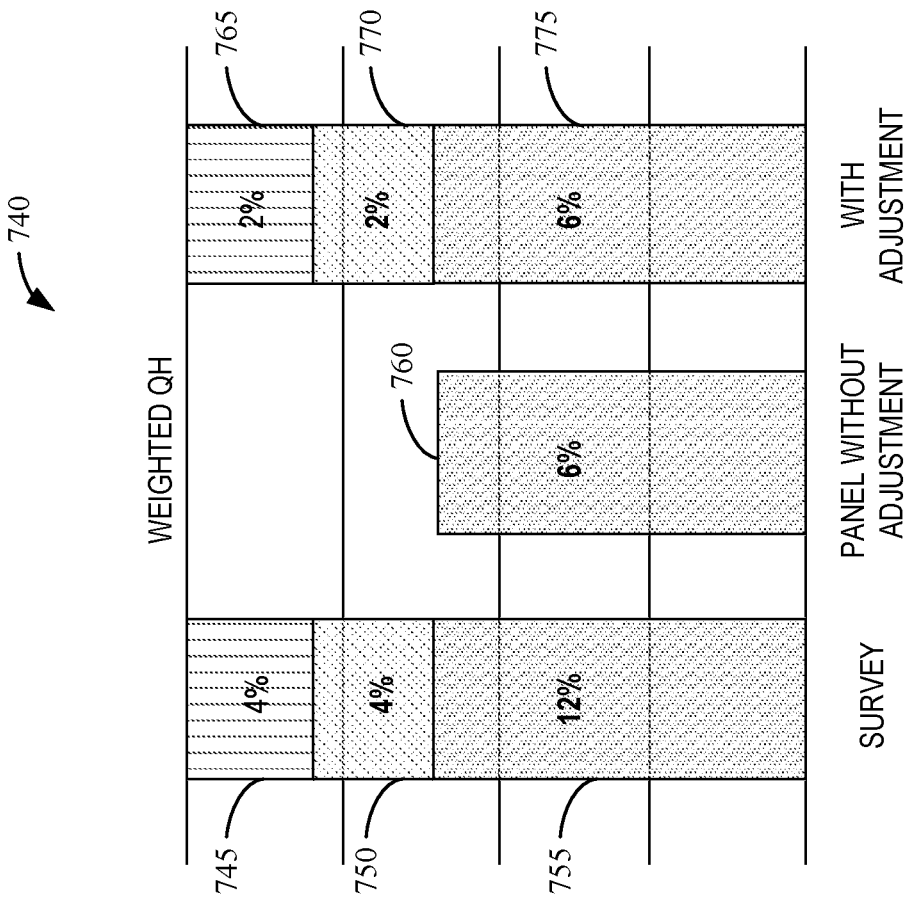
FIG. 7B is an example representation of example distribution of headphone listening to streaming radio based on the survey distributions of FIG. 7A, an example measurement of listening to streaming radio without headphones as measured in the panel before the adjustment, and an example of the adjustment applied to the panel.
Figure 7A:
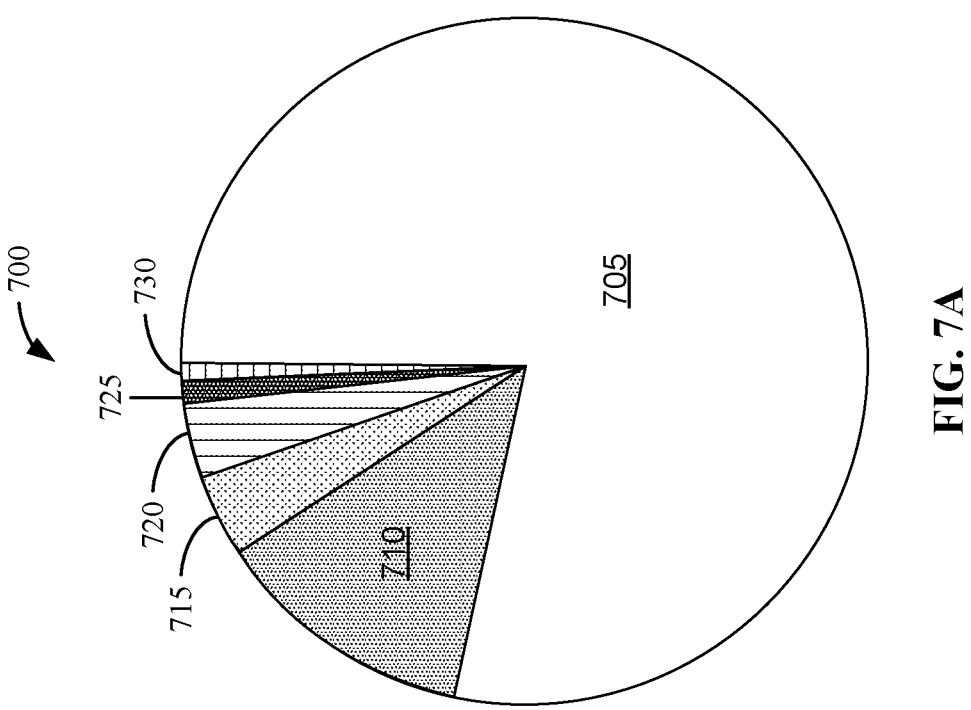
FIG. 7A is an example representation of survey distributions of quarter hour (QH) radio listening based on the survey results of FIG. 6.

FIG. 7A is an example representation of survey distributions of QH of radio listening by headphones based on the survey results of Table 600 of FIG. 6. The example Graph 700 of FIG. 7A includes the survey distributions illustrated in the example Table 600. The Graph 700 includes example OTA radio with no headphones 705, example streaming (internet) radio with no headphones 710, example streaming radio with wireless headphones 715, example streaming radio with wired headphones 720, example OTA radio with wired headphones 725, and example OTA radio with wireless headphones 730. The Graph 700 illustrates the distributions of each of the OTA radio with no headphones 705, the streaming radio with no headphones 710, the streaming radio with wireless headphones 715, the streaming radio with wired headphones 720, the OTA radio with wired headphones 725, and the OTA radio with wireless headphones 730 in comparison to the total radio listening. In the Graph 700, the OTA radio with no headphones 705 is 78.3% of the total radio listening identified in the survey results. The streaming radio with no headphones 710 is 12.3% of the total radio listening identified in the survey results. In Graph 700, streaming radio with wireless headphones 715 is 4.0% of the total radio listening identified in the survey results. The streaming radio with wired headphones 720 is 3.5% of the total radio listening identified in the survey results. The OTA radio with wired headphones 725 is 1.1% of the total radio listening identified in the survey results. In Graph 700, the OTA radio with wireless headphones 730 is 0.8% of the total radio listening identified in the survey results.

FIG. 7B is an example representation of example distribution of headphone listening to streaming radio based on the survey distributions of FIG. 7A, an example measurement of listening to streaming radio without headphones as measured in the panel before the adjustment, and an example of the adjustment applied to the panel. In the illustrated example of FIG. 7B, the example Graph 740 includes an example rounded survey wireless headphones measurement 745, an example rounded survey wired headphones measurement 750, an example rounded survey no headphones measurement 755, an example "panel without adjustment" (representative of the panel as it was measured before the headphone survey adjustment factors were applied) no headphone measurement 760, and example "with adjustment" (representative of the panel as it is measured with the headphone survey adjustment factors applied) no headphone measurement 775, an example "with adjustment" wireless headphone estimate 765, and an example "with adjustment" wired headphone estimate 770. In the illustrated example of FIG. 7B, Graph 740 includes rounded data of the survey distributions of FIG. 7A for ease of illustration.

In the illustrated example of FIG. 7B, the survey wireless headphones measurement 745 illustrates the example streaming radio with wireless headphones 715 of FIG. 7A, the survey wired headphones measurement 750 illustrates the example streaming radio with wired headphones 720 of FIG. 7A, and the survey no headphones measurement 755 illustrated the example streaming radio with no headphones 710 of FIG. 7A. In the example Graph 740, the example measurements have been rounded for simplified explanation. For example, the example streaming radio with wired headphones 720 of FIG. 7A is 3.5% and the survey wired headphones measurement 750 is 4.0%. In the illustrated example of FIG. 7B, the survey results identified by the survey wireless headphones measurement 745, the survey wired headphones measurement 750, and the survey no headphones measurement 755 share an approximate 3:1:1 ratio (the rounded survey no headphones measurement 755 (12%):the rounded survey wired headphones measurement 750 (4%):the rounded survey wireless headphones measurement 745 (4%)).

In the illustrated example of FIG. 7B, the panel without adjustment no headphone measurement 760 and the panel with adjustment no headphone measurement 775 are illustrative of the example average streaming radio measurements collected by the example media meter 105 and determined by the example audience determiner 130 (e.g., 6%), as illustrated in the example Graph 500 of FIG. 5. The example Graph 740 illustrates the panel without adjustment no headphone measurement 760 and the panel with adjustment no headphone measurement 775 as 6% according to the average results of the example Graph 500. In the illustrated example of FIG. 7B, the panel-with-adjustment wireless headphone estimate 765 and the panel-with-adjustment wired headphone estimate 770 are determined by the audience adjustment calculator 160 of FIG. 1. The audience adjustment calculator 160 applies the headphone demographic adjustment factors (determined by the headphone survey adjuster 145 of FIG. 1) to determine the adjusted wireless headphone estimate 765 and the adjusted wired headphone estimate 770 (no adjustment is applied to the no headphone measurement as that data is fully captured by the example media meter 105). The example headphone survey adjuster 145 outputs the headphone demographic adjustment factors to the headphone adjustment factors collector 150, which provides the headphone demographic adjustment factors to the audience adjustment calculator 160.

FIG. 8A is an example representation of the streaming radio measurements recorded by a PPM (e.g., the media meter 105 of FIG. 1) and the streaming radio measurements determined by survey distributions from headphone survey results of FIGS. 7A and 7B. The example Table 800 of FIG. 8A includes streaming radio measurements for example total streaming 805, example without headphone streaming 810, example wired headphones streaming 815, and example wireless headphones streaming 820. For each of the total streaming 805, without headphone 810, wired headphones 815, and wireless headphones 820, the example Table 800 includes PPM variables 825, example current PPM distribution data 830, survey variables 835, and survey distribution data 840. In the example Table 800, the PPM variables 825 and the survey variables 835 are assigned to the respective example current PPM distribution data 830 and the survey distribution data 840 for reference in explaining the adjusted PPM calculations described in further detail below in connection with FIG. 8B. In the illustrated example of FIG. 8A, Table 800 includes illustrative data not representative of actual measurements recorded by a PPM or actual streaming radio measurements determined from headphone survey results. In Table 800, the example current PPM distribution data 830 illustrates the streaming radio measurements recorded by the media meter 105 of FIG. 1 (e.g., the panel without adjustment no headphone measurement 760 and the panel with adjustment no headphone measurement 775 of FIG. 7B). In Table 800, the survey distribution 840 illustrate the survey distributions from headphone survey results collected by the survey conductor 310 of FIG. 3 (e.g., the survey wireless headphones measurement 745, the survey wired headphones measurement 750, and the survey no headphones measurement 755 of FIG. 7B).

FIG. 8B is an example algebraic representation of calculations for determining adjustments for the PPM data in the headphone survey adjuster 145 of FIG. 1 based on example current PPM data similar to the example current PPM distribution data 830 and the survey distribution data 840 of FIG. 8A. The example Table 850 of FIG. 8B is representative of the calculations made by the adjustment factor calculator 415 of FIG. 4. The example Table 850 includes the total streaming 805, the without headphone streaming 810, the wired headphones streaming 815, and the wireless headphones streaming 820 of the example Table 800 of FIG. 8A. For each of the total streaming 805, the without headphone streaming 810, the wired headphones streaming 815, and the wireless headphones streaming 820, the example Table 850 includes example universe measurement variables 855, the PPM variables 825 of FIG. 8A, the survey variables 835 of FIG. 8A, and, where applicable, the adjusted PPM calculations 860. The example adjustment factor calculator 415 of FIG. 4 determines the example adjustment factors which are part of the equations shown in the example adjusted PPM calculations 860 for wired and wireless headphones in the example Table 850.

The example adjusted PPM calculations 860 use a ratio estimation. In some examples, a ratio estimation using auxiliary data is a common type of estimation in survey research when the purpose is to supplement the results from a smaller survey (e.g., the headphone survey conducted by the survey conductor 310 of FIG. 3) that measures a variable of interest from a larger survey (e.g., the measurements recorded the media meter 105 of FIG. 1) that does not measure that variable specifically, but measures other auxiliary variables associated with the variable of interest that are common to both the smaller survey and larger survey. The example Table 850 of FIG. 8B segments the streaming listening data in the PPM data (e.g., determined by the example audience determiner 130 of FIG. 1) and the headphone survey results in the following 3 categories: without headphone streaming 810 (x), wired headphones streaming 815 (y), and the wireless headphones streaming 820 (z) so the total streaming 805 (T) is the sum of x, y, and z. In the illustrated example of FIG. 8B, the adjusted PPM calculations 860 include equations for wired headphones streaming 815 and the wireless headphones streaming 820. The equations included in the adjusted PPM calculations 860 use the PPM variables 825 and the survey variables 835. In Table 850, the equations of the adjusted PPM calculations 860 uses the example current PPM distribution data 830 and the survey distribution data 840 of FIG. 8A based on the associations with the PPM variables 825 and the survey variables 835 illustrated in Table 800 of FIG. 8A. The results of the adjusted PPM calculations 860 are further described in detail below in connection with FIG. 9.

FIG. 9 is an example representation of example resulting adjusted PPM distributions based on the adjusted PPM calculations 860 of FIG. 8B. The example Table 900 includes the example total streaming 805, the example without headphone streaming 810, the example wired headphones streaming 815, and the example wireless headphones streaming 820 of FIGS. 8A and 8B. The example total streaming 805, the example without headphone streaming 810, the example wired headphones streaming 815, and the example wireless headphones streaming 820 include the PPM variables 825 and the survey variables 835 of FIGS. 8A and 8B. The total streaming 805, the without headphone streaming 810, the wired headphones streaming 815, and the wireless headphones streaming 820 also include example current PPM distribution data 905, example survey distribution data 910, and example adjusted PPM distributions 915.

The example Table 900 includes the current PPM distribution data 905 determined by the example audience determiner 130 of the example FIG. 1. In some examples, the current PPM distribution data 905 is the example current PPM distribution data 830 of FIG. 8A without rounding. The example survey distribution data 910 are determined by the example survey data analyzer 320 of the example FIG. 3. In some examples, the survey distribution data 910 are the example survey distribution data 840 of FIG. 8A without rounding. The example adjusted PPM distributions 915 represent example results from the example adjusted PPM calculations 860 of FIG. 8B. For example, to determine the adjusted PPM distributions 915 for the example wired headphones streaming 815 (y), the example adjusted PPM calculation 860 is illustrated in Equation 1 below.

$$y_{adj} = x_{PPM} * (1 + (y_{survey}/x_{survey}))$$ (Equation 1)

Based on the adjusted PPM calculations 860 for wired headphones streaming 815 (e.g., Equation 1 above), the adjusted PPM distributions 915 for wired headphones streaming 815 is determined to be 2.0%. The example Table 900 provides the example adjusted PPM distributions 915 for adjusting the audience estimates based on what is measured in PPM and what is measured in the survey, using the ratio estimation. In the illustrated example of FIG. 9, the total streaming 805 for the adjusted PPM distributions 915 is 11.0%. The total streaming 805 for the adjusted PPM distributions 915 that accounts for all streaming listening regardless of headphone use (11.0%) is a result of the summation of the adjusted PPM distributions 915 for the without headphones streaming 810 (6.8%), the adjusted PPM distributions 915 for the wireless headphones streaming 820 (2.2%), and the adjusted PPM distributions 915 for the wired headphones streaming (2.0%). In some examples, the example adjustment factor calculator of FIG. 4 determines the global lift factor based on the ratio between with headphone use (both wired and wireless) as measured in the survey and without headphones as measured in the survey. In some examples, the ratio is expressed ($y_{survey}/x_{survey}$) in the Equation 1 above. In the illustrated example of FIG. 9, the adjustment factor calculator 415 determines the example adjustment factors which are then used in the calculations conducted in the audience adjustment calculator 160 in FIG. 1. The audience adjustment calculator determines the total streaming 805 for the adjusted PPM distributions 915 accounting for both wired headphones and wireless headphones (11.0%) is illustrative of an approximate 60% lift of the without headphones streaming measurement (7%) to account for both wired headphones and wireless headphones. The example measurements and calculations represented in the example Table 900 are for illustrative purposes. Other distribution calculations may additionally or alternatively be included.

In some examples, a global lift factor can be determined based the survey distribution data 910. In some examples, the global lift can be determined based on the ratio of headphones (e.g., the wired headphones 815 and the wireless headphones 820) to no headphones (e.g., the without headphone 810). For example, the global lift can be determined as the ratio of the total for headphone (e.g., 4%+3.5%=7.5%) and the total for no headphones (e.g., 12.3%). In such examples, the ratio of 7.5% and 12.3% results in a global lift factor of 61%.

FIG. 10 is an example representation of example scenarios of potential PPM streaming as a portion of total listening, using consistent global lift factors. The example Table 1000 of FIG. 10 includes an example scenario 1 1005, an example scenario 2 1010, an example scenario 3 1015, an example scenario 4 1020, and an example scenario 5 1025. For each of the scenario 1 1005, the scenario 2 1010, the scenario 3 1015, the scenario 4 1020, and the scenario 5 1025, the example Table 1000 includes differing example proportions of streaming radio to the total PPM data 1030, a single, consistent example global lift factors 1035 applied to QH of streaming, and example estimated impacts of lifts on total amount of radio measured in a given market 1040.

In the illustrated example of FIG. 10, the example proportions of streaming radio to total PPM data 1030 is representative of a range of percentages of the measurements of streaming radio media data collected by the example media meter 105 of FIG. 1 compared to the total media data collected by the media meter 105. For example, for scenario 2 1010, the example proportions of streaming radio to total PPM data 1030 is illustrative of 5% of the total media data collected by the example media meter 105 being streaming radio media data. In some examples, the proportions of streaming radio to total PPM data 1030 across the example scenarios 1005-1025 illustrates the variance in percentages of streaming radio media based on changes in the market, data month, daypart, and/or demographic. Table 1000 illustrates how the range in proportions of streaming radio to total PPM data 1030 can cause the example estimated impacts of global lift factor on total amount of radio measured in a given market 1040 to vary even when the example global lift factors 1035 applied to the QH of streaming radio listening data does not vary. In some examples, the proportions of streaming radio to total PPM data 1030 impacts the effect of the global lift factors 1035 on the streaming radio listening while using headphones data collected by the example media meter 105 (e.g., the estimated impacts of lift on total amount of radio measured in a given market 1040 rages from 2%-5% across the example scenarios 1005-1025).

Figure 11:
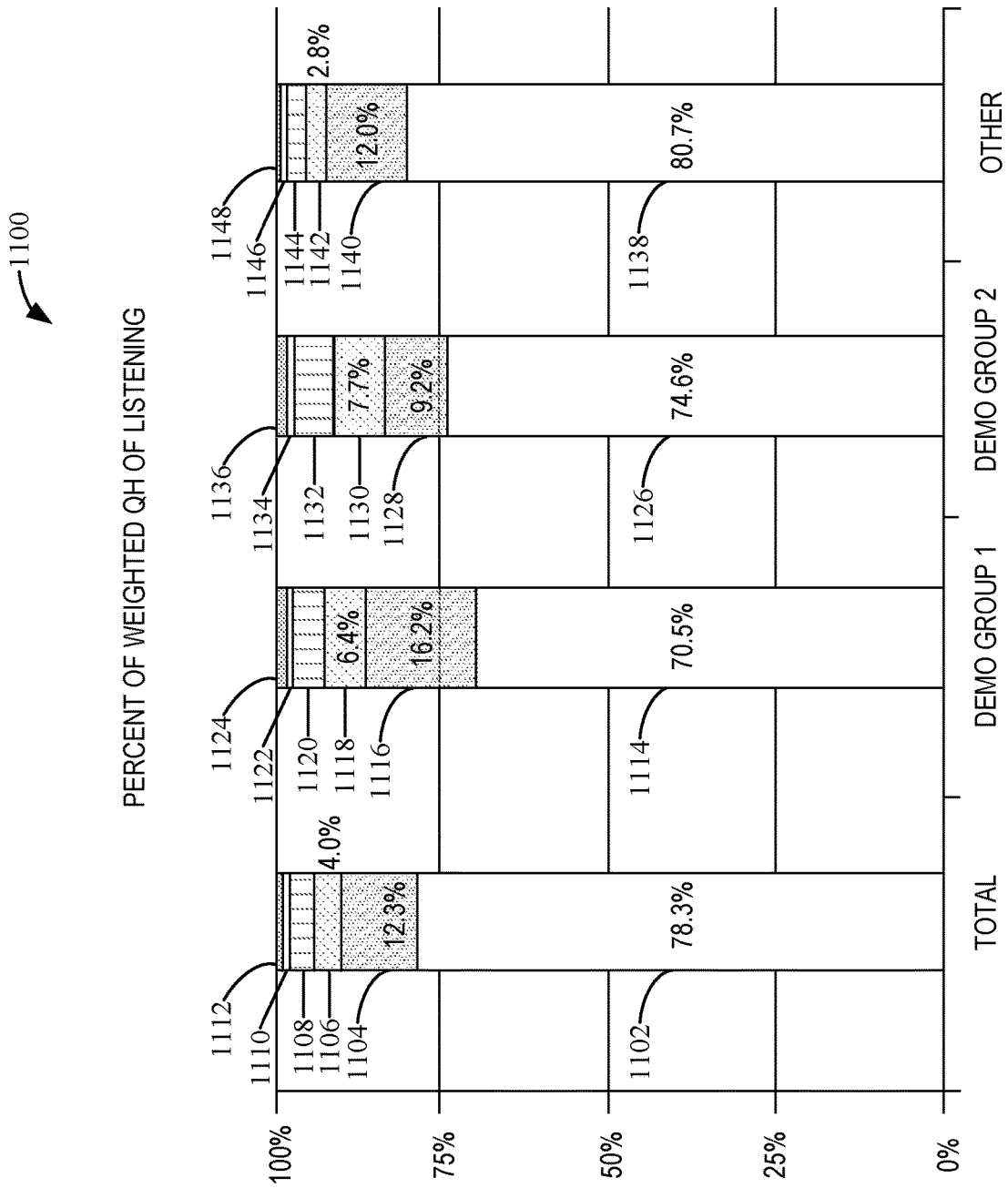
FIG. 11 is an example representation of an example proportion of QH of listening for different demographic populations based on survey results collected by the example headphone survey analyzer of FIG. 1 and/or FIG. 3.

FIG. 11 is an example representation of example proportion of QH of listening for different demographic populations based on survey results collected by the example headphone survey analyzer 140 of FIG. 1 and/or FIG. 3. The example Graph 1100 of FIG. 11 includes example total OTA listening with no headphones 1102, example total streaming listening with no headphones 1104, example total streaming listening with wireless headphones 1106, example total streaming listening with wired headphones 1108, example total OTA listening with wired headphones 1110, and example total OTA listening with wireless headphones 1112. The Graph 1100 further includes example OTA listening with no headphones for first demographic group 1114, example streaming listening with no headphones for first demographic group 1116, example streaming listening with wireless headphones for first demographic group 1118, example streaming listening with wired headphones for first demographic group 1120, example OTA listening with wired headphones for first demographic group 1122, and example OTA listening with wireless headphones for first demographic group 1124. The Graph 1100 further includes example OTA listening with no headphones for second demographic group 1126, example streaming listening with no headphones for second demographic group 1128, example streaming listening with wireless headphones for second demographic group 1130, example streaming listening with wired headphones for second demographic group 1132, example OTA listening with wired headphones for second demographic group 1134, and example OTA listening with wireless headphones for second demographic group 1136. The Graph 1100 further includes example OTA listening with no headphones for other demographic group 1138, example streaming listening with no headphones for other demographic group 1140, example streaming listening with wireless headphones for other demographic group 1142, example streaming listening with wired headphones for other demographic group 1144, example OTA listening with wired headphones for other demographic group 1146, and example OTA listening with wireless headphones for other demographic group 1148.

In the example Graph 1100 of FIG. 11, the total OTA listening with no headphones 1102, the total streaming listening with no headphones 1104, the total streaming listening with wireless headphones 1106, the total streaming listening with wired headphones 1108, the total OTA listening with wired headphones 1110, and the total OTA listening with wireless headphones 1112 are representative of the OTA radio with no headphones 705, the streaming radio with no headphones 710, the streaming radio with wireless headphones 715, the streaming radio with wired headphones 720, the OTA radio with wired headphones 725, and the OTA radio with wireless headphones 730 of FIG. 7A respectively. The Graph 1100 illustrates the OTA listening with no headphones, the streaming listening with no headphones, the streaming listening with wireless headphones, the streaming listening with wired headphones, the OTA listening with wired headphones, and the OTA listening with wireless headphones measurements for different demographic populations (e.g., the first demographic group, the second demographic group, and the other demographic group). In some examples, the demographic populations can include races (e.g., black, Hispanic, etc.). However, other demographic populations can be additionally and/or alternatively be used. The Graph 1100 illustrates how different demographic groups can have different percentages of QH listening for the OTA listening with no headphones, the streaming listening with no headphones, the streaming listening with wireless headphones, the streaming listening with wired headphones, the OTA listening with wired headphones, and the OTA listening with wireless headphones measurements. The Graph 1100 illustrates the need for the global lift factor determined by the example adjustment factor calculator 415 of FIG. 4 to be adjusted for different demographic populations.

FIG. 12 is an example representation of headphone demographic adjustment factors for respective demographic populations. In some examples, the respective demographic populations may include all possible demographic populations, which may be grouped into final demographic groups. In the illustrated example of FIG. 12, the example Table 1200 includes an example first age range 1205, an example second age range 1210, an example third age range 1215, an example fourth age range 1220, an example fifth age range 1225, an example sixth age range 1230, and an example seventh age range 1235. In the Table 1200, each of the example age ranges 1205-1235 include an example start age 1240 and an example end age 1245. For each of the age ranges 1205-1235, the Table 1200 includes potential headphone demographic adjustment factor breakdowns for men and women included in an example other demographic group 1250, men and women included in an example first demographic group 1255, and men and women included in an example second demographic group 1260. In the illustrated example, the demographic populations (e.g., the other demographic group, the first demographic group, and the second demographic group) includes different races (e.g., black, Hispanic, etc.). The Table 1200 illustrates an example maximum number of different demographic segments which may be collapsed by the example sample size determiner 405 and the demographic group identifier 410 of FIG. 4. In the illustrated example of FIG. 12, the Table 1200 illustrates the demographic segments broken down by age (e.g., the age ranges 1205-1235), gender (e.g., male or female), and demographic populations (e.g., race). Table 1200 illustrates the different demographic segments over which the headphone demographic adjustment factor is distributed.

FIG. 13 is an example representation of a mean difference table 1300 calculated by the sample size determiner 405 included in the headphone survey adjuster 145 of FIG. 4. The example mean difference table 1300 includes example demographic identifiers 1305, example first comparison demographic segments 1310, example second comparison demographic segments 1315, and example mean difference values 1320. In the illustrated example of FIG. 13, the demographic identifiers 1305 illustrate the types of demographic segments being compared. For example, the demographic identifier "GENDER" represents two demographic segments that differ in gender (e.g., male and female) are being compared, and the demographic identifier "AGE_GROUP" represents two demographic segments that differ in age (e.g., 50-54 and 55+) are being compared. The example first comparison demographic segments 1310 and the example second comparison demographic segments 1315 illustrate two different demographic segments that are related to the same demographic identifier 1305 (e.g., two demographic segments that are related to gender or age groups). In some examples, the first comparison demographic segments 1310 and the second comparison demographic segments 1315 together can be referred to as comparison pairs. In some examples, the sample size determiner 405 identifies the first comparison demographic segments 1310 and the second comparison demographic segments 1315 and compares the headphone survey data associated with the first comparison demographic segments 1310 and the second comparison demographic segments 1315 to determine the example mean difference values 1320. In some examples, the mean difference values 1320 illustrate the differences in headphone usage (based on the headphone survey data) between each of the pairs of first comparison demographic segments 1310 and the second comparison demographic segments 1315. In some examples, the mean difference table 1300 is in ascending order based on the mean difference values 1320 between each of pairs of the first comparison demographic segments 1310 and the second comparison demographic segments 1315 (e.g., the top row of the mean difference table 1300 shows two demographic segments that have the least mean difference, that is, they are most alike, and the bottom of the mean difference table 1300 shows two demographic segments that have the greatest mean difference, that is, they are least alike).

FIG. 14 is an example representation of the process of collapsing demographic groups in the sample size determiner 405 included in the headphone survey adjuster 145 of FIG. 4. The example schematic 1400 of FIG. 14 includes four example steps for collapsing demographic segments into demographic groups that meet a sample size threshold. In some examples, the sample size threshold for a demographic group is 30 samples. However, other numbers of samples may be alternatively used for the sample size threshold. In the illustrated example of FIG. 14, step 1 includes example Table 1405. The Table 1405 includes the demographic information (e.g., race, age range, and gender) and a count of samples included in an example demographic segment 1410. In the Table 1405, the demographic segment 1410 illustrates a count of 4 samples identified as black males in the age range of 6-17. In the illustrated example of FIG. 14, the sample size determiner 405 compares the count of the demographic segment 1410 (e.g., 4) to the sample size threshold (e.g., 30). In some examples, the sample size determiner 405 collapses demographic segments into demographic groups when the number of samples (count) does not satisfy (e.g., meet or exceed) the sample size threshold. In the illustrated example, the demographic segment 1410 does not satisfy the sample size threshold and must be collapsed with a neighboring demographic segment. The example sample size determiner 405 refers to the details (e.g., race or age or gender) of the demographic group which must be collapsed in the example mean difference table 1300 of FIG. 13. In some examples, the mean difference table 1300 is ordered by ascending difference between potential demographic segments and their potential neighboring demographic segments. These two demographic segments together can be referred to as a comparison pair. The example mean difference table 1300 is referred to while the sample size determiner 405 is in progress. If the demographic row in the mean difference table 1300 is applicable, then the given demographic segment will be collapsed and/or combined with the neighboring demographic segment based on the comparison pair with the least mean difference. If the demographic row in the mean difference table 1300 is not applicable, then the next demographic row would be checked. In some examples, the higher a comparison pair is in the mean difference table 1300 (e.g., closer to the top of the mean difference table 1300), the more similar the two demographic groups are. In the illustrated example, the demographic segment 1410 is looked up in the mean difference table 1300, and an example first row of the mean difference table 1300 may be the comparison of the two age groups 35-44 and 45-49, which do not apply to demographic segment 1410. An example second row of the mean difference table 1300 may be the comparison of the two race/ethnicity groups Black and Hispanic, which do apply to demographic segment 1410. In such examples, the example demographic segment 1410 must then be collapsed with the least different neighboring group. Since demographic segment 1410 illustrates samples identified as Black males in the age range of 6-17, the least different neighboring group would be Hispanic males in the age range of 6-17 per the highest applicable row on the mean difference table 1300.

In the illustrated example of FIG. 14, step 2 includes example Table 1415. The Table 1415 includes the demographic segment 1410 and the demographic information (e.g., race, age range, and gender) and a count of samples included in an example demographic segment 1420. In the Table 1415, the demographic segment 1420 illustrates a count of 6 samples identified as Hispanic males in the age range of 6-17, which is the least different neighboring group as determined above. In some examples, the demographic segment 1420 is a neighboring demographic segment of the demographic segment 1410 relating to the race/ethnicity, age, or gender demographics. In the illustrated example, the sample size determiner 405 collapses/combines the demographic segment 1410 with the neighboring demographic segment 1420 to create a demographic group when the mean difference table 1300 can be used to determine the identity of the neighboring demographic group, based on the least mean difference between the demographic segment and the original demographic groups. In some examples the sample size determiner 405 does not collapse/combine the demographic segment 1410 with an example neighboring segment. In such examples, the sample size determiner 405 continues to read down the mean difference table 1300 until a row that applies can be used to identify a different neighboring demographic segment to collapse/combine with the demographic segment to satisfy the sample size threshold. In the illustrated example, the sample size determiner 405 uses the mean difference table 1300 to identify the example neighboring demographic segment 1420 and collapses/combines the demographic segment 1410 with the neighboring demographic segment 1420. In the illustrated example, the sample size determiner 405 refers to the mean difference table (sorted in ascending order) to determine the identity of a neighboring demographic groups with the least mean difference between the demographic segment and the original demographic group each time two demographic segments are being collapsed/combined. The Table 1415 further includes the total count 1425 for the collapsed (combined) demographic segment 1410 and demographic segment 1420. In the illustrated example of FIG. 14, the sample size determiner 405 compares the total count 1425 (e.g., 10 samples) to the sample size threshold (e.g., 30). In the illustrated example, the total count 1425 does not satisfy the sample size threshold and the combined demographic segment 1410 and demographic segment 1420 must be collapsed with a neighboring demographic segment. In such examples, the sample size determiner 405 again refers to the details (e.g., race, age, or gender) of the demographic group which must be collapsed in the mean difference table 1300. In the illustrated example, the newly combined demographic segment 1425 illustrates samples that are Black or Hispanic males in the age range of 6-17. The example demographic segment 1425 is looked up in the mean difference table

1300. As described above, the first two rows of the mean difference table 1300 have been considered, and rows three and four do not apply to the example demographic segment 1425. In such examples, an example fifth row of the mean difference table 1300 may apply to the demographic segment 1425 and include a comparison of the two genders, male and female. The example demographic segment 1425 is then collapsed with the least different neighboring group(s). For examples, the example demographic segment 1425 illustrates samples that are Black or Hispanic males in the age range of 6-17, the least different neighboring group would be the combination of the demographic segment 1435 and the demographic segment 1440, which illustrated Black or Hispanic females in the age range of 6-17, per the highest applicable row on the mean difference table 1300.

In the illustrated example of FIG. 14, step 3 includes example Table 1430. The Table 1430 includes the demographic segment 1410, the demographic segment 1420, and the demographic information (e.g., race, age range, and gender) and counts of samples included in an example demographic segment 1435 and an example demographic segment 1440. In the Table 1430, the demographic segment 1435 illustrates a count of 4 samples identified as black females in the age range of 6-17. In the Table 1430, the demographic segment 1440 illustrates a count of 10 samples identified as Hispanic females in the age range of 6-17. In some examples, the demographic segment 1435 combined with the demographic segment 1440 are neighboring demographic segments of the demographic segment 1425. The Table 1430 further includes the total count 1445 for the collapsed (combined) demographic segment 1410, demographic segment 1420, demographic segment 1435, and demographic segment 1440. In the illustrated example of FIG. 14, the sample size determiner 405 compares the total count 1445 (e.g., 24 samples) to the sample size threshold (e.g., 30). In the illustrated example, the total count 1445 does not satisfy the sample size threshold and the combined demographic segment 1410, demographic segment 1420, demographic segment 1435, and demographic segment 1440 as the new combine demographic segment 1445 must be collapsed with a neighboring demographic segment. In such examples, the sample size determiner 405 again refers to the details (e.g., race, age, or gender) of the demographic group which must be collapsed in the mean difference table 1300. In the illustrated example, the newly combined demographic segment 1445 illustrates samples that are Black or Hispanic females or males in the age range of 6-17. The example demographic segment 1445 is looked up in the mean difference table 1300. The next highest applicable row in the mean difference table 1300 may be the comparison of the two races, Black and Other. Since the example demographic segment 1445 illustrates samples that are Black or Hispanic females or males in the age range of 6-17, the least different neighboring group would be the combination of the demographic segment 1455 and the example demographic segment 1460, which identify Other females or males in the age range of 6-17.

In the illustrated example of FIG. 14, step 4 includes example Table 1450. The Table 1450 includes the demographic segment 1410, the demographic segment 1420, the demographic segment 1435, the demographic segment 1440, and the demographic information (e.g., race, age range, and gender) and counts of samples included in an example demographic segment 1455 and an example demographic segment 1460. In the Table 1450, the demographic segment 1455 illustrates a count of 24 samples identified as Other males in the age range of 6-17, and the demographic segment 1460 illustrates a count of 21 samples identified as Other females in the age range of 6-17. In some examples, the combination of the example demographic segment 1455 and the demographic segment 1460 is a neighboring demographic segment of the demographic segment 1410 and the demographic segment 1420 (e.g., the combine demographic segment 1445). The Table 1450 further includes the total count 1465 for the collapsed (combined) demographic segment 1410, demographic segment 1420, demographic segment 1435, demographic segment 1440, demographic segment 1455, and demographic segment 1460. In the illustrated example of FIG. 14, the sample size determiner 405 compares the total count 1465 (e.g., 69 samples) to the sample size threshold (e.g., 30). In the illustrated example, the total count 1465 does satisfy the sample size threshold. In the illustrated example of FIG. 14, the Table 1450 identifies an example of final collapsed demographic segments determined by the sample size determiner 405.

FIGS. 15A, 15B are example representations of example identified demographic groups output by the sample size determiner 405 included in the headphone survey adjuster 145 of FIG. 4. In the illustrated example of FIG. 15A, an example Table 1500 illustrates the resulting demographic groups determined by the sample size determiner 405. The Table 1500 includes an example demographic group 1505, an example demographic group 1510, an example demographic group 1515, an example demographic group 1520, an example demographic group 1525, an example demographic group 1530, an example demographic group 1535, and an example demographic group 1540.

In the illustrated example of FIG. 15A, the example demographic groups 1505-1540 illustrate the results of collapsing demographic segments into demographic group based on a sample size threshold. In Table 1500, the demographic group 1505 includes the collapsed demographic segments that include all samples identified as males, females, and any of the races for the age ranges of 6-17 and 18-24. The demographic group 1510 includes the collapsed demographic segments that include all samples identified as males and other races for the age ranges of 25-34 and 35-44. The demographic group 1515 includes the collapsed demographic segments that include all samples identified as males, females, and other races for the age ranges of 45-49 and 50-54. The demographic group 1520 includes the demographic segments that includes all samples identified as males and other races for the age range of 55 and up. The demographic group 1525 includes the demographic segments that includes all samples identified as females and other races for the age range of 55 and up. The demographic group 1530 includes the collapsed demographic segments that include all samples identified as females and other races for the age ranges of 25-34 and 35-44. The demographic group 1535 includes the collapsed demographic segments that include all samples identified as males, females, black, and Hispanic for the age ranges of 45-49, 50-54, and 55 and up. The demographic group 1540 includes the collapsed demographic segments that include all samples identified as males, females, black, and Hispanic for the age ranges of 25-34 and 35-44.

In the illustrated example of FIG. 15, the Table 1500 includes demographic groups that are the result of collapsing neighboring demographic segments to meet a sample size threshold (e.g., as described above in connection with FIG. 14). For example, the demographic group 1505, the demographic group 1510, the demographic group 1515, the demographic group 1530, the demographic group 1535, and the demographic group 1540 illustrate example demographic groups including collapsed neighboring demographic segments. The table 1500 includes demographic groups that include only one demographic segment (e.g., the demographic segment satisfied the sample size threshold and did not need to be collapsed with a neighboring demographic segment). For example, the demographic group 1520 and the demographic group 1525 illustrate example demographic groups that include only one demographic segment.

In the illustrated example of FIG. 15B, the example Table 1550 illustrates the final demographic groups identified by the example sample size determiner 405 illustrated in Table 1500 of FIG. 15A. Table 1550 includes the condensed representations of the demographic groups 1505-1540 of Table 1500.

FIGS. 16A, 16B are example representations of the two steps of demographic group comparisons performed by the demographic group identifier 410 included in the headphone survey adjuster 145 of FIG. 4. In the illustrated example of FIG. 16A, an example Table 1600 illustrates a first set of comparisons of an example demographic group 1610 (e.g., one of the demographic groups 1505-1540 of FIGS. 15A and 15B) compared to the group of all other demographic groups (e.g., the combined demographic groups that comprise the example demographic group combined 1615) to determine statistical significance values between a demographic group and the group of all other demographic segments. In some examples, the demographic group identifier 410 determines statistical significance values for each of the demographic groups in comparison to the group of all other demographic groups combined. The comparison of statistical significance values is further described in detail below in connection with FIGS. 17A and 17B. In the illustrated example of FIG. 16A, the demographic group identifier 410 compares the demographic group 1610 to the group of all other demographic groups combined 1615 to determine if the demographic group 1610 is significantly different from the group of all other demographic groups. If the demographic group identifier 410 determines the statistical significance value of the comparison between the demographic group 1610 and all other demographic groups combined 1615 is below a threshold, then the demographic group identifier 410 identifies the demographic group 1610 as a unique adjustment demographic group. In some examples, the demographic group identifier 410 completes this comparison for each of the demographic groups included in Table 1600 compared to the group of all other demographic groups. In such examples, after all demographic groups are tested, the unique demographic groups that are determined to be different from the group of all other demographic groups are stored in a list/table of groups that are identified as different. In some examples, the demographic groups stored in a list/table of groups identified as different are removed from the comparison. In some examples, the comparisons are repeated to compare one demographic group (not in a list/table of groups identified as different) to the group of all other demographic groups (not in a list/table of groups identified as different) until all demographic groups have been compared.

In the illustrated example of FIG. 16B, an example Table 1620 illustrates the unique demographic adjustment groups identified by a first set of comparisons in the example demographic group identifier 410, as described above in connection with FIG. 16A. The Table 1620 includes an example first demographic group 1625 (demographic group 1), an example second demographic group 1630 (demographic group 5), and an example third demographic group 1635 (demographic group 6), which are identified as unique adjustment demographic groups based on the statistical significance testing discussed in connection with FIG. 16A and are not examined further.

Table 1620 also includes an example unique adjustment demographic group 1640 (demographic group 2 and demographic group 3), an example unique adjustment demographic group 1645 (demographic group 4 and demographic group 7), and an example unique adjustment demographic group 1650 (demographic group 8 and demographic group 9). In the illustrated example of FIG. 16B, each of the example unique adjustment demographic groups 1640-1650 include the demographic groups that are combined based on a second set of statistical significance comparisons. For example, the unique adjustment demographic group 1645 includes the demographic group 4 and demographic group 7, which illustrates that demographic groups 4 and 7, when compared to each other, have a statistical significance value that meets the threshold for combining two similar demographic groups. In some examples, demographic groups, when compared to each other as pairs, do not have a statistical significance value that meets the threshold for combining two similar demographic groups. In such examples, the demographic groups are not combined. For example, demographic group 4 and demographic group 8 are not combined into the same unique adjustment demographic group (e.g., demographic group 4 is combined in the unique adjustment demographic group 1645 and demographic group 8 is combined in the unique adjustment demographic group 1650) because when compared to each other as pairs, demographic group 4 and demographic group 8 do not have a statistical significance value that meets the threshold for combining two similar demographic groups.

Figures 17A, 17B:
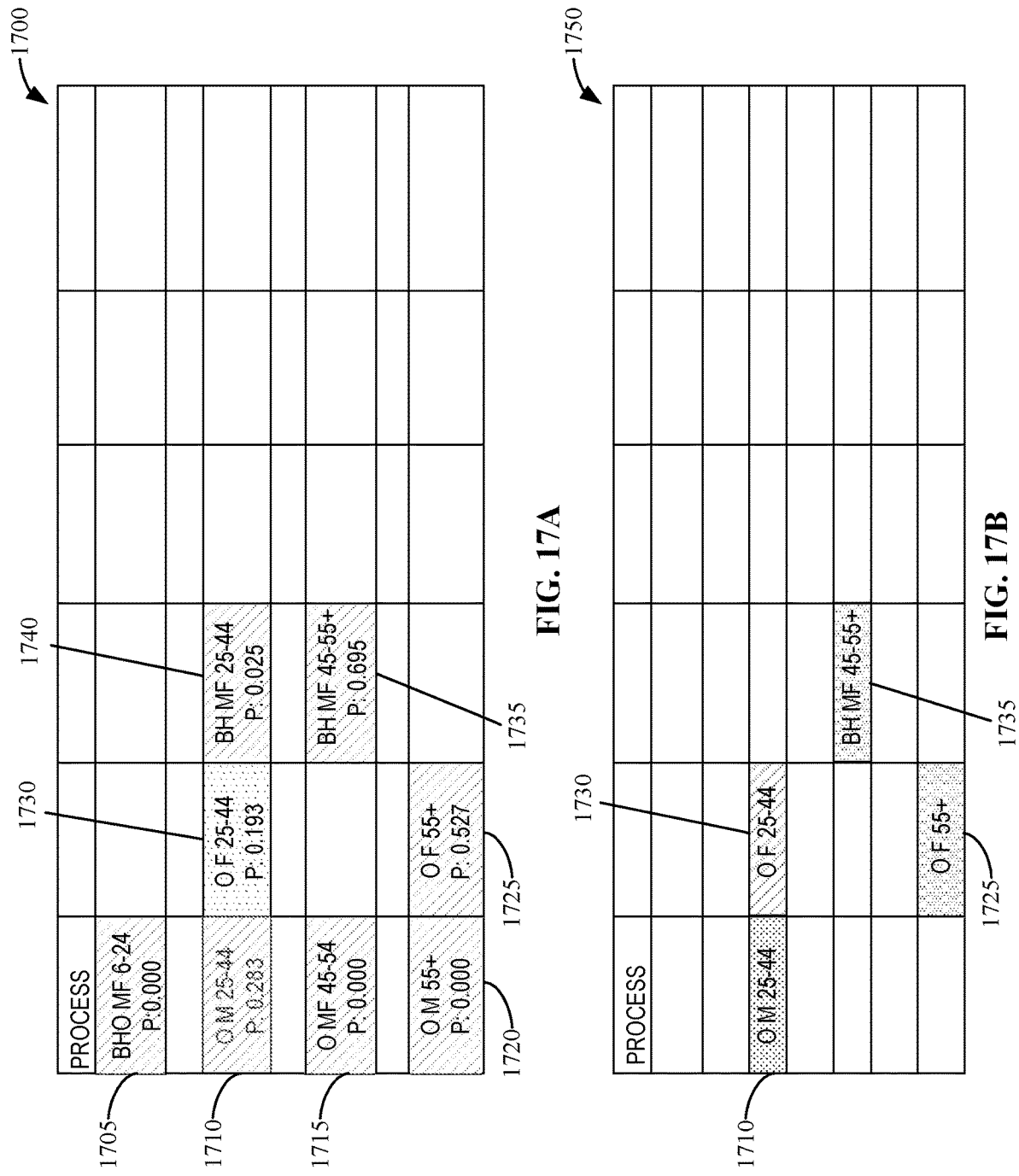
FIGS. 17A, 17B are example representations of comparison outputs of the demographic group identifier included in the example headphone survey adjuster of FIG. 1 and/or FIG. 4.

FIGS. 17A, 17B are example representations of comparison outputs of the demographic group identifier 410 included in the example headphone survey adjuster 145 of FIG. 4. In the illustrated example of FIG. 17A, an example Table 1700 includes example statistical significance values for example demographic groups 1705-1740, where the demographic groups 1705-1740 are the results of the process illustrated in FIG. 16A described above. In some examples, the demographic groups 1705-1740 are the example demographic groups 1505-1540 of FIGS. 15A and 15B. In the Table 1700, the demographic groups 1705-1740 each include statistical significance values (p values) based on the comparisons of individual demographic groups to the group of all other demographic groups. In the illustrated example of FIG. 17A, the demographic group identifier 410 performs contrast testing between the demographic groups 1705-1740 in a first set of comparisons. For example, the demographic group identifier 410 uses a t-test to determine the statistical significance values (p values) between individual demographic groups and the group of all other demographic groups. In some examples, the statistical significance values are illustrative of the differences in headphone usage behavior among different demographic groups. For example, the headphone usage information for demographic group 1705 is compared to entire headphone usage information from all of the other demographic groups (e.g., demographic groups 1710-1740) to determine the statistical significance value for the demographic group 1705 compared to the group of all other groups. In some examples, the demographic group identifier 410 determines a demographic group is statistically significant when the p value is below 0.10 (e.g., the demographic group's survey-measured headphone listening is statistically different from the survey-measured headphone listening of the group of all other demographic groups). In the Table 1700, the demographic group 1705, the demographic group 1715, the demographic group 1720, and the demographic group 1740 are statistically significant (e.g., the p values do not meet or exceed 0.10). In some examples, the demographic group identifier 410 identifies the demographic group 1705, the demographic group 1715, the demographic group 1720, and the demographic group 1740 as unique demographic adjustment groups, and these groups are considered final. In the Table 1700, the demographic group 1710, the demographic group 1725, the demographic group 1730, and the demographic group 1735 are not statistically different from the group of all other demographic groups, and are compared to one another in a second set of comparisons by the demographic group identifier 410 as described in further detail below in connection with FIG. 17B.

In the illustrated example of FIG. 17B, an example Table 1750 includes the demographic group 1710, the demographic group 1725, the demographic group 1730, and the demographic group 1735 identified as not statistically different from the group of all other demographic groups in FIG. 17A. The Table 1750 illustrates the demographic group identifier 410 comparing the p values of each pair of the demographic groups 1710, 1725, 1730, 1735 to determine if any of the demographic groups 1710, 1725, 1730, 1735 are statistically similar to each other in a second set of comparisons. In the illustrated example of FIG. 17B, the demographic group identifier 410 determines the statistical difference between the demographic group 1725 and the demographic group 1735. In some examples, the demographic group identifier 410 determines the statistical significance is above a threshold and combines the demographic groups 1725 and 1735 into the same unique demographic adjustment group. In the illustrated example of FIG. 17B, the demographic group identifier 410 determines the statistical difference between the demographic groups 1710 and 1730 is not above a threshold. In such examples, the demographic groups 1710 and 1730 are not combined into the same unique demographic adjustment group, and the demographic groups 1710 and 1730 are further tested against other not-different demographic adjustment groups. In some examples, after all rounds of comparisons, the demographic group identifier 410 identifies the demographic groups 1710 and 1730 as individual unique demographic adjustment groups. In the illustrated examples of FIGS. 17A and 17B, the demographic group identifier 410 identifies 7 unique demographic adjustment groups (e.g., demographic group 1705, demographic group 1710, demographic group 1715, demographic group 1720, the combination of demographic groups 1725 and 1735, the demographic group 1740, and the demographic group 1730). In some examples, the resulting 7 unique demographic adjustment groups are further illustrated in example FIG. 18 below.

Figure 18:
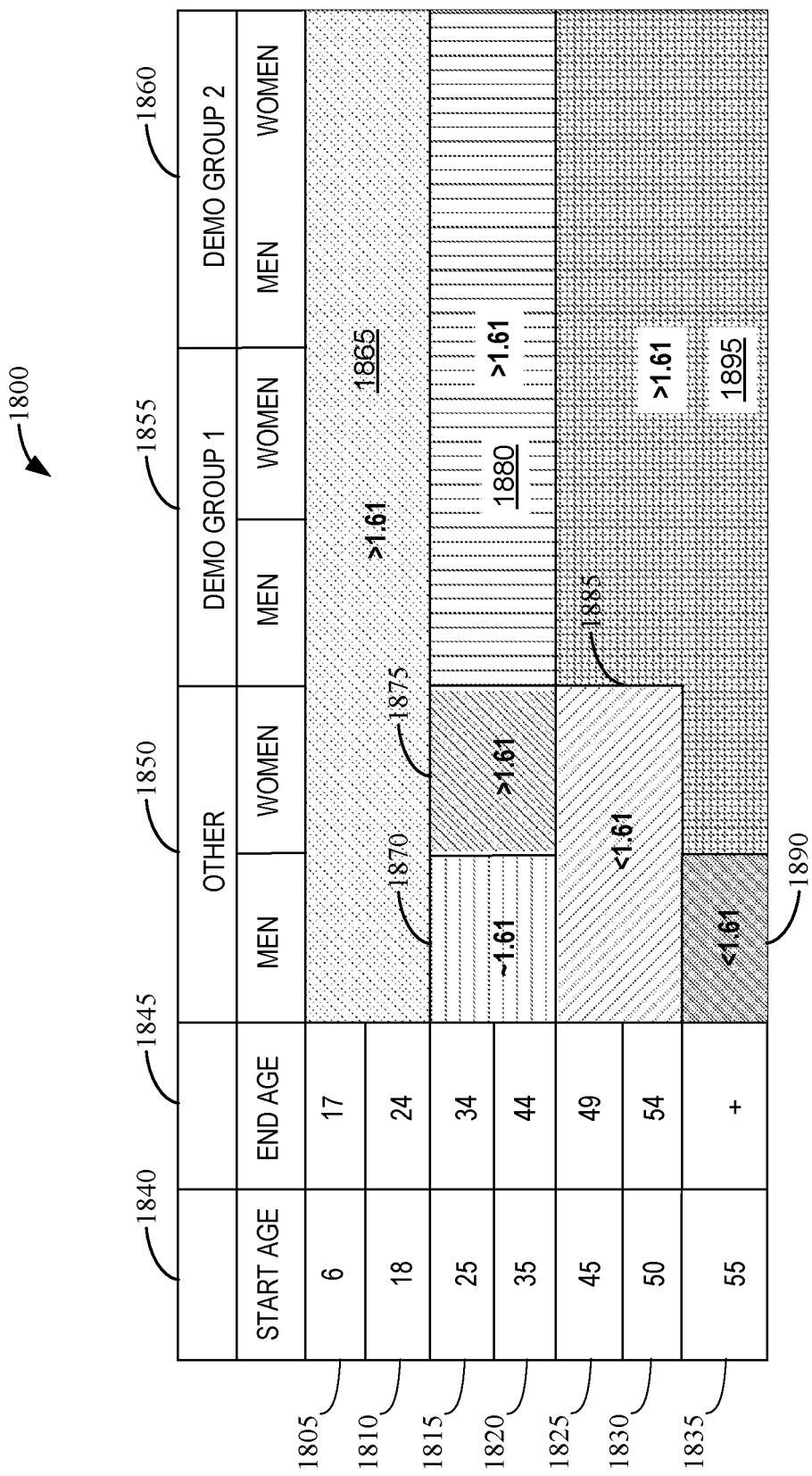
FIG. 18 is an example representation of example headphone demographic adjustment factor outputs of an example adjustment factor calculator included in the example headphone survey adjuster of FIG. 1 and/or FIG. 4.

FIG. 18 is an example representation of example headphone demographic adjustment factor outputs of the adjustment factor calculator 415 included in the headphone survey adjuster 145 of FIG. 4. In some examples, the adjustment factor calculator 415 distributes the global lift factor across the unique demographic adjustment groups. In the illustrated example of FIG. 18, an example Table 1800 includes an example first age range 1805, an example second age range 1810, an example third age range 1815, an example fourth age range 1820, an example fifth age range 1825, an example sixth age range 1830, and an example seventh age range 1835. In the Table 1800, each of the example age ranges 1805-1835 include an example start age 1840 and an example end age 1845. For each of the age ranges 1805-1835, the Table 1800 includes headphone demographic adjustment factor breakdowns for men and women included in an example other demographic group 1850, men and women included in an example first demographic group 1855, and men and women included in an example second demographic group 1860. In some examples, the demographic groups can include races (e.g., black, Hispanic, etc.). The Table 1800 further includes headphone demographic adjustment factors 1865-1895 for the 7 final unique demographic adjustment groups determined by the process illustrated in Table 1700 and Table 1750 of FIGS. 17A, 17B. In the illustrated example of FIG. 18, the adjustment factor calculator 415 calculates the amount of lift needed based on the survey data and distributes that across unique demographic adjustment groups determined by the demographic group identifier 410 to create headphone demographic adjustment factors 1865-1895. In the Table 1800, the headphone demographic adjustment factors 1865-1895 range from 1.5 to 1.7 depending on the proportions of listening to streaming radio with headphone and listening to streaming radio without headphones radio listening from the headphone survey and the proportion of the historical PPM media data that includes streaming media.

FIG. 19 is an illustrative example of a result of the examples disclosed herein. The example Table 1900 of FIG. 19 is representative of an example report generated with the measurements and headphone adjustments made by the example audience adjustment calculator 160 of FIG. 1. The example Table 1900 includes the example difference made in the audience estimates after accounting for headphone adjustments. The example Table 1900 includes example station codes 1905, example average ratings 1910, example average persons 1915, example average shares 1920, and example market totals 1925. The Table 1900 illustrates measurements of the average ratings 1910, the average persons 1915, and the average shares 1920 for each of the station codes 1905 based on the listening data from the example meter data analyzer 120 of FIG. 1 after the example audience adjustment calculator 160 applies the headphone demographic adjustment factors determined by the adjustment factor calculator 415. In the illustrated example of FIG. 19, the example market totals 1925 illustrates the total ratings measurements, the total persons measurements, and the total shares measurements for the market based on the average ratings 1910, the average persons 1915, and the average shares 1920 for each of the station codes 1905.

While an example manner of implementing the production environment 100 and the headphone adjustment research environment 135 of FIG. 1 is illustrated in FIGS. 2, 3, and 4 one or more of the elements, processes and/or devices illustrated in FIGS. 2, 3, and 4 may be combined, divided, re-arranged, omitted, eliminated and/or implemented in any other way. Further, the example data center analyzer 115, the example meter data analyzer 120, the example panel and station database 125, the example audience determiner 130, the example headphone survey analyzer 140, the example headphone survey adjuster 145, the example headphone adjustment factors collector 150, the example audience adjustment calculator 160, the example panel collector 205, the example meter measurement determiner 210, the example sample selector 305, the example survey conductor 310, the example survey processor 315, the example survey data analyzer 320, the example sample size determiner 405, the example demographic group identifier 410, the example adjustment factor calculator 415 and/or, more generally, the example production environment 100 and the headphone adjustment research environment 135 of FIG. 1 may be implemented by hardware, software, firmware and/or any combination of hardware, software and/or firmware. Thus, for example, any of the example data center analyzer 115, the example meter data analyzer 120, the example panel and station database 125, the example audience determiner 130, the example headphone survey analyzer 140, the example headphone survey adjuster 145, the example headphone adjustment factors collector 150, the example audience adjustment calculator 160, the example panel collector 205, the example meter measurement determiner 210, the example sample selector 305, the example survey conductor 310, the example survey processor 315, the example survey data analyzer 320, the example sample size determiner 405, the example demographic group identifier 410, the example adjustment factor calculator 415 and/or, more generally, the example production environment 100 and the headphone adjustment research environment 135 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data center analyzer 115, the example meter data analyzer 120, the example panel and station database 125, the example audience determiner 130, the example headphone survey analyzer 140, the example headphone survey adjuster 145, the example headphone adjustment factors collector 150, the example audience adjustment calculator 160, the example panel collector 205, the example meter measurement determiner 210, the example sample selector 305, the example survey conductor 310, the example survey processor 315, the example survey data analyzer 320, the example sample size determiner 405, the example demographic group identifier 410, and the example adjustment factor calculator 415 is/are hereby expressly defined to include a non-transitory computer readable storage device or storage disk such as a memory, a digital versatile disk (DVD), a compact disk (CD), a Blu-ray disk, etc. including the software and/or firmware. Further still, the example production environment 100 and the headphone adjustment research environment 135 of FIG. 1 may include one or more elements, processes and/or devices in addition to, or instead of, those illustrated in FIGS. 2, 3, and 4 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the production environment 100 and the headphone adjustment research environment 135 of FIG. 1 is shown in FIGS. 20, 21, 22, 23, 24, 25, 26, 27. The machine readable instructions may be one or more executable programs or portion(s) of an executable program for execution by a computer processor and/or processor circuitry, such as the processor 2812 shown in the example processor platform 2800 discussed below in connection with FIG. 28. The program may be embodied in software stored on a non-transitory computer readable storage medium such as a CD-ROM, a floppy disk, a hard drive, a DVD, a Blu-ray disk, or a memory associated with the processor 2812, but the entire program and/or parts thereof could alternatively be executed by a device other than the processor 2812 and/or embodied in firmware or dedicated hardware. Further, although the example program is described with reference to the flowchart illustrated in FIGS. 20, 21, 22, 23, 24, 25, 26, 27 many other methods of implementing the example the headphone adjustment research environment 135 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 20, 21, 22, 23, 24, 25, 26, 27 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 20:
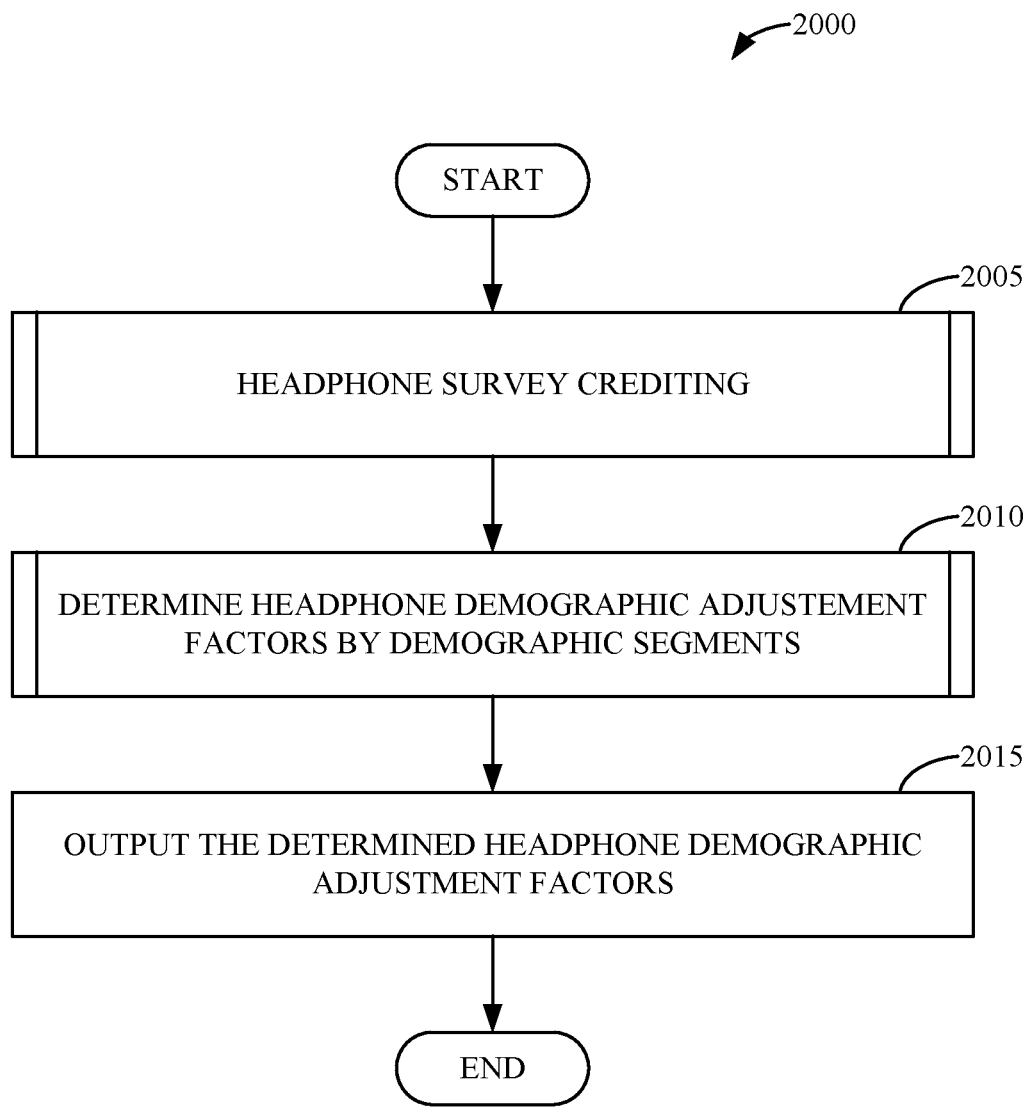
FIG. 20 is a flowchart representative of machine-readable instructions which may be executed to implement the example headphone adjustment research environment of FIG. 1.

FIG. 20 is a flowchart representative of machine-readable instructions which may be executed to implement the example headphone adjustment research environment 135 of FIG. 1. The program 2000 of FIG. 20 begins execution at block 2005 at which the example headphone survey analyzer 140 performs headphone survey crediting. In some examples, the headphone survey analyzer 140 conducts surveys on former PPM panelists to determine headphone usage during streaming media exposure. In some examples, the headphone survey analyzer 140 identifies and analyzes the survey data. In some examples, the headphone survey analyzer 140 determines media exposure from headphones (e.g., the example headphones 104) that are not collected by the example media meter 105 based on the survey data. The example headphone survey analyzer 140 performs headphone survey crediting on the survey data. As described in further detail below, the example flowchart 2005 of FIG. 21 represents example instructions that may be implemented to perform headphone survey crediting.

Figure 22:
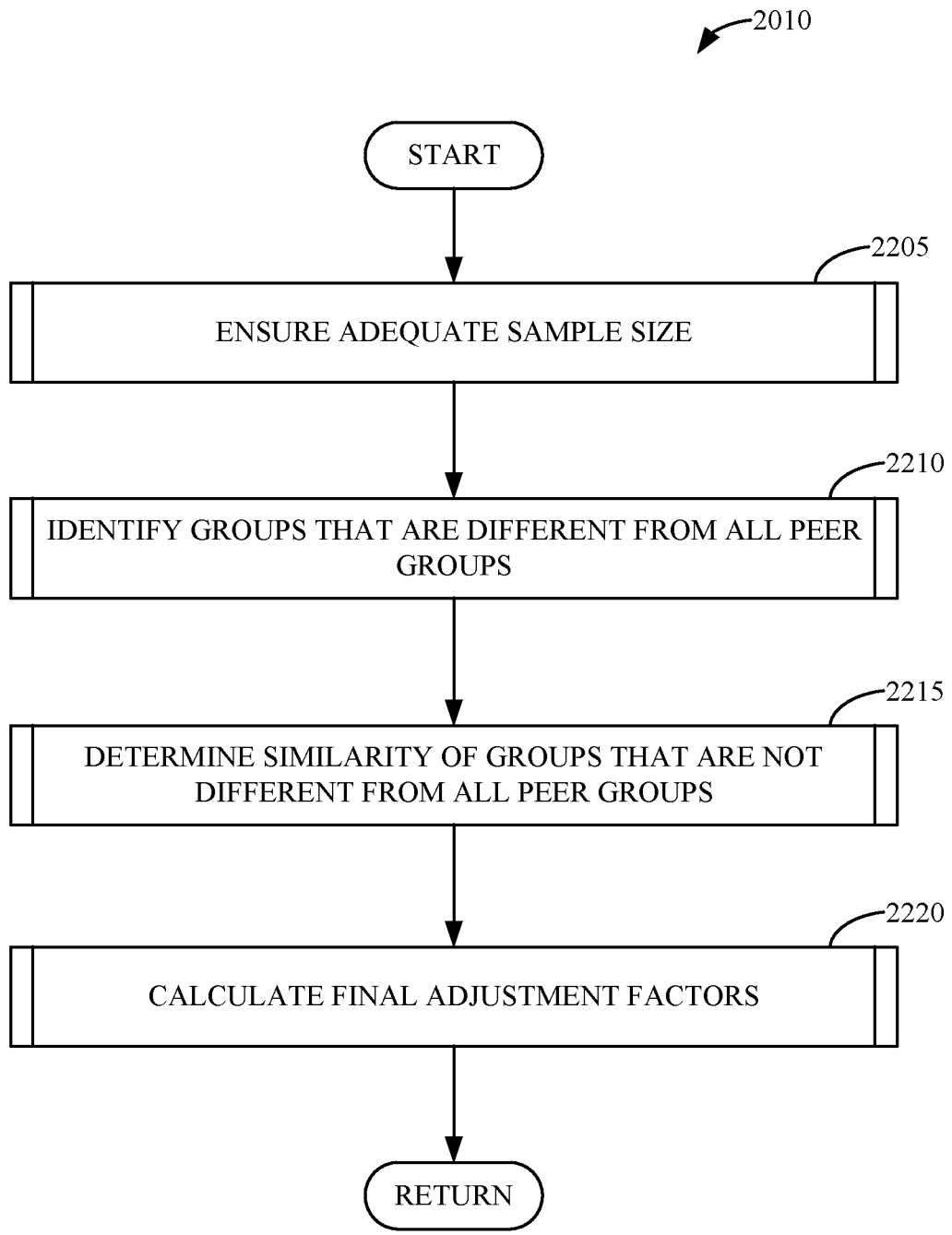
FIG. 22 is a flowchart representative of machine readable instructions which may be executed to implement the example headphone survey adjuster of FIG. 4 in the headphone adjustment research environment of FIG. 1.

At block 2010, the example headphone survey adjuster 145 determines headphone demographic adjustment factors by demographic segments. In some examples, the headphone survey adjuster 145 determines headphone demographic adjustment factors by demographic segments based on the survey result output of the example headphone survey analyzer 140. The example headphone survey adjuster 145 determines the headphone demographic adjustment factors based on the global lift factor calculations. As described in further detail below, the example flowchart 2010 of FIG. 22 represents example instructions that may be implemented to determine headphone demographic adjustment factors by demographic segments.

At block 2015, the example headphone survey adjuster 145 outputs the determined headphone demographic adjustment factors. In some examples, the headphone survey adjuster 145 outputs the determined demographic adjustment factors and global lift factor to the example headphone adjustment factors collector 150 of FIG. 1. In some examples, the example headphone adjustment factors collector 150 stores the headphone demographic adjustment factors and global lift factor from the headphone survey adjuster 145. In some examples, the headphone adjustment factors collector 150 provides the headphone demographic adjustment factors to the example audience adjustment calculator 160 of FIG. 1. After block 2015, process 2000 ends.

Figure 21:
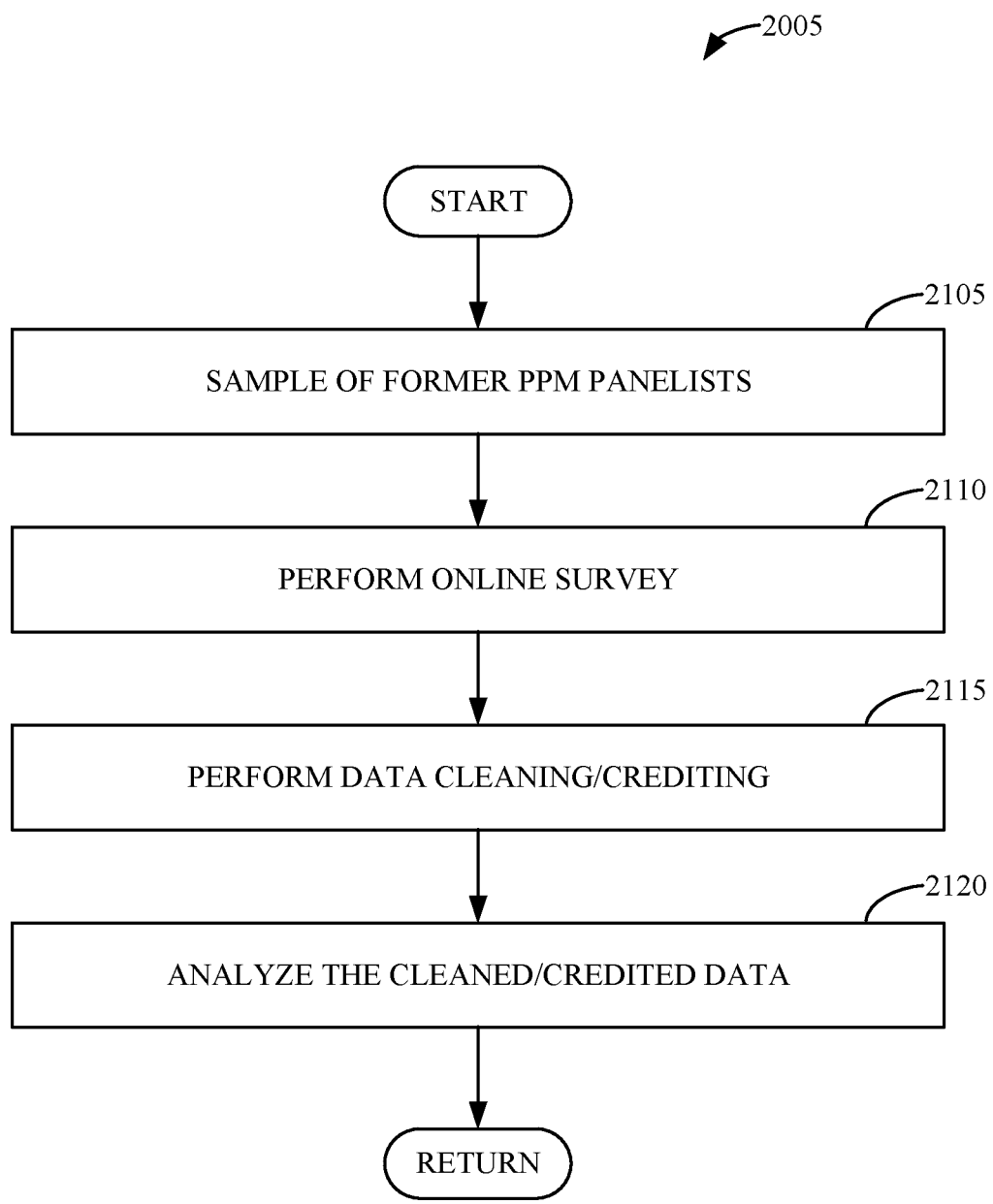
FIG. 21 is a flowchart representative of machine-readable instructions which may be executed to implement the example headphone survey analyzer of FIG. 3 in the headphone adjustment research environment of FIG. 1.

FIG. 21 is a flowchart representative of machine-readable instructions which may be executed to implement the example headphone survey analyzer 140 of FIG. 3 in the headphone adjustment research environment 135 of FIG. 1. The program 2005 of FIG. 21 begins execution at block 2105 at which the example sample selector 305 identifies sample of former PPM panelists. In some examples, the sample selector 305 collects information of former PPM panelists from the panel and station database 125 of FIG. 1. In examples disclosed herein, former PPM panelists are identified as individuals (panelists) that previously agreed to wear the PPM (e.g., the media meter 105 of FIG. 1) to provide media exposure data to the example data center analyzer 115 of FIG. 1. The sample selector 305 identifies a sample of the former PPM panelists and provides the identified sample to the survey conductor 310.

At block 2110, the example survey conductor 310 performs an online survey. In some examples, the survey conductor 310 performs an online headphone survey on the sample of former PPM panelists identified by the example sample selector 305 to determine information regarding headphone use when listening to media. In some examples, the headphone survey is a series of questions about the types of audio that the former PPM panelists listen to and whether or not headphones are used when listening to the audio. In some examples, the "close ended" questions may be behavioral questions about audio listening and headphone usage, and the "open ended" questions may be listening diary entries that former PPM panelists record based on the previous day's audio listening. In other examples, the "close ended" questions may be listening diary entries, and the "open ended" questions may be behavioral questions about audio listening and headphone usage. The headphone survey may include any combination of types of questions to determine information regarding headphone use when listening to media. In some examples, the headphone survey is a recall from a previous day and not a passive electronic measurement like the PPM (e.g., the media meter 105 of FIG. 1). In some examples, the survey conductor 310 obtains the demographic information of the sample of PPM panelists from the former panelists themselves as a part of the questions included in the headphone survey so that demographic information is included in the survey data. In some examples, the survey processor 315 obtains the demographic information of the sample of PPM panelists from the panel and station database 125 to associate the headphone survey results with demographic information.

At block 2115, the example survey processor 315 performs data cleaning. In some examples, the survey processor 315 performs data cleaning/crediting on the data of the headphone survey from the example survey conductor 310. In some examples, the survey processor 315 performs data cleaning on the headphone survey data by removing any incomplete entries/answers from former PPM panelists. In some examples, the survey processor 315 performs data cleaning on the headphone survey data by identifying missing information in any entries from the former PPM panelists. For example, the survey processor 315 identifies any entries from the headphone survey data that are missing demographic information, and the survey processor 315 associates the panel demographic information with the entries from the headphone survey data. In some examples, the survey processor 315 groups related answers from the sample of PPM panelists. For example, the headphone survey includes the same questions for each of the PPM panelists. The survey processor 315 organizes the data from the headphone survey and compiles the listening entries provided by the PPM panelists. In some examples, the survey processor 315 identifies media associated with the listening entries from the sample of PPM panelists and credits the media with quarter hour (QH) of listening to the media, audience estimates, etc. based on the headphone survey data. The example survey processor 315 performs crediting on the data of the survey from the example survey conductor 310 after data cleaning. In some examples, the data cleaning includes crediting. In some examples, the survey processor 315 identifies media associated with the listening entries from the sample of former PPM panelists and credits the media with quarter hour (QH) of listening to the media, audience estimates, etc. based on the headphone survey data.

At block 2120, the example survey data analyzer 320 analyzes the cleaned/credited headphones survey data. In some examples, the survey data analyzer 320 identifies distributions in the headphone survey data relating to type of listening, headphone usage, etc. In some examples, the survey data analyzer 320 determines proportions of listening with and without headphones for different types of radio listening. In some examples, the survey data analyzer 320 determines these proportions with respect to the total radio listening data from the headphone survey data. In some examples, the survey data analyzer 320 parses the headphone survey data from the survey processor 315 to identify the data related to radio listening. The survey data analyzer 320 determines and records the proportion of streaming radio listening with and without headphones. After block 2120, process 2005 completes and returns to process 2000 of FIG. 20.

Figure 23:
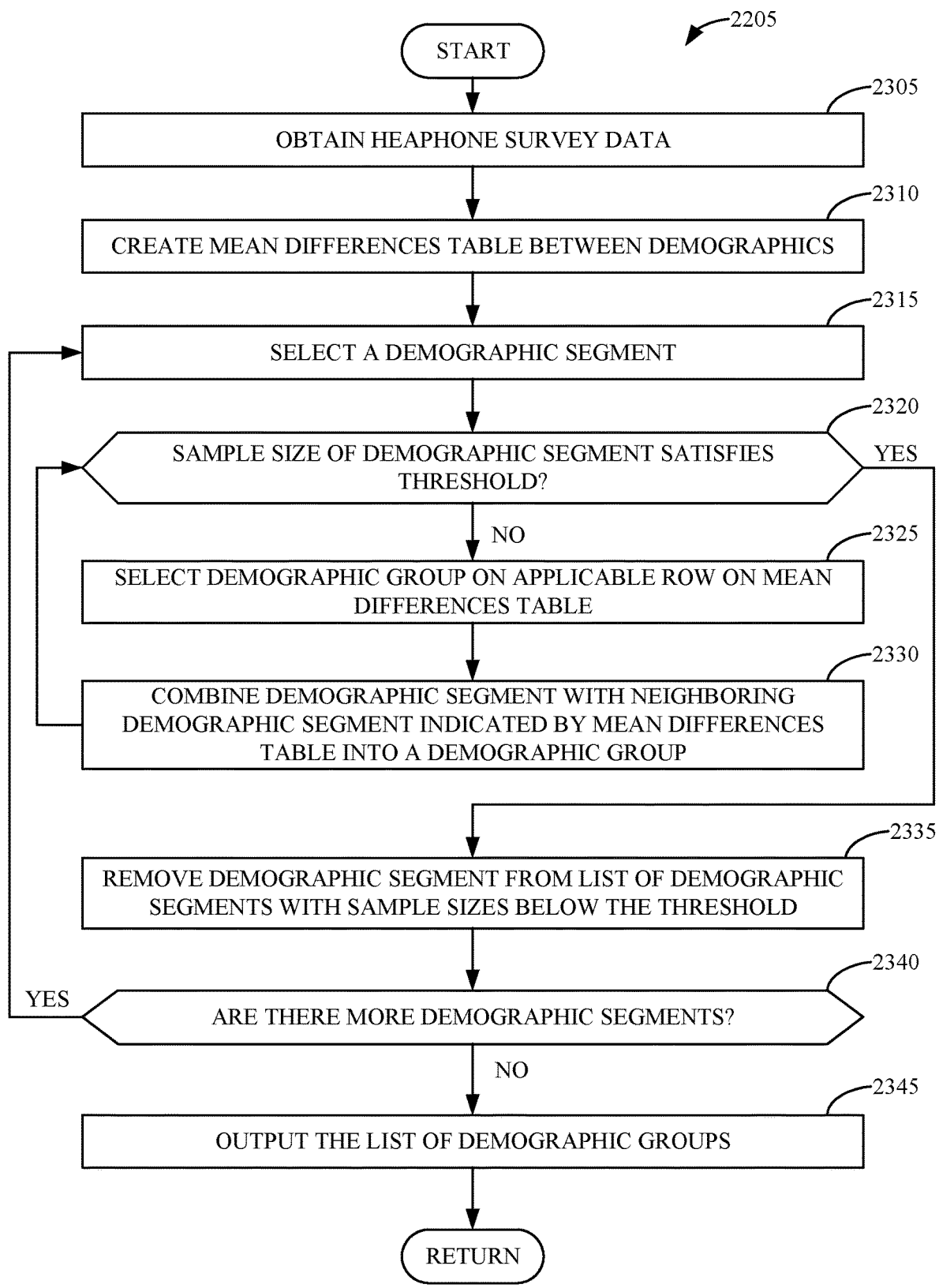
FIG. 23 is a flowchart representative of machine-readable instructions which may be executed to implement the example sample size determiner included in the example headphone survey adjuster 145 of FIG. 4.

FIG. 22 is a flowchart representative of machine readable instructions which may be executed to implement the example headphone survey adjuster of FIG. 4 in the headphone adjustment research environment of FIG. 1. The program 2010 of FIG. 22 begins execution at block 2205 at which the example sample size determiner 405 ensures an adequate sample size. In some examples, the sample size determiner 405 obtains the headphone survey data from the headphone survey analyzer 140 of FIG. 1. In some examples, the sample size determiner 405 identifies demographic groups from the demographic segments identified in the headphone survey data that meet a sample size threshold. For example, the sample size threshold can be 30 samples, 50 samples, etc. In some examples, the sample size determiner 405 selects each of the demographic segments and compares the sample size of the demographic segment to the sample size threshold. As described in further detail below, the example flowchart 2205 of FIG. 23 represents example instructions that may be implemented to ensure an adequate sample size.

Figure 24:
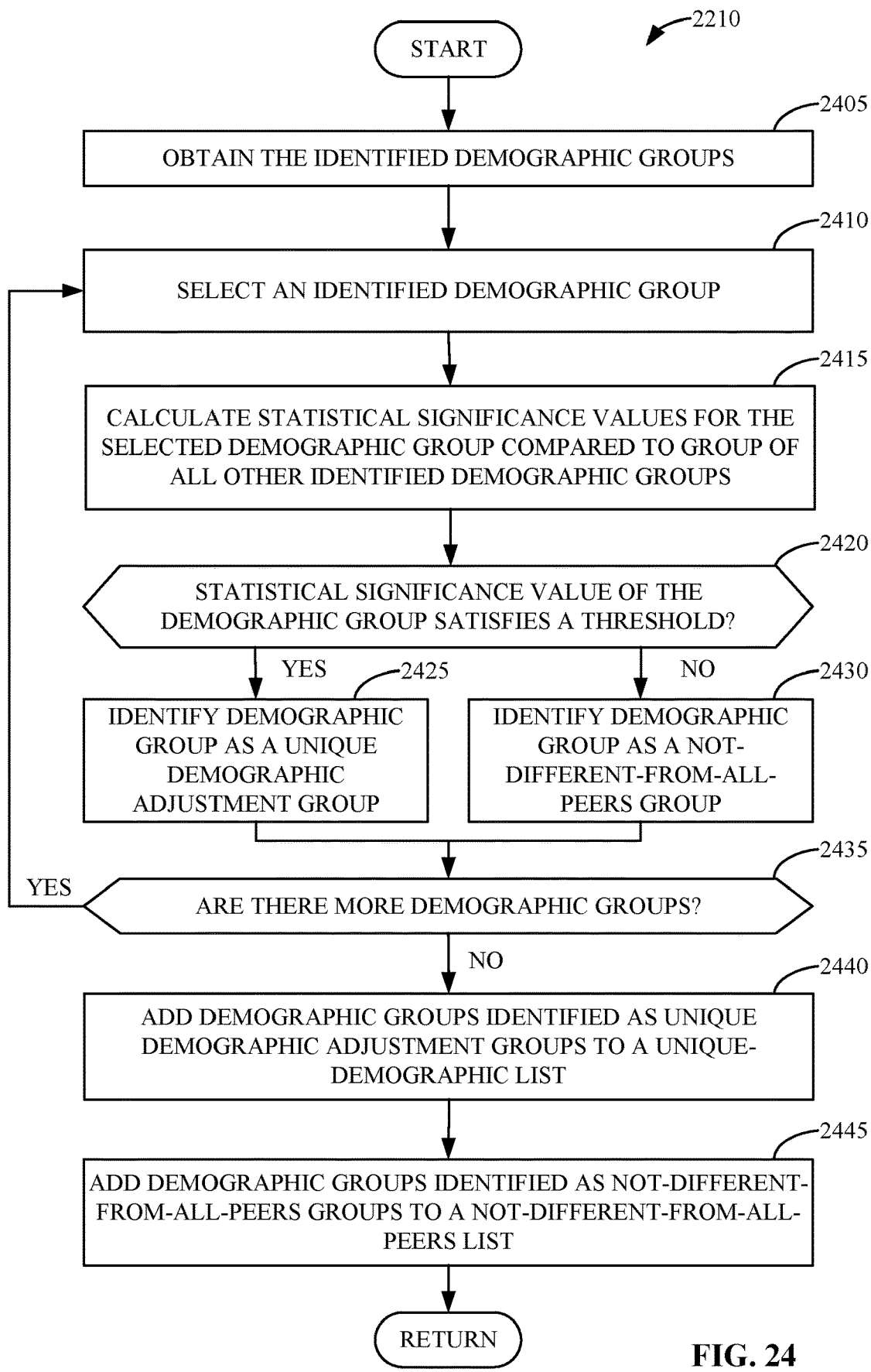
FIG. 24 is a flowchart representative of machine readable instructions which may be executed to implement an example demographic group identifier included in the example headphone survey adjuster 145 of FIG. 4.

At block 2210, the example demographic group identifier 410 identifies groups that are different from all peer groups. In some examples, the demographic group identifier 410 obtains the demographic groups from the sample size determiner 405 and compares each group with all of the other groups (e.g., peer groups). In some examples, the demographic group identifier 410 identifies significantly different demographic groups among the groups output by the example sample size determiner 405. In some examples, the demographic group identifier 410 calculates statistical significance values for the demographic groups. In some examples, the statistical significance values are illustrative of differences in headphone usage behavior among different demographic groups. In some examples, the demographic group identifier 410 determines if each of statistical significance values for the demographic groups (compared to all other demographic groups) satisfy a threshold for statistical difference. As described in further detail below, the example flowchart 2210 of FIG. 24 represents example instructions that may be implemented to identify groups that are different from all peer groups.

Figure 25:
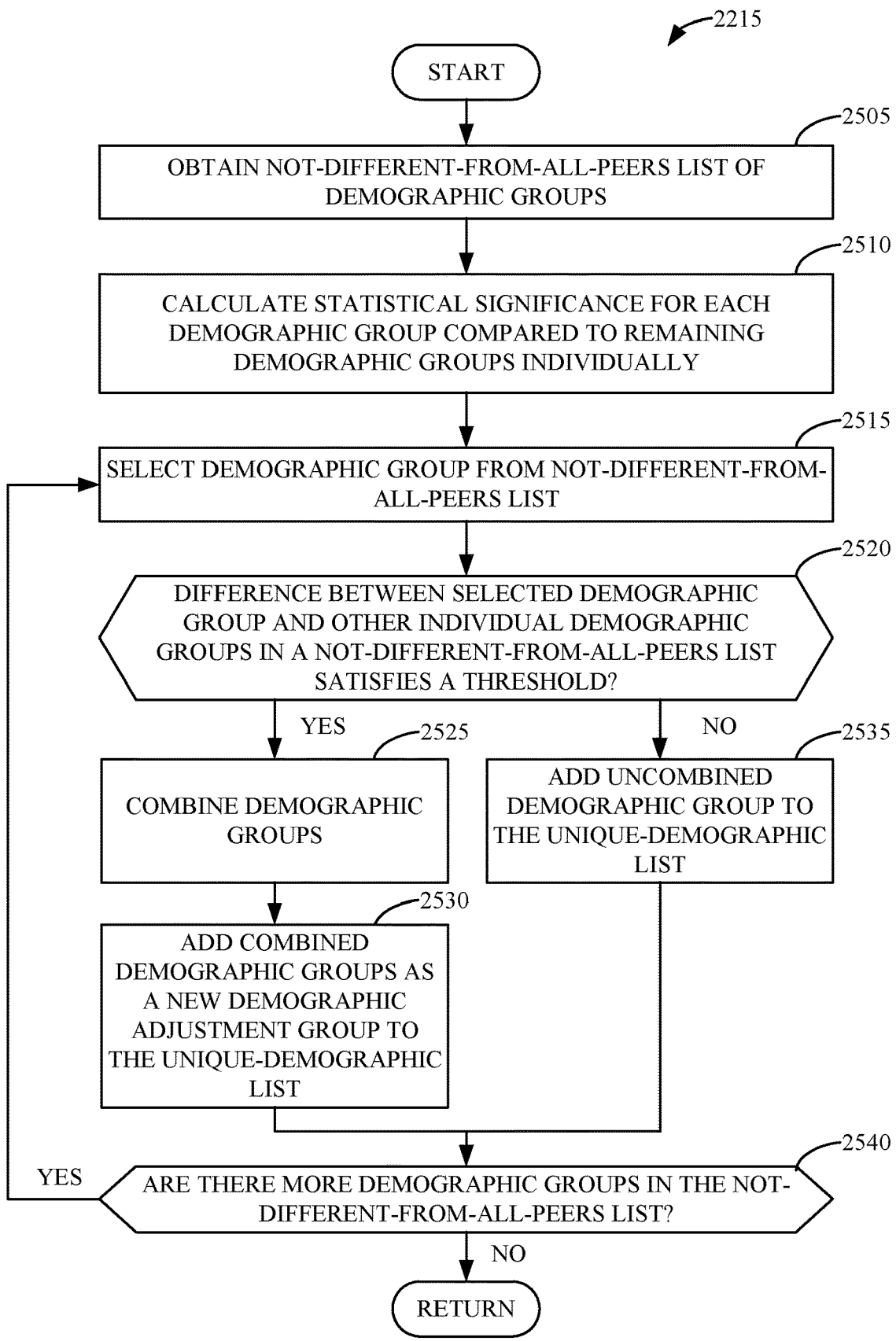
FIG. 25 is a flowchart representative of machine readable instructions which may be executed to implement an example demographic group identifier included in the example headphone survey adjuster of FIG. 4.

At block 2215, the example demographic group identifier 410 determines the similarity of groups that are not different from all peer groups. In some examples, the demographic group identifier 410 obtains a not-different-from-all-peers list that includes the demographic groups that were determined to have statistical significance values that did not satisfy the threshold for statistical difference and therefore were not identified as a unique demographic group when compared to the group of all other demographic groups. In some examples, the demographic group identifier 410 compares the statistical significance values of selected demographic groups and the other demographic groups included in the not-different-from-all-peers list to each other in a pairwise fashion, that is only a first group and a second group are compared to each other for a given comparison. In some examples, the demographic group identifier 410 identifies the demographic groups with differences in statistical significance values that satisfy the threshold for combining two similar demographic groups. In some examples, the demographic group identifier 410 identifies the demographic groups with differences in statistical significance values that do not satisfy the threshold for combining two similar demographic groups. As described in further detail below, the example flowchart 2215 of FIG. 25 represents example instructions that may be implemented to determine the similarity of groups that are not different from all peer groups.

Figure 26:
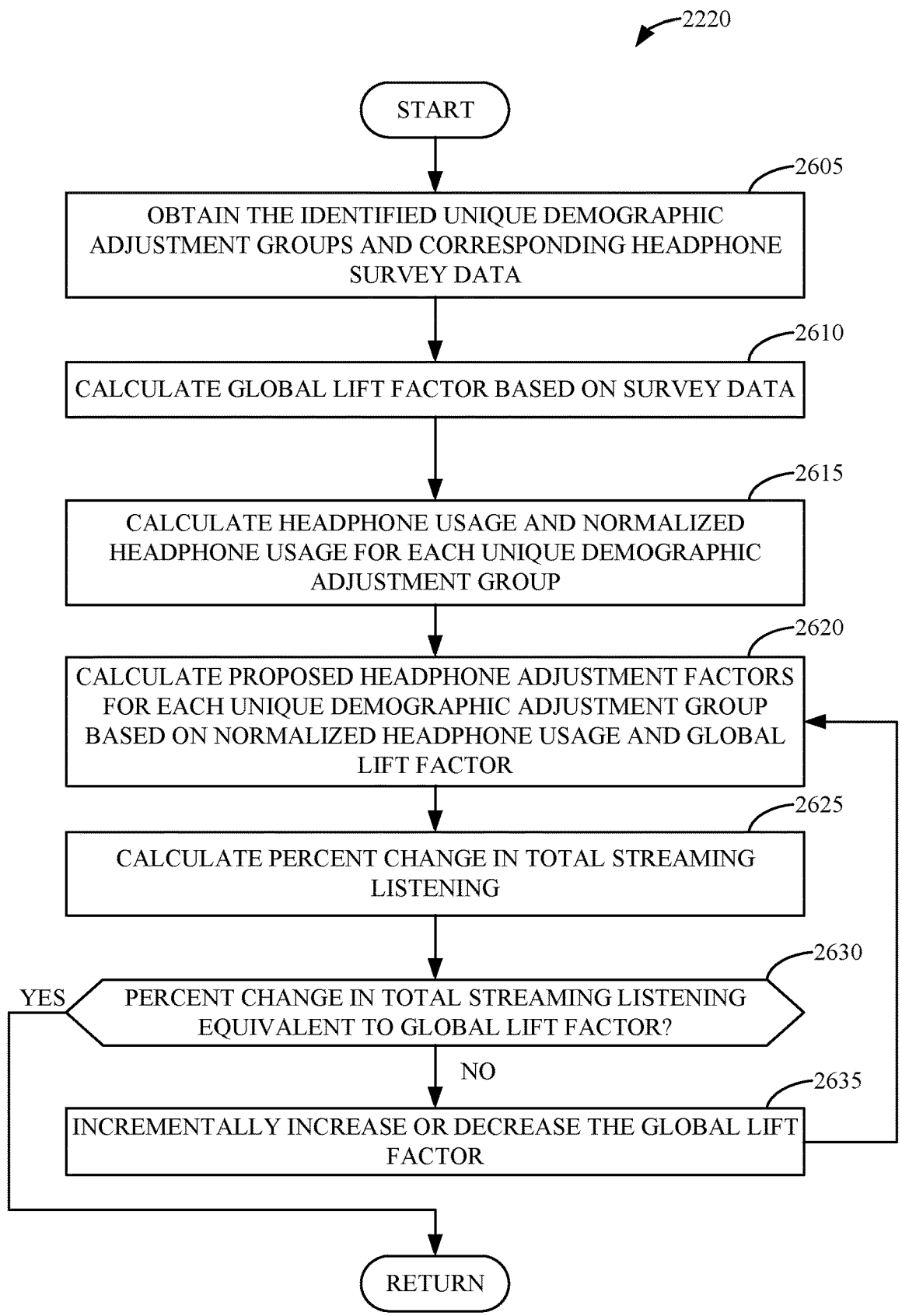
FIG. 26 is a flowchart representative of machine readable instructions which may be executed to implement an example adjustment factor calculator included in the example headphone survey adjuster of FIG. 4.

At block 2220, the example adjustment factor calculator 415 calculates the final adjustment groups. In some examples, the adjustment factor calculator 415 calculates the adjustment factors and the amount of lift needed based on the survey data. In some examples, the adjustment factor calculator 415 calculates a global lift factor for the audience estimates based on the survey data. In some examples, the adjustment factor calculator 415 calculates headphone demographic adjustment factors for the unique demographic adjustment groups identified by the demographic group identifier 410. In some examples, the adjustment factor calculator 415 uses the global lift factor, the proportion of historical streaming media usage for a given demographic group, and the proportion of headphone usage for a given demographic group to determine the headphone demographic adjustment factors. As described in further detail below, the example flowchart 2220 of FIG. 26 represents example instructions that may be implemented to calculate the final adjustment groups. After block 2220, process 2010 completes and returns to process 2000 of FIG. 20.

FIG. 23 is a flowchart representative of machine-readable instructions which may be executed to implement the example sample size determiner 405 included in the example headphone survey adjuster 145 of FIG. 4. The program 2205 of FIG. 23 begins execution at block 2305 at which the example sample size determiner 405 obtains the headphone survey data. At block 2310, the example sample size determiner 405 creates a mean difference table 1300. In some examples, the sample size determiner 405 creates the mean difference table 1300 for the various demographic groups included in the headphone survey data. In some examples, the mean difference table 1300 is sorted in ascending order (e.g., the top row of the table shows two demographic segments that have the least mean difference, that is, they are most alike, and the bottom of the table shows two demographic segments that have the greatest mean difference, that is, they are least alike). However, other sorting orders may additionally and/or alternatively be used. At block 2315, the example sample size determiner 405 selects a demographic segment.

At block 2320, the example sample size determiner 405 determines if the sample size of the demographic segment satisfies a threshold. In some examples, the sample size determiner 405 selects the demographic segment and compares the sample size of the demographic segment to the sample size threshold. For example, the sample size threshold can be 30 samples, 50 samples, etc. If the example sample size determiner 405 determines the sample size of the demographic segment satisfies (e.g., meets or exceeds) the threshold, then program 2205 continues to block 2335 at which the example sample size determiner 405 removes the demographic from the list of demographic segments with sample sizes below the threshold. If the example sample size determiner 405 determines the sample size of the demographic segment does not satisfy (e.g., does not meet or exceed) the sample size threshold, then program 2205 continues to block 2325 at which the example sample size determiner 405 selects a demographic group on the applicable row on the mean difference table (e.g., the mean difference table 1300 of FIG. 13). In some example, the example sample size determiner 405 looks up the demographic segment on the mean difference table (e.g., the mean difference table 1300). In some examples, the mean difference table (e.g., the example mean difference table 1300) has two demographic groups on each row, and each row includes the mean difference between those two demographic groups. In some examples, these two demographic groups together can be referred to as a comparison pair. In some examples, the sample size determiner 405 checks the rows in the mean difference table (e.g., the mean difference table 1300) to find the applicable row for the selected demographic segment.

At block 2330, the example sample size determiner 405 combines the demographic segment with the neighboring demographic segment indicated by the mean difference table (e.g., the mean difference table 1300) into a demographic group. In examples disclosed herein, a demographic group includes demographic segment(s) that are related in demographic information (e.g., as least one of age, gender, and race). In some examples, the demographic segments(s) included in the demographic group are sub-categories of the demographic information included in the demographic group. For example, a demographic group including all samples in the same age range, a demographic segment included in the demographic group includes sub-category information (e.g., race, gender) in addition to the related age range. In some examples, if the demographic row in the mean difference table (e.g., the example mean difference table 1300) is applicable, then the sample size determiner 405 collapses and/or combines the selected demographic segment with the neighboring demographic segment that is associated with the demographic group of the comparison pair with the least mean difference. After block 2330, the program 2205 returns to block 2320 at which the example sample size determiner 405 determines if the sample size of the new demographic group satisfies a threshold. In some examples, this process of creating a demographic group that satisfies a threshold repeats until the created demographic group has a sufficient sample size.

At block 2335, the example sample size determiner 405 removes the demographic segment(s) from the list of demographic segments with sample sizes below the threshold. In some examples, the sample size determiner 405 determines that the demographic segment or demographic segments included in a demographic group have a sufficient sample size. In such examples, the demographic segment and/or the demographic segments included in the created demographic group are removed from the list of demographic segments with sample sizes below the threshold (e.g., no longer able to be selected by the sample size determiner 405 at block 2315).

At block 2340, the example sample size determiner 405 determines if there are more demographic segments. If the example sample size determiner 405 determines that there are more demographic segments, then program 2205 returns to block 2315 at which the example sample size determiner 405 selects a new demographic segment available. If the example sample size determiner 405 determines there are not anymore demographic segments, then program 2205 continues to block 2345 at which the example sample size determiner 405 outputs the list of demographic groups.

At block 2345, the example sample size determiner 405 outputs the list of demographic groups. In some examples, the sample size determiner 405 outputs the final list of demographic groups that have a sufficient sample size to the example demographic group identifier 410. After block 2345, process 2205 completes and returns to process 2010 of FIG. 22.

FIG. 24 is a flowchart representative of machine readable instructions which may be executed to implement an example demographic group identifier 410 included in the example headphone survey adjuster 145 of FIG. 4. The program 2210 of FIG. 24 begins execution at block 2405 at which the example demographic group identifier 410 obtains the identified demographic groups. At block 2410, the example demographic group identifier 410 selects an identified demographic group.

At block 2415, the example demographic group identifier 410 calculates statistical significance values for each of the selected demographic groups compared to the group of all other identified demographic groups. In some examples, the example demographic group identifier 410 calculates statistical significance values for a given demographic group compared to the group of all other demographic groups. For example, the demographic group identifier 410 calculates p values as the statistical significance values using t-tests, however, other statistical comparisons may alternatively be used. In some examples, the statistical significance values are illustrative of the differences in headphone usage behavior among different demographic groups. For example, the headphone usage information for a demographic group is compared to entire headphone usage information from all of the other demographic groups to determine the statistical significance value for the demographic group compared to the group of all other demographic groups.

At block 2420, the example demographic group identifier 410 determines if the statistical significance value for a demographic group satisfies a threshold. In some examples, the example demographic group identifier 410 determines if a statistical significance value of a demographic group compared to the group of all other demographic groups satisfies a threshold. In some examples, the demographic group identifier 410 determines if each of statistical significance values for the demographic groups compared to the group of all other demographic groups satisfy a threshold for statistical difference. For example, the threshold for statistical difference can be a p value of 0.05, 0.1, etc. If the example demographic group identifier 410 determines the statistical significance value of the demographic group satisfies the threshold (e.g., is below), then program 2210 continues to block 2425 at which the example demographic group identifier 410 identifies the demographic group as a unique demographic adjustment group. If the example demographic group identifier 410 determines the statistical significance value of the demographic group does not satisfy the threshold (e.g., meets or exceeds), then program 2210 continues to block 2430 at which the example demographic group identifier 410 identifies the demographic group as a not-different-from-all-peers group.

At block 2435, the example demographic group identifier 410 determines if there are more demographic groups. If the example demographic group identifier 410 determines there are more demographic groups, then program 2210 returns to block 2410 at which the example demographic group identifier 410 selects a new identified demographic group. If the example demographic group identifier 410 determines there are no more demographic groups, then 2210 continues to block 2440 at which the example demographic group identifier 410 adds the demographic groups identified as unique demographic adjustment groups to the unique-demographic list.

At block 2440, the example demographic group identifier 410 adds the demographic groups identified as unique demographic adjustment groups to a unique-demographic list. In some examples, the unique demographic adjustment group is stored in a list (e.g., called the unique-demographic list) for use later by the example adjustment factor calculator 415. At block 2445, the example demographic group identifier 410 adds the demographic groups identified as not-different-from-all-peers groups to a not-different-form-all-peers list. In some examples, the demographic groups stored in a list/table of groups identified as unique demographic adjustment groups are removed from the comparison. In some examples, program 2210 is repeated on just the demographic groups identified as not-different-from-all-peers. At this point, process 2210 completes and returns to process 2010 of FIG. 22.

FIG. 25 is a flowchart representative of machine readable instructions which may be executed to implement an example demographic group identifier 410 included in the example headphone survey adjuster 145 of FIG. 4. The program 2215 of FIG. 25 begins execution at block 2505 at which the example demographic group identifier 410 obtains the not-different-from-all-peers list of demographic groups.

At block 2510, the example demographic group identifier 410 calculates the statistical significances for each individual demographic group compared to each of the remaining demographic groups individually. In some examples, the example demographic group identifier 410 determines statistical significance values between each individual demographic group included in the not-different-from-all-peers list and the additional demographic groups in the not-different-from-all-peers list in a pair-wise fashion. In some examples, the demographic group identifier 410 compares the demographic groups included in the not-different-from-all-peers list. For example, the demographic group identifier 410 calculates the statistical significance values between two demographic groups in the not-different-from-all-peers list being compared using the headphone usage data of the two individual demographic groups (instead of the headphone usage information from all of the other demographic groups as described above). In some examples, the statistical significance values are illustrative of the differences in headphone usage behavior in the first demographic group and headphones usage behavior in the second demographic group. In some examples, the demographic group identifier 410 determines the statistical significance values for all pairs of the demographic groups in the not-different-from-all-peers list.

At block 2515, the example demographic group identifier 410 selects a demographic group from the not-different-from-all-peers list. At block 2520, the example demographic group identifier 410 determines if the difference between the selected demographic group and the other individual demographic groups in the not-different-from-all-peers list satisfies a threshold. In some examples, the demographic group identifier 410 compares the selected demographic group to each of the other individual demographic groups in the not-different-from-all-peers list using statistical significance values. In some examples, the demographic group identifier 410 determines if the statistical significance value for the comparison of two demographic groups (e.g., the selected demographic group and a different demographic group included in the not-different-from-all-peers list) satisfies the threshold. For example, the threshold for statistical difference can be a p value of 0.5, 0.1, etc. In some examples, the demographic group identifier 410 determines if the statistical significance value for a comparison of two demographic group does satisfy the threshold (e.g., meets or exceeds). In some examples, the demographic group identifier 410 compares the selected demographic group to each of the other demographic groups in the not-different-from-all-peers list to combine the demographic groups that all had comparisons that satisfied the threshold. If the example demographic group identifier 410 determines the difference between the selected demographic group and any of the other demographic groups in the not-different-from-all-peers list does satisfy the threshold (e.g., meets or exceeds), then program 2215 continues to block 2525 at which the example demographic group identifier 410 combines the demographic groups. At block 2525, the example demographic group identifier 410 combines the selected demographic group with the other demographic group(s) in the not-different-from-all-peers list that had difference(s) that did not satisfy the threshold. At block 2530, the example demographic group identifier 410 adds the combined demographic groups as a new demographic group to the unique-demographic list. In some examples, the combined demographic groups are stored as a unique demographic adjustment group in the unique-demographic list for use later by the example adjustment factor calculator 415.

If the example demographic group identifier 410 determines the difference between the selected demographic group and the other demographic groups in the not-different-from-all-peers list does not satisfy the threshold (e.g., below), then program 2215 continues to block 2535 at which the example demographic group identifier 410 adds the uncombined demographic group to the unique-demographic list. In some examples, if the demographic group identifier 410 determines the comparison of the selected demographic group with each of the other demographic groups in the not-different-from-all-peers list does not satisfy the threshold, the demographic group identifier 410 does not combine the selected demographic group with any one of the other demographic groups in the not-different-from-all-peers list. The example demographic group identifier 410 adds the selected, uncombined demographic group to the unique-demographic list as a unique demographic adjustment group. In some examples, the selected, uncombined demographic group is stored as a unique demographic adjustment group in the unique-demographic list for use later by the example adjustment factor calculator 415.

At block 2540, the example demographic group identifier 410 determines if there are more demographic groups in the not-different-from-all-peers list. If the example demographic group identifier 410 determines there are more demographic groups in the not-different-from-all-peers list, then program 2215 returns to block 2515 at which the example demographic group identifier 410 selects a new demographic group from the not-different-from-all-peers list. If the example demographic group identifier 410 determines there are not anymore demographic groups in the not-different-from-all-peers list, then program 2215 completes and returns to program 2010 of FIG. 22.

FIG. 26 is a flowchart representative of machine readable instructions which may be executed to implement an example adjustment factor calculator 415 included in the example headphone survey adjuster 145 of FIG. 4. The program 2220 of FIG. 26 begins execution at block 2605 at which the example adjustment factor calculator 415 obtains the identified unique demographic adjustment groups and the corresponding headphone survey data. At bock 2610, the example adjustment factor calculator 415 to calculates amount of the global lift factor that is needed. In some examples, the adjustment factor calculator 415 calculates a global lift factor for the audience estimates from the listening data determined by the headphones survey analyzer 140 of FIG. 1. In some examples, the adjustment factor calculator 415 compares the proportions of streaming radio listening without headphones from the headphone survey results to the proportion of streaming radio listening with headphones from the headphone survey results. In some examples, the adjustment factor calculator 415 identifies a ratio estimation of the proportions of streaming radio listening with and without headphones from the headphone survey. In some examples, the resulting ratio from the ratio estimation is determined to be the global lift factor used by the adjustment factor calculator 415 to determine the adjustment factors for each final unique demographic group. In some examples, the global lift factor identifies an adjustment (lift) to be applied to the PPM data to account for streaming radio listening data that was not captured by the PPM (media meter 105 of FIG. 1) because of headphone usage.

At block 2615, the example adjustment factor calculator 415 calculates headphone usage and normalized headphone usage for each unique demographic adjustment group. In some examples, the adjustment factor calculator 415 uses the headphones survey data to determine the headphone usage and normalized headphone usage. At block 2620, the example adjustment factor calculator 415 calculates the proposed headphone adjustment factors for each unique demographic adjustment group based on normalized headphone usage data and the global lift factor. In some examples, the example adjustment factor calculator 415 calculates proposed headphone demographic adjustment factors for unique demographic adjustment groups. In some examples, the adjustment factor calculator 415 uses the global lift factor to determine the proposed headphone demographic adjustment factors In some examples, the adjustment factor calculator 415 may determine a different proposed headphone demographic adjustment factor for each of the unique demographic adjustment groups previously identified in the demographic group identifier 410.

At block 2625, the example adjustment factor calculator 415 calculates a percent change in the total streaming listening. In some examples, the example adjustment factor calculator 415 calculates the total percent change in streaming listening based on the proposed headphone demographic adjustment factors and historical PPM panel data from the PPM data included in the example panel and station database 125 of FIG. 1. At block 2630, the example adjustment factor calculator 415 determines if the percent change in total streaming listening is equivalent to the global lift factor. In some examples, the example adjustment factor calculator 415 determines whether the percent change in total streaming listening is equivalent (e.g., the same) as the global lift factor (e.g., 61%). If the example adjustment factor calculator 415 determines the percent change in the total streaming listening is not equivalent to the global lift factor, then program 2220 continues to block 2635 at which the example global lift factor is adjusted, creating an example effective global lift factor. In some examples, the example adjustment factor calculator 415 increases or decreases the effective global lift factor. After block 2635, the program 2220 returns to block 2620 at which the example adjustment factor calculator 415 calculates the headphone adjustment factors for each unique demographic adjustment group with the updated effective global lift factor. If the example adjustment factor calculator 415 determines the percent change in the total streaming listening is equivalent to the global lift factor, then the example adjustment factor calculator 415 identifies the final headphone demographic adjustment factors for the unique demographic adjustment groups and the program 2220 completes and returns to program 2010 of FIG. 22.

Figure 27:
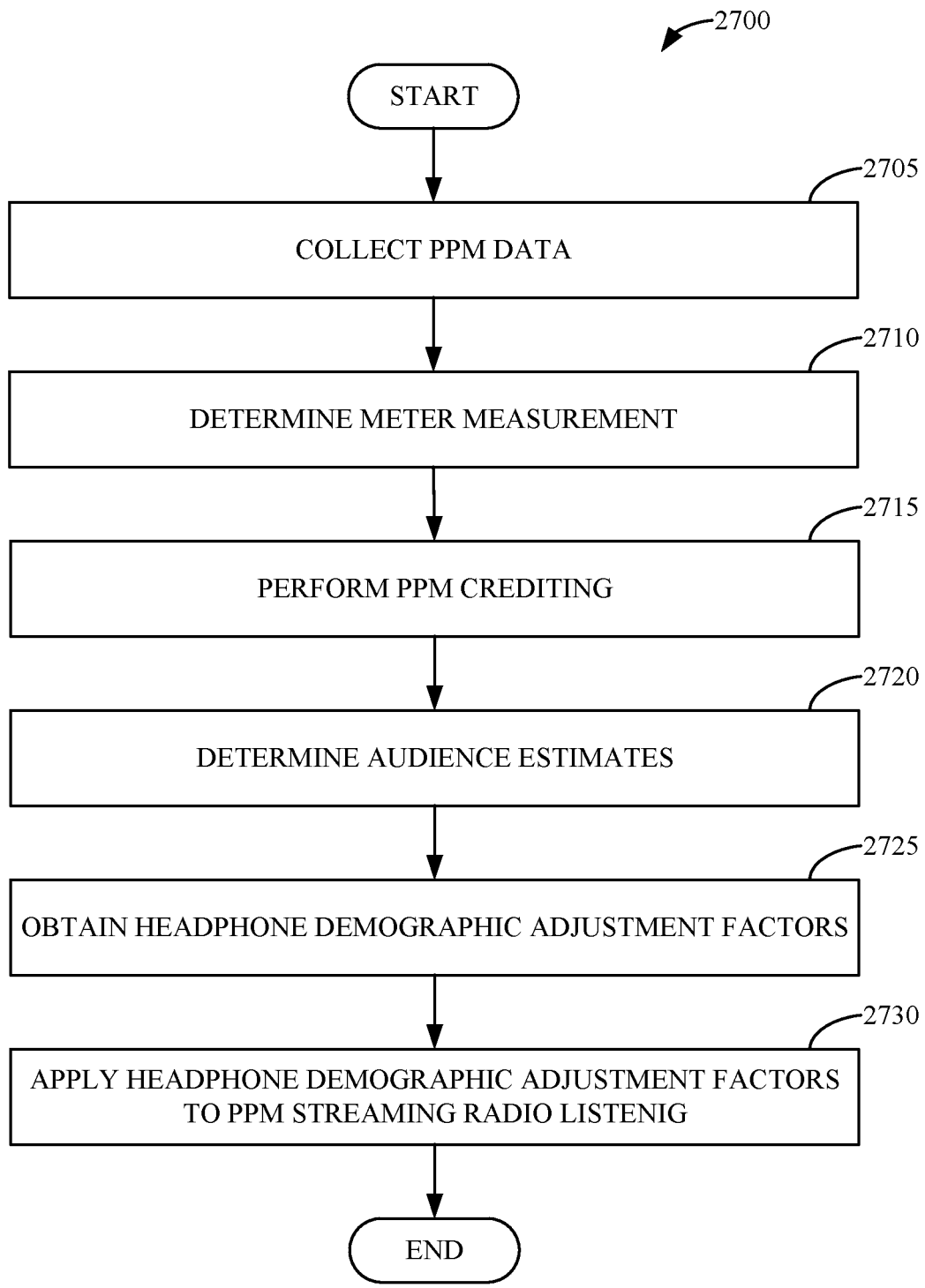
FIG. 27 is a flowchart representative of machine-readable instructions which may be executed to implement the example production environment of FIG. 1.

FIG. 27 is a flowchart representative of machine-readable instructions which may be executed to implement the example production environment 100 of FIG. 1. The program 2700 of FIG. 27 begins execution at block 2705 at which the example panel collector 205 obtains the PPM data from the example media meter 105 (FIG. 1) via the network 110 (FIG. 1). At block 2710, the example meter data analyzer 120 determines the meter measurement from the PPM data collected by the panel collector 205. In some examples, the example meter measurement determiner 210 conducts preliminary processing to parse the data coming from the media meter 105 and determines the meter measurement. In some examples, the meter measurement determiner 210 determines meter measurements from the audio data collected by the example media meter 105. In some examples, the meter measurements determiner 210 parses the audio data to identify the encoded audio streams, audio signatures, audio watermarks, etc. In some examples, the media meter 105 collects audio data for a continuous amount of time. In some examples, the meter measurement determiner 210 identifies the media exposure data to determine the meter measurements from the audio data collected by the media meter 105. In some examples, the example meter data analyzer 120 performs processing, cleaning, and editing on the media exposure data. For example, the meter data analyzer 120 can edit the media exposure data to remove any background audio that may have been collected by the media meter 105.

In some examples, meter data analyzer 120 obtains panel data and station data from the example panel and station database 125 (FIG. 1). In some examples, the PPM panel data includes panelists' information, a history of listening data, and reference data (e.g., reference audio streams, reference audio signatures, reference audio watermarks, etc.). In some examples, the meter data analyzer 120 obtains information about the panelists such as, demographic information (e.g., age, race, gender, etc.), and listening data history (associated with panelists' information). In some examples, the meter data analyzer 120 obtains reference data (e.g., reference audio streams, reference audio signatures, reference audio watermarks, etc.) associated with different media identified by the meter data analyzer 120. In some examples, the station data includes radio station identification information (e.g., station signature codes). The meter data analyzer 120 obtains the station data to identify radio station (e.g., using the station signature codes) to compare to the media exposure data. In some examples, the meter data analyzer 120 compares the reference data (e.g., reference audio streams, reference audio signatures, reference audio watermarks, etc.) and the media exposure data (e.g., encoded audio streams, audio signatures, audio watermarks, etc.) to determine matches between the reference data and the media exposure data. For example, meter data analyzer 120 can perform signature matching, watermark matching, etc. to identify matches between the reference data and media exposure data.

At block 2715, the example audience determiner 130 performs PPM crediting. In some examples, the audience determiner 130 receives the media exposure data (e.g., encoded audio streams, audio signatures, audio watermarks, etc.) of the meter measurements from the example meter measurement determiner 210. In some examples, the audience determiner 130 receives reference data (e.g., reference audio streams, reference audio signatures, reference audio watermarks, etc.) from the panel and station database 125 of FIG. 1. In some examples, the audience determiner 130 performs PPM service crediting on the media exposure data using the reference data from the panel and station database 125. In some examples, when the meter data analyzer 120 identifies a match between the reference data and the media exposure data, the audience determiner 130 credits the media associated with the reference data (e.g., a radio broadcast, a radio stream, a song, a television episode, etc.).

At block 2720, the example audience determiner 130 determines the audience estimates. In some examples, after the meter data analyzer 120 processes, cleans, and edits for the media exposure data, the audience determiner 130 generates audience estimate data based on the edited results. In some examples, the audience determiner 130 identifies the panelist information associated with the media meter 105 to include in the audience estimate data. In some examples, the audience determiner 130 credits the media by associating the media exposure data and the panelist information as audience listening data for the media. In some examples, the audience determiner 130 collects the listening data from the panel and station database 125 to determine the total audience listening data for a period of time for the media. In some examples, the audience determiner 130 estimates the audiences for different media (e.g., a radio broadcast, a radio stream, a song, a television episode, etc.) based on its crediting of the media exposure data collected by the media meter 105. In some examples, the audience estimates identify a count of listeners for the media (e.g., how many individuals were listening to a radio broadcast for a period of time) and associated panelist information (e.g., demographic information) for the audience.

At block 2725, the example audience adjustment calculator 160 obtains the headphone demographic adjustment factors. In some examples, the example audience adjustment calculator 160 collects data from the headphone adjustment factors collector 150. In some examples, the audience adjustment calculator 160 collects demographic group data and/or headphones adjustment factors for demographic groups. At block 2730, the example audience adjustment calculator 160 applies the headphone demographic adjustment factors to the PPM streaming radio listening. In some examples, the example audience adjustment calculator applies the headphones demographic adjustment factors for demographic groups to streaming radio listening audience estimates. After block 2730, the program 2700 ends.

Figure 28:
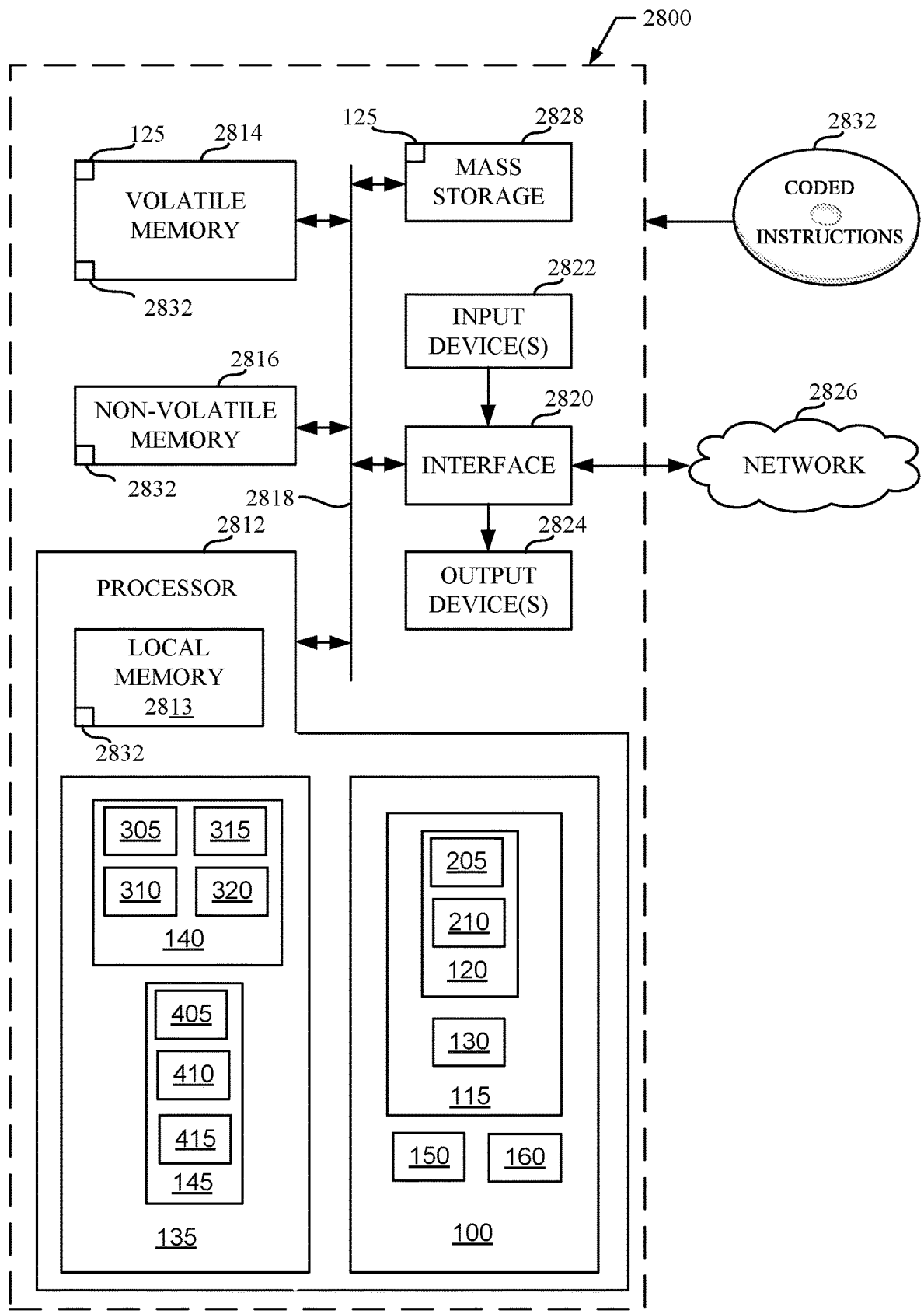
FIG. 28 is a block diagram of an example processing platform structured to execute the instructions of FIGS. 20, 21, 22, 23, 24, 25, 26, 27 to implement a headphone survey analyzer, a headphone survey adjuster, a data center analyzer, a panel and station database, a headphone adjustment factors collector, and an audience adjustment calculator of FIG. 1.

FIG. 28 is a block diagram of an example processor platform 2800 structured to execute the instructions of FIGS. 20, 21, 22, 23, 24, 25, 26, 27 to implement the example headphone survey analyzer 140, the example headphone survey adjuster 145, the example data center analyzer 115, the example panel and station database 125, the example headphone adjustment factors collector 150, and the example audience adjustment calculator 160 of FIG. 1. The processor platform 2800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset or other wearable device, or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example headphone survey analyzer 140, the example headphone survey adjuster 145, the example sample selector 305, the example survey conductor 310, the example survey processor 315, the example survey data analyzer 320, the example sample size determiner 405, the example demographic group identifier 410, the example adjustment factor calculator 415, the example meter data analyzer 120, the example audience determiner 130, the example headphone adjustment factors collector 150, the example audience adjustment calculator 160, the example panel collector 205, and the example meter measurement determiner 210.

The processor 2812 of the illustrated example includes a local memory 2813 (e.g., a cache). The processor 2812 of the illustrated example is in communication with a main memory including a volatile memory 2814 and a non-volatile memory 2816 via a bus 2818. The volatile memory 2814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2816 may be implemented by flash memory and/or any other desired type of memory device. Access to the main memory 2814, 2816 is controlled by a memory controller.

The processor platform 2800 of the illustrated example also includes an interface circuit 2820. The interface circuit 2820 may be implemented by any type of interface standard, such as an Ethernet interface, a universal serial bus (USB), a Bluetooth® interface, a near field communication (NFC) interface, and/or a PCI express interface.

In the illustrated example, one or more input devices 2822 are connected to the interface circuit 2820. The input device(s) 2822 permit(s) a user to enter data and/or commands into the processor 2812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2824 are also connected to the interface circuit 2820 of the illustrated example. The output devices 2824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2820 of the illustrated example, thus, typically includes a graphics driver card, a graphics driver chip and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, redundant array of independent disks (RAID) systems, and digital versatile disk (DVD) drives.

The machine executable instructions 2832 of FIGS. 20, 21, 22, 23, 24, 25, 26, 27 may be stored in the mass storage device 2828, in the volatile memory 2814, in the non-volatile memory 2816, and/or on a removable non-transitory computer readable storage medium such as a CD or DVD.

From the foregoing, it will be appreciated that example methods, apparatus and articles of manufacture have been disclosed that determine headphone adjustment for portable people meter listening to encoded audio streams. The disclosed methods, apparatus and articles of manufacture improve the efficiency of using a computing device by leveraging measurements from a PPM to determine adjustment for media played on headphones that are not able to be measured by the PPM. The disclosed methods, apparatus and articles of manufacture are accordingly directed to one or more improvement(s) in the functioning of a computer.

Example methods, apparatus, systems, and articles of manufacture to determine headphone adjustment for portable people meter listening to encoded audio streams are disclosed herein. Further examples and combinations thereof include the following:

Example 1 includes a system comprising a meter data analyzer to determine audience estimates for streaming media based on media data measured by a media meter, a headphone survey analyzer to calculate a global lift factor based on a determined proportion of an audience that listens to streaming media via headphones and a determined proportion of the audience that listens to streaming media without headphones, a headphone survey adjuster to calculate adjustment factors for a plurality of unique demographic adjustment groups, wherein the adjustment factors are constrained by the global lift factor, and an audience adjustment calculator to apply the adjustment factors to the audience estimates for streaming media, wherein the adjustment factors are applied to audience members in the audience estimates that are associated with respective unique demographic adjustment groups, and report new audience estimates based on the audience estimates with the applied adjustment factors.

Example 2 includes the system of example 1, wherein the headphone survey adjuster is to sample a former audience associated with the media data measured by the media meter for an online survey, the online survey to determine the proportion of the audience that listens to streaming media via headphones and the proportion of the audience that listens to streaming media without headphones, the online survey including demographic information of the audience.

Example 3 includes the system of example 1, wherein the global lift factor indicates an adjustment amount for the audience estimates for streaming media to account for media data not measured by the media meter because of headphones.

Example 4 includes the system of example 1, wherein the headphone survey adjuster is to determine a plurality of demographic groups by aggregating neighboring demographic segments into a demographic group based on sample size, wherein the demographic segments are sub-categories of the plurality of demographic groups.

Example 5 includes the system of example 4, wherein the headphone survey adjuster is to aggregate the neighboring demographic segments into a demographic group until a sample size of the demographic group satisfies a threshold.

Example 6 includes the system of example 5, wherein the headphone survey adjuster is to determine differences in mean proportions of streaming media via headphones for the plurality of demographic groups, the headphone survey adjuster to aggregate the neighboring demographic segments into the demographic group based on a minimum applicable difference in mean.

Example 7 includes the system of example 1, wherein the headphone survey adjuster is to identify the plurality of unique demographic adjustment groups from the plurality of demographic groups by determining if statistical significance values for the plurality of demographic groups satisfy a threshold, wherein the threshold identifies statistically different demographic groups.

Example 8 includes the system of example 7, wherein a first demographic group is included in a first unique demographic adjustment group when a statistical significance value satisfies the threshold, the statistical significance value associated with a difference between the first demographic group and a group of all other demographic groups.

Example 9 includes the system of example 7, wherein a first demographic group and a second demographic group are included in a first unique demographic adjustment group when a statistical significance value associated with a difference between the first demographic group and the second demographic group does not satisfy the threshold.

Example 10 includes the system of example 1, wherein the headphone survey analyzer is to determine a proportion of media data measured by the headphone survey that includes streaming media for a plurality of demographic groups.

Example 11 includes the system of example 10, wherein the headphone survey adjuster is to calculate the adjustment factors for the plurality of unique demographic adjustment groups wherein an average of the adjustment factors satisfies the global lift factor, the headphone survey adjuster calculates the adjustment factors using a proportion of headphone usage for the plurality of demographic groups determined by an online survey and an effective global lift factor, wherein the effective global lift factor is based on the global lift factor that has been adjusted using historical media data measured by the media meter that includes streaming media for the plurality of demographic groups included in the plurality of unique demographic adjustment groups and the proportion of headphone usage for the plurality of demographic groups.

Example 12 includes the system of example 1, wherein the audience adjustment calculator is to determine which audience members in the audience estimates are associated with demographic groups included in a first unique demographic adjustment group and apply a first adjustment factor associated with the first unique demographic adjustment group to the audience estimates associated with the demographic groups.

Example 13 includes a non-transitory computer readable medium comprising instructions which, when executed, cause a machine to at least determine audience estimates for streaming media based on media data measured by a media meter, calculate a global lift factor based on a determined proportion of an audience that listens to streaming media via headphones and a determined proportion of the audience that listens to streaming media without headphones, calculate adjustment factors for a plurality of unique demographic adjustment groups, wherein the adjustment factors are constrained by the global lift factor, apply the adjustment factors to the audience estimates for streaming media, wherein the adjustment factors are applied to the audience estimates for audience members that are associated with respective unique demographic adjustment groups, and report new audience estimates based on the audience estimates with the applied adjustment factors.

Example 14 includes the non-transitory computer readable medium of example 13, wherein the instructions cause the machine to sample a former audience associated with the media data measured by the media meter for an online survey, the online survey to determine the proportion of the audience that listens to streaming media via headphones and the proportion of the audience that listens to streaming media without headphones, the online survey including demographic information of the audience.

Example 15 includes the non-transitory computer readable medium of example 13, wherein the global lift factor indicates an adjustment amount for the audience estimates for streaming media to account for media data not measured by the media meter because of headphones.

Example 16 includes the non-transitory computer readable medium of example 13, wherein the instructions cause the machine to determine a plurality of demographic groups by aggregating neighboring demographic segments into a demographic group based on sample size, wherein the demographic segments are sub-categories of the plurality of demographic groups.

Example 17 includes the non-transitory computer readable medium of example 16, wherein the instructions cause the machine to aggregate the neighboring demographic segments into a demographic group until a sample size of the demographic group satisfies a threshold.

Example 18 includes the non-transitory computer readable medium of example 17, wherein the instructions cause the machine to determine differences in mean proportions of streaming media via headphones for the plurality of demographic groups, the machine to aggregate the neighboring demographic segments into the demographic group based on a minimum applicable difference in mean.

Example 19 includes the non-transitory computer readable medium of example 13, wherein the instructions cause the machine to identify the plurality of unique demographic adjustment groups from the plurality of demographic groups by determining if statistical significance values for the plurality of demographic groups satisfy a threshold, wherein the threshold identifies statistically different demographic groups.

Example 20 includes the non-transitory computer readable medium of example 19, wherein a first demographic group is included in a first unique demographic adjustment group when a statistical significance value satisfies the threshold, the statistical significance value associated with a difference between the first demographic group and a group of all other demographic groups.

Example 21 includes the non-transitory computer readable medium of example 19, wherein a first demographic group and a second demographic group are included in a first unique demographic adjustment group when a statistical significance value associated with a difference between the first demographic group and the second demographic group does not satisfy the threshold.

Example 22 includes the non-transitory computer readable medium of example 13, wherein the instructions cause the machine to determine a proportion of media data measured that includes streaming media for a plurality of demographic groups.

Example 23 includes the non-transitory computer readable medium of example 22, wherein the instructions cause the machine to calculate the adjustment factors for the plurality of unique demographic adjustment groups wherein an average of the adjustment factors satisfies the global lift factor, the machine to calculate the adjustment factors using a proportion of headphone usage for the plurality of demographic groups determined by an online survey and an effective global lift factor, wherein the effective global lift factor is based on the global lift factor that has been adjusted using historical media data that includes streaming media for the plurality of demographic groups included in the plurality of unique demographic adjustment groups and the proportion of headphone usage for the plurality of demographic groups.

Example 24 includes the non-transitory computer readable medium of example 13, wherein the instructions cause the machine to determine which audience members in the audience estimates are associated with demographic groups included in a first unique demographic adjustment group and apply a first adjustment factor associated with the first unique demographic adjustment group to the audience estimates associated with the demographic groups.

Example 25 includes a method comprising determining audience estimates for streaming media based on media data measured by a media meter, calculating a global lift factor based on a determined proportion of an audience that listens to streaming media via headphones and a determined proportion of the audience that listens to streaming media without headphones, calculating adjustment factors for a plurality of unique demographic adjustment groups, wherein the adjustment factors are constrained by the global lift factor, and applying the adjustment factors to the audience estimates for streaming media, wherein the adjustment factors are applied to the audience estimates of audience members that are associated with respective unique demographic adjustment groups, and reporting new audience estimates based on the audience estimates with the applied adjustment factors.

Example 26 includes the method of example 25, further including sampling a former audience associated with the media data measured by the media meter for an online survey, the online survey to determine the proportion of the audience that listens to streaming media via headphones and the proportion of the audience that listens to streaming media without headphones, the online survey including demographic information of the audience.

Example 27 includes the method of example 25, wherein the global lift factor indicates an adjustment amount for the audience estimates for streaming media to account for media data not measured by the media meter because of headphones.

Example 28 includes the method of example 25, further including determining a plurality of demographic groups by aggregating neighboring demographic segments into a demographic group based on sample size, wherein the demographic segments are sub-categories of the plurality of demographic groups.

Example 29 includes the method of example 28, further including aggregating the neighboring demographic segments into a demographic group until a sample size of the demographic group satisfies a threshold.

Example 30 includes the method of example 29, further including determining differences in mean proportions of streaming media via headphones for the plurality of demographic groups, wherein the aggregating the neighboring demographic segments into the demographic group is based on a minimum applicable difference in mean.

Example 31 includes the method of example 25, further including identifying the plurality of unique demographic adjustment groups from the plurality of demographic groups by determining if statistical significance values for the plurality of demographic groups satisfy a threshold, wherein the threshold identifies statistically different demographic groups.

Example 32 includes the method of example 31, wherein a first demographic group is included in a first unique demographic adjustment group when a statistical significance value satisfies the threshold, the statistical significance value associated with a difference between the first demographic group and a group of all other demographic groups.

Example 33 includes the method of example 31, wherein a first demographic group and a second demographic group are included in a first unique demographic adjustment group when a statistical significance value does not satisfy the threshold.

Example 34 includes the method of example 25, further including determining a proportion of media data measured by the headphone survey that includes streaming media for a plurality of demographic groups.

Example 35 includes the method of example 34, further including calculating the adjustment factors for the plurality of unique demographic adjustment groups wherein an average of the adjustment factors satisfies the global lift factor, the calculating the adjustment factors using a proportion of headphone usage for the plurality of demographic groups determined by an online survey and an effective global lift factor, wherein the effective global lift factor is based on the global lift factor that has been adjusted using historical media data that includes streaming media for the plurality of demographic groups included in the plurality of unique demographic adjustment groups and the proportion of headphone usage for the plurality of demographic groups.

Example 36 includes the method of example 25, further including determining which audience members in the audience estimates are associated with demographic groups included in a first unique demographic adjustment group and apply a first adjustment factor associated with the first unique demographic adjustment group to the audience estimates associated with the demographic groups.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
 a processor;
 memory having stored thereon computer readable instructions that, when executed by the processor, cause the system to perform operations including:
  determining an audience estimate for streaming media based on media data measured by a media meter, the media meter to measure the streaming media based on an identification of the streaming media in ambient audio collected by a microphone of the media meter;

calculating at least one headphone adjustment factor based on a first determined proportion of an audience that listens to streaming media via headphones and a second determined proportion of the audience that listens to streaming media without headphones;

applying the at least one headphone adjustment factor to the audience estimate for streaming media, wherein application of the at least one headphone adjustment factor generates a headphone-use-adjusted audience estimate that accounts for presentation of the streaming media that is not accounted for by the media meter collection of ambient audio due to headphone usage; and reporting the headphone-use-adjusted audience estimate.

2. The system of claim 1, wherein the operations further include calculating multiple demographic-specific headphone adjustment factors for a plurality of unique demographic adjustment groups, wherein the multiple demographic-specific headphone adjustment factors are constrained by the at least one headphone adjustment factor.

3. The system of claim 2, wherein respective ones of the multiple demographic-specific headphone adjustment factors are applied to respective audience members in the audience estimate that are associated with respective ones of the plurality of unique demographic adjustment groups.

4. The system of claim 2, wherein the operations further include identifying the plurality of unique demographic adjustment groups from a plurality of demographic groups by determining that statistical significance values for a given one of the plurality of unique demographic adjustment groups satisfies a threshold, wherein the threshold is associated with one of the plurality of demographic groups.

5. The system of claim 2, wherein the operations further include determining a plurality of demographic groups by aggregating neighboring demographic segments into respective ones of the plurality of demographic groups based on a sample size, wherein the unique demographic adjustment groups are based on the plurality of demographic groups.

6. The system of claim 5, wherein aggregating neighboring demographic segments into respective ones of the plurality of demographic groups includes aggregating the neighboring demographic segments until the sample size satisfies a threshold.

7. The system of claim 1, wherein the operations further include sampling a former audience associated with the media data measured by the media meter by performing an online survey of the former audience, the online survey providing information to use as a basis to determine the first determined proportion and the second determined proportion, the online survey including demographic information of the former audience.

8. A non-transitory computer readable medium comprising instructions that, when executed by a computing system, cause the computing system to at least:

determine an audience estimate for streaming media based on media data measured by a media meter, the media meter to measure the streaming media based on an identification of the streaming media in ambient audio collected by a microphone of the media meter;

calculate at least one headphone adjustment factor based on a first determined proportion of an audience that listens to streaming media via headphones and a second determined proportion of the audience that listens to streaming media without headphones;

apply the at least one headphone adjustment factor to the audience estimate for streaming media, wherein application of the at least one headphone adjustment factor generates a headphone-use-adjusted audience estimate that accounts for presentation of the streaming media that is not accounted for by the media meter collection of ambient audio due to headphone usage; and report the headphone-use-adjusted audience estimate.

9. The non-transitory computer readable medium of claim 8, wherein the instructions, when executed by the computing system, further cause the computing system to calculate multiple demographic-specific headphone adjustment factors for a plurality of unique demographic adjustment groups, wherein the multiple demographic-specific headphone adjustment factors are constrained by the at least one headphone adjustment factor.

10. The non-transitory computer readable medium of claim 9, wherein respective ones of the multiple demographic-specific headphone adjustment factors are applied to respective audience members in the audience estimate that are associated with respective ones of the plurality of unique demographic adjustment groups.

11. The non-transitory computer readable medium of claim 9, wherein the instructions, when executed by the computing system, further cause the computing system to identify the plurality of unique demographic adjustment groups from a plurality of demographic groups by determining that statistical significance values for a given one of the plurality of unique demographic adjustment groups satisfies a threshold, wherein the threshold is associated with one of the plurality of demographic groups.

12. The non-transitory computer readable medium of claim 9, wherein the instructions, when executed by the computing system, further cause the computing system to determine a plurality of demographic groups by aggregating neighboring demographic segments into respective ones of the plurality of demographic groups based on a sample size, wherein the unique demographic adjustment groups are based on the plurality of demographic groups.

13. The non-transitory computer readable medium of claim 12, wherein aggregating neighboring demographic segments into respective ones of the plurality of demographic groups includes aggregating the neighboring demographic segments until the sample size satisfies a threshold.

14. The non-transitory computer readable medium of claim 8, wherein the instructions, when executed by the computing system, further cause the computing system to sample a former audience associated with the media data measured by the media meter by performing an online survey of the former audience, the online survey providing information to use as a basis to determine the first determined proportion and the second determined proportion, the online survey including demographic information of the former audience.

15. A method comprising:

determining an audience estimate for streaming media based on media data measured by a media meter, the media meter to measure the streaming media based on an identification of the streaming media in ambient audio collected by a microphone of the media meter;

calculating at least one headphone adjustment factor based on a first determined proportion of an audience that listens to streaming media via headphones and a second determined proportion of the audience that listens to streaming media without headphones;

applying the at least one headphone adjustment factor to the audience estimate for streaming media, application of the at least one headphone adjustment factor generates a headphone-use-adjusted audience estimate that accounts for presentation of the streaming media that is not accounted for by the media meter collection of ambient audio due to headphone usage; and reporting the headphone-use-adjusted audience estimate.

16. The method of claim 15, further including calculating multiple demographic-specific headphone adjustment factors for a plurality of unique demographic adjustment groups, wherein the multiple demographic-specific headphone adjustment factors are constrained by the at least one headphone adjustment factor.

17. The method of claim 16, wherein respective ones of the multiple demographic-specific headphone adjustment factors are applied to respective audience members in the audience estimate that are associated with respective ones of the plurality of unique demographic adjustment groups.

18. The method of claim 16, further including identifying the plurality of unique demographic adjustment groups from a plurality of demographic groups by determining that statistical significance values for a given one of the plurality of unique demographic adjustment groups satisfies a threshold, wherein the threshold is associated with one of the plurality of demographic groups.

19. The method of claim 16, further including determining a plurality of demographic groups by aggregating neighboring demographic segments into respective ones of the plurality of demographic groups based on a sample size, wherein the unique demographic adjustment groups are based on the plurality of demographic groups.

20. The method of claim 15, further including sampling a former audience associated with the media data measured by the media meter by performing an online survey of the former audience, the online survey providing information to use as a basis to determine the first determined proportion and the second determined proportion, the online survey including demographic information of the former audience.

* * * * *